United States Patent
Liu et al.

(10) Patent No.: US 11,500,507 B2
(45) Date of Patent: Nov. 15, 2022

(54) NOTIFICATION DISPLAY METHOD AND TERMINAL

(71) Applicant: HUAWEI TECHNOLOGIES CO., LTD., Guangdong (CN)

(72) Inventors: Mohan Liu, Shenzhen (CN); Li Zhou, Shanghai (CN); Jiyong Jiang, Shanghai (CN); Renzhi Yang, Shanghai (CN)

(73) Assignee: HUAWEI TECHNOLOGIES CO.. LTD., Guangdong (CN)

( * ) Notice: Subject to any disclaimer, the term of this patent is extended or adjusted under 35 U.S.C. 154(b) by 0 days.

(21) Appl. No.: 16/651,875

(22) PCT Filed: Sep. 30, 2017

(86) PCT No.: PCT/CN2017/104884
§ 371 (c)(1),
(2) Date: Mar. 27, 2020

(87) PCT Pub. No.: WO2019/061443
PCT Pub. Date: Apr. 4, 2019

(65) Prior Publication Data
US 2020/0233539 A1    Jul. 23, 2020

(51) Int. Cl.
*G06F 3/048*    (2013.01)
*G06F 3/0481*    (2022.01)
*H04W 4/20*    (2018.01)

(52) U.S. Cl.
CPC .............. *G06F 3/0481* (2013.01); *H04W 4/20* (2013.01)

(58) Field of Classification Search
None
See application file for complete search history.

(56) References Cited

U.S. PATENT DOCUMENTS

2012/0112908 A1    5/2012    Ri et al.
2013/0268875 A1*   10/2013   Han .................. G06F 3/0486
                                                         715/769

(Continued)

FOREIGN PATENT DOCUMENTS

CN    102105858 A    6/2011
CN    103139349 A    6/2013

(Continued)

OTHER PUBLICATIONS

XP033160604 Swadhin Pradhan et al., "Understanding and Managing Notifications", IEEE INFOCOM 2017—IEEE Conference on Computer Communications, total 9 pages.

(Continued)

*Primary Examiner* — William C Trapanese
(74) *Attorney, Agent, or Firm* — Womble Bond Dickinson (US) LLP

(57) ABSTRACT

This application discloses a notification display method. The method comprises: when there is a to-be-notified event, displaying, by a terminal, a notification by classification based on a notification type of the notification corresponding to the to-be-notified event; and displaying, by the terminal, in different display modes based on a priority of the notification, wherein the different display modes comprise: displaying in expanded form or displaying in collapsed form in the corresponding display pane, or the different display modes comprise: displaying in a first mode or displaying in a second mode in the corresponding display pane, and content displayed in the first mode is more than content displayed in the second mode.

21 Claims, 56 Drawing Sheets

(56) References Cited

U.S. PATENT DOCUMENTS

| | | | |
|---|---|---|---|
| 2013/0346882 A1* | 12/2013 | Shiplacoff | G06F 3/04842 715/753 |
| 2014/0059144 A1 | 2/2014 | Lehmann et al. | |
| 2014/0189030 A1* | 7/2014 | Benchenaa | H04L 51/24 709/207 |
| 2014/0258883 A1* | 9/2014 | Duarte | H04L 51/24 715/752 |
| 2016/0337299 A1* | 11/2016 | Lane | H04L 67/10 |
| 2017/0099592 A1 | 4/2017 | Loeb et al. | |
| 2017/0272564 A1 | 9/2017 | Duarte et al. | |

FOREIGN PATENT DOCUMENTS

| | | |
|---|---|---|
| CN | 104407827 A | 3/2015 |
| CN | 104506715 A | 4/2015 |
| CN | 104584488 A | 4/2015 |
| CN | 104813255 A | 7/2015 |
| CN | 104881803 A | 9/2015 |
| CN | 105260086 A | 1/2016 |
| CN | 105426189 A | 3/2016 |
| CN | 105912320 A | 8/2016 |
| CN | 106156120 A | 11/2016 |
| CN | 106201474 A | 12/2016 |
| CN | 106557330 A | 4/2017 |
| CN | 106557331 A | 4/2017 |
| CN | 106921749 A | 7/2017 |
| KR | 20120060570 A | 6/2012 |

OTHER PUBLICATIONS

XP031529857 Xiao-dan Zhang et al., "Study on Decision Classification Fusion Model",2009 Ninth International Conference on Hybrid Intelligent Systems,total 3 pages.

XP033105065 Varad V. Vishwarupe et al.,"Intellert: A Novel Approach for Content-Priority Based Message Filtering",2016 IEEE Bombay Section Symposium (IBSS),total 6 pages.

* cited by examiner

```
{
  "isOngoing" : "false",
  "label" : "Phone optimization"
  "mClass" : "com.tencent.server.fore.QuickLoadActivity",
  "pkgName" : "com.tencent.qqpimsecure"
}
```

FIG. 5A

```
{
   "contentText" : "Suggest to scan immediately to prevent virus intrusion",
   "intent" :{
       "hwFlags" :0,
       "mComponent" :{
            "mClass" : "com.tencent.server.fore.QuickLoadActivity",
            "mPackage" : "com.tencent.qqpimsecure"
        },
       "mFlags" : 402653184
   },
   "isClearable" : true,
   "isOngoing" : false,
   "label" : "Phone optimization", |
   "pkgName" : "com.tencent.qqpimsecure",
   "tickerText" : "Virus database updated\n Suggest to scan immediately to prevent virus intrusion Suggest to scan immediately to prevent virus intrusion virus database updated",
   "title" : "Virus database updated",
   "when" : 1493714959263
}.
```

FIG. 5B

CONT. FROM FIG. 12C-1

```
"100" :{
    "contentText" : "Finally! Winter of the World--Average three overnights over
this super novel by readers all over the world, on sale!>>>",
    "intent" :{
        "hwFlags" : 0,
        "mAction" : "com.baidu.android.pushservice.action.privatenotification.CLICK",
        "mComponent" :{
            "mClass" : "com.baidu.android.pushservice.PushService",
            "mpackage" : "com.jsmcc"
        },
        "mContentUserHint" : - 2,
        "mDate" : {
            "cachedFsi" : - 2,
            "cachedSsi" : - 2,
            "host" : "NOT CACHED",
            "port" : - 2,
            "scheme" : "NOT CACHED",
            "uriString" : "content://1893940023880887235"
        },
        "mExtras" :{
            "mFlags" :1536,
            "mParcelledData" :{
                "mNativePtr" : 533373071616,
                "mNativeSize" :0,
                "mOwnsNativeParcelobject" : true
            }
        },
        "mFlags" : 0,
    },
    "isClearable" : true,
    "isOngoing" : false,
    "pkgName" : "com.dangdang.reader",
    "tag" : "1893940023880887235",
    "tickerText" : "Finally! Winter of the World--Average three overnights over
this super novel by readers all over the world, on sale!>>>A sequel of Fall of Giants!",
    "title" : "A sequel of Fall of Giants!"
},
```

FIG. 12F

```
{
    "isOngoing" : "false",
    "label" : "Content information",
    "mAction" : "android.intent.action.MAIN",
    "mClass" : "com.tencent.qqlive.ona.activity",
    "pkgName" : "com.tencent.qqpim"
},
{
    "isOngoing" : "false",
    "label" : "Operating status",
    "mAction" : "ACTION_PUSH",
    "mClass" : "com.tencent.qqpim.receiver",
    "pkgName" : "com.tencent.qqpim"
},
```

FIG. 12G

NOTIFICATION DISPLAY METHOD AND TERMINAL

CROSS-REFERENCE TO RELATED APPLICATIONS

This application is a National Stage of International Application No. PCT/CN2017/104884, filed on Sep. 30, 2017, which is hereby incorporated by reference in its entirety.

TECHNICAL FIELD

This application relates to the field of terminal application, and in particular, to a notification display method and a terminal.

BACKGROUND

As intelligent terminals become more popular in people's daily life, people have more relied on the intelligent terminals. There has been an explosive growth in the number of and types of applications on a terminal. To attract the attention of users and increase the number of tapping to use by the users, notification messages are indiscriminately sent by many applications in an uncontrolled way. Consequently, the use experience of the users is greatly affected, and the explosion of junk information seriously affects the normal use of the users.

Many users want to have control over notification messages on intelligent terminals. Currently, terminal manufacturers and some developers are trying to find out solutions to this problem, to provide users with a more efficient and intuitive way of instant access to these notification messages.

SUMMARY

Embodiments of this application provide a notification display method and a terminal, used to achieve accurate classification of notifications to meet requirements of users, to help the users to screen out notifications of interest, thereby improving user experience.

A first aspect of the embodiments of this application provides a notification display method, and the method includes:

when there is a to-be-notified event, obtaining, by the terminal, matching information from object information of the to-be-notified event; matching the matching information against a rule in a rule repository; if the matching succeeds, displaying a notification corresponding to the to-be-notified event by classification based on a notification type corresponding to the matching rule; or if the matching fails, extracting at least one piece of feature information from the object information of the to-be-notified event, analyzing the feature information by using a classification model, and displaying a notification corresponding to the to-be-notified event by classification based on a notification type obtained by an analysis.

Each rule in the rule repository includes at least one condition, and each rule corresponds to one notification type. The object information of the to-be-notified event includes at least text information, jump information, and application package name information corresponding to the to-be-notified event.

In one embodiment, when there is a to-be-notified event, the terminal extracts the matching information or the feature information of the to-be-notified event, and matches the matching information against the rule in the rule repository, to obtain the notification type, or analyzes the feature information by using the classification model, to obtain the notification type. The rules in the rule repository and the classification model are determined based on a large amount of sample data that is manually labeled with the notification types, so that accurate classification of notifications may be achieved to meet requirements of users, to help the users to screen out notifications of interest, thereby improving user experience.

In one embodiment, the matching information obtained by the terminal from the object information of the to-be-notified event is the text information, and the rule in the rule repository includes at least one text matching condition. After obtaining the text information, the terminal matches the text information against a text matching condition in the rule.

This embodiment provides a specific manner of matching the matching information against the rule, to improve the feasibility of the solution.

In one embodiment, the matching information obtained by the terminal from the object information of the to-be-notified event is the text information and the application package name information, and the rule in the rule repository includes at least one text matching condition and an application package name matching condition corresponding to each text matching condition. After obtaining the text information and the application package name information, the terminal matches the text information against a text matching condition in the rule, and matches the application package name information against a corresponding application package name matching condition.

This embodiment provides another specific manner of matching the matching information against the rule, to improve the flexibility of the solution.

In one embodiment, the matching information obtained by the terminal from the object information of the to-be-notified event is the jump information and the application package name information, and the rule in the rule repository includes at least one jump matching condition and an application package name matching condition corresponding to each jump matching condition. After obtaining the jump information and the application package name information, the terminal matches the jump information against a jump matching condition in the rule, and matches the application package name information against a corresponding application package name matching condition.

This embodiment provides another specific manner of matching the matching information against the rule, to improve the flexibility of the solution.

In one embodiment, the jump information includes standard jump information and self-defined jump information.

According to this embodiment, the terminal may not only match the standard jump information, but also match the self-defined jump information, to improve accuracy of classification.

In one embodiment, the classification model may include: a text classification model, a jump classification model, and a fusion classification model. The terminal extracts a jump information eigenvector and a text information eigenvector from the object information of the to-be-notified event, analyzes the text information eigenvector by using the text classification model, to obtain a first category, analyzes the jump information eigenvector by using the jump classification model, to obtain a second category, and analyzes the first category and the second category by using the fusion classification model, to obtain an analysis result. The analysis result corresponds to one notification type.

According to this embodiment, the text information and the jump information of the to-be-notified event are separately analyzed by using the classification model, and a final notification type is obtained based on an analysis result of the two, thereby improving accuracy of the solution.

In one embodiment, the terminal may extract the jump information eigenvector in the following manner: obtaining, by the terminal, the jump information from the object information, dividing a value of each field in the jump information into a plurality of characters, and combining the plurality of characters through vectorization, to obtain the jump information eigenvector. Similarly, the terminal may extract the text information eigenvector in the following manner: obtaining, by the terminal, the text information from the object information, dividing the text information into a plurality of words and/or phrases, and combining the plurality of words and/or phrases through vectorization, to obtain the text information eigenvector.

This embodiment provides a specific manner of extracting the eigenvector, to improve the feasibility of the solution.

In one embodiment, the terminal may display the notification by classification in the following manner: displaying, by the terminal, a notification corresponding to to-be-notified events of a same notification type in a same display pane in a centralized manner, that is, displaying a notification in a display pane corresponding to a notification type to which the notification belongs.

In one embodiment, the terminal displays a notification of a notification type in a same display pane in a centralized manner in the following manner: the terminal displays the notification in expanded form in the display pane.

This embodiment provides a specific manner of displaying the notification by classification, to improve the feasibility of the solution.

In one embodiment, the terminal displays a notification of a notification type in a same display pane in a centralized manner in the following manner: determining, by the terminal, a display mode of the notification in the display pane based on a priority of the obtained notification, and display the notification in the display pane in a corresponding display mode. The display mode includes: displaying in expanded form or displaying in collapsed form. Alternatively, the display mode includes: displaying in a first mode or displaying in a second mode, and content displayed in the first mode is more than content displayed in the second mode.

This embodiment provides another specific manner of displaying the notification by classification, to improve the flexibility of the solution.

It should be noted that, the displaying in expanded form refers to partially or completely displaying text information of a notification in expanded form, and the displaying in collapsed form refers to hiding or displaying only part of text information of a notification.

With reference to the ninth implementation of the first aspect in this application, in a tenth implementation of the first aspect in this application, when the terminal displays a notification in the second mode, displaying, by the terminal, the notification in the first mode in response to detecting an input operation performed on the displayed notification.

This embodiment provides another specific manner of displaying the notification by classification, to improve the flexibility of the solution.

In one embodiment, the terminal may obtain a priority of the notification in the following manner: obtaining, by the terminal, priority information corresponding to the notification, and determining the priority corresponding to the notification based on the priority information, where the priority information includes at least one of the following: first priority information corresponding to the notification type to which the notification belongs, second priority information of an application corresponding to the notification, and user usage habit information corresponding to the notification.

According to this embodiment, the priorities of the notifications may be determined based on information such as the notification type, the attribute of an application, or a user habit, and the notifications may be classified, so that the requirements of the users may be better met, thereby improving user experience.

In one embodiment, the user usage habit information includes at least one of the following: user historical notification tapping frequency information, user historical notification deletion frequency information, and user profile information.

According to this embodiment, the user usage habit may be determined based on a plurality of pieces of information, to improve accuracy of the solution.

A second aspect of the embodiments of this application provides a notification display method, and the method includes: when there is a to-be-notified event, obtaining, by the terminal, text information, jump information and application package name information that are of the to-be-notified event; then matching the text information against a general rule in a rule repository; if the text information successfully matches against a first general rule, using a notification type corresponding to the first general rule as a notification type of a notification corresponding to the to-be-notified event; if the text information does not match any general rule in the rule repository, matching the text information and the application package name information against a special rule in the rule repository, and if the text information and the application package name information match against a first special rule, using a notification type corresponding to the first special rule as a notification type of a notification corresponding to the to-be-notified event; if the text information and the application package name information does not match any special rule in the rule repository, matching the jump information and the application package name information against an exact match rule in the rule repository, and if the jump information and the application package name information match against a first exact match rule, using a notification type corresponding to the first exact match rule as a notification type of a notification corresponding to the to-be-notified event; if the jump information and the application package name information does not match any exact match rules in the rule repository, matching the jump information and the application package name information against a fuzzy match rule in the rule repository, and if the jump information and the application package name information successfully match against a first fuzzy match rule, using a notification type corresponding to the first fuzzy match rule as a notification type of a notification corresponding to the to-be-notified event; and if the jump information and the application package name information does not match any fuzzy match rule in the rule repository, extracting a jump information eigenvector from the jump information, extracting a text information eigenvector from the text information, analyzing the text information eigenvector by using a text classification model, to obtain a first category, analyzing the jump information eigenvector by using the jump classification model, to obtain a second category, and analyzing the first category and the second category by using a fusion classification mode, to obtain a notification type of a notification.

After determining the notification type, the terminal displays the notification by classification based on the notification type. The displaying may specifically be in any one of the following manners: displaying a notification of a same notification type in expanded form in one display pane in a centralized manner; centralizing a notification of a same notification type in one display pane, and displaying a notification that has a high priority in expanded form, and displaying a notification that has a low priority in collapsed form; and centralizing a notification that is of a same notification type and that has a high priority in one display pane and displaying in expanded form, and displaying all notifications that have low priorities in collapsed form.

The priority of the notification is determined based on priority information of the notification type, priority information of an application, or a user usage habit.

In one embodiment, when there is a to-be-notified event, the terminal extracts the matching information or the feature information of the to-be-notified event, and matches the matching information against the rule in the rule repository, to obtain the notification type, or analyzes the feature information by using the classification model, to obtain the notification type. The rules in the rule repository and the classification model are determined based on a large amount of sample data that is manually labeled with the notification types, so that accurate classification of notifications may be achieved to meet requirements of users, to help the users to screen out notifications of interest, thereby improving user experience.

A third aspect of the embodiments of this application provides a notification display method, and the method includes: when there is a to-be-notified event, displaying, by the terminal, a notification by classification based on a notification type of the notification. In addition, because notifications have different priorities, display modes corresponding to the notifications are different. Specifically, the different display modes may include the following two display modes: displaying in expanded form and displaying in collapsed form. Alternatively, the different display modes include the following two display modes: displaying in a first mode and displaying in a second mode, and content displayed in the first mode is more than content displayed in the second mode.

In this embodiment, the terminal may display the notification in different modes based on the priority of the notification. Less content may be displayed for the notification that has a relatively low priority, and more content may be displayed for the notification that has a high priority. In this case, the user may be allowed to quickly find out notifications of interest on the notification display interface, thereby improving search efficiency and improving user experience.

In one embodiment, the terminal may specifically display the notification by classification in the following manner: displaying, by the terminal, a notification corresponding to a to-be-notified event of a same notification type in a same display pane in a centralized manner, that is, displaying the notification of a same notification type in one display pane in a centralized manner.

In one embodiment, a manner in which the terminal displays the notification in a same display pane in a centralized manner may specifically be displaying the notification in expanded form, that is, displaying the notification of a same notification type in expanded form in one display pane.

It should be noted that, the displaying in expanded form refers to partially or completely displaying text information of a notification in expanded form.

This embodiment provides a specific manner of displaying by classification, to improve the feasibility of the solution.

In one embodiment, a manner in which the terminal displays the notification in a same display pane in a centralized manner may specifically be determining a display mode of the notification in a corresponding display pane based on the priority of the notification corresponding to the to-be-notified event, and displaying the notification based on the determined display mode. The display mode may include: displaying in expanded form or displaying in collapsed form, or may include: displaying in a first mode or displaying in a second mode, and content displayed in the first mode is more than content displayed in the second mode.

It should be noted that, the displaying in expanded form refers to partially or completely displaying text information of a notification in expanded form, and the displaying in collapsed form refers to hiding or displaying part of content of text information of a notification.

In one embodiment, when the terminal displays a notification in the second mode, displaying, by the terminal, the notification in the first mode in response to detecting an input operation performed on the displayed notification.

This embodiment provides another specific manner of displaying the notification by classification, to improve the flexibility of the solution.

In one embodiment, the terminal may determine the priority corresponding to the notification based on the obtained priority information. The priority information includes at least one of the following: first priority information corresponding to the notification type to which the notification belongs, second priority information of an application corresponding to the notification, and user usage habit information corresponding to the notification.

According to this embodiment, the priorities of the notifications may be determined based on information such as the notification type, the attribute of an application, or a user habit, and the notifications may be classified, so that the requirements of the users may be better met, thereby improving user experience.

In one embodiment, the user usage habit information includes at least one of the following: user historical notification tapping frequency information, user historical notification deletion frequency information, and user profile information.

According to this embodiment, the user usage habit may be determined based on a plurality of pieces of information, to improve accuracy of the solution.

A fourth aspect of this application provides a notification display method, and the method includes: displaying, by the terminal, a notification corresponding to a to-be-notified event of a same notification type in expanded form in a same display pane in a centralized manner, or displaying in different modes based on a priority of a notification. The different modes may specifically be displaying in expanded form or displaying in collapsed form, and the different modes may further specifically be displaying in a first mode or displaying in a second mode, and content displayed in the first mode is more than content displayed in the second mode. The priority of the notification may be determined based on priority information. The priority information includes at least one of the following: first priority information corresponding to the notification type to which the notification belongs, second priority information of an application corresponding to the notification, and user usage habit information corresponding to the notification.

In this embodiment, the terminal may display the notification in different modes based on the priority of the notification. Less content may be displayed for the notification that has a relatively low priority, and more content may be displayed for the notification that has a high priority. In this case, the user may be allowed to quickly find out notifications of interest on the notification display interface, thereby improving search efficiency and improving user experience.

A fifth aspect of the embodiments of this application provides a terminal, and the terminal includes: a touchscreen, one or more processors, a memory, a plurality of application programs, and one or more computer programs. The touchscreen includes a touch-sensitive surface and a display, the one or more computer programs are stored in the memory, the one or more computer programs include an instruction, and when the instruction is executed by the terminal, the terminal is enabled to perform the following operations:

when there is a to-be-notified event, obtaining matching information from object information of the to-be-notified event; matching the matching information against a rule in a rule repository; if the matching succeeds, displaying a notification corresponding to the to-be-notified event by classification based on a notification type corresponding to the matching rule; or if the matching fails, extracting at least one piece of feature information from the object information of the to-be-notified event, analyzing the feature information by using a classification model, and displaying a notification corresponding to the to-be-notified event by classification based on a notification type obtained by an analysis.

Each rule in the rule repository includes at least one condition, and each rule corresponds to one notification type. The object information of the to-be-notified event includes at least text information, jump information, and application package name information corresponding to the to-be-notified event.

In one embodiment, the rule in the rule repository includes at least one text matching condition. In a process of obtaining, by the terminal, matching information from object information of the to-be-notified event and matching the matching information against a rule in a rule repository, when the processor executes the instruction, the terminal is enabled to specifically perform the following operations:

obtaining the text information from the object information of the to-be-notified event, and matching the text information against a first text matching condition in the rule.

This embodiment provides a specific manner of matching the matching information against the rule, to improve the feasibility of the solution.

In one embodiment, the rule in the rule repository includes the at least one text matching condition and an application package name matching condition corresponding to each text matching condition.

In a process of obtaining, by the terminal, matching information from object information of the to-be-notified event and matching the matching information against a rule in a rule repository, when the processor executes the instruction, the terminal is enabled to specifically perform the following operations:

obtaining the text information and the application package name information from the object information of the to-be-notified event, matching the text information against a text matching condition in the rule, and matching the application package name information against an application package name matching condition corresponding to the text matching condition in the rule.

This embodiment provides another specific manner of matching the matching information against the rule, to improve the flexibility of the solution.

In one embodiment, the rule in the rule repository includes at least one jump matching condition and an application package name matching condition corresponding to each jump matching condition.

In a process of obtaining, by the terminal, matching information from object information of the to-be-notified event and matching the matching information against a rule in a rule repository, when the processor executes the instruction, the terminal is enabled to specifically perform the following operations:

obtaining the jump information and the application package name information from the object information of the to-be-notified event, matching the jump information against a jump matching condition in the rule, and matching the application package name information against an application package name matching condition corresponding to the jump matching condition in the rule.

This embodiment provides another specific manner of matching the matching information against the rule, to improve the flexibility of the solution.

In one embodiment, the jump information includes standard jump information and self-defined jump information.

According to this embodiment, the terminal may not only match the standard jump information, but also match the self-defined jump information, to improve accuracy of classification.

In one embodiment, the classification model may include: a text classification model, a jump classification model, and a fusion classification model.

In a process of extracting, by the terminal, at least one piece of feature information from the object information of the to-be-notified event and analyzing the feature information by using a classification model, when the processor executes the instruction, the terminal is enabled to specifically perform the following operations:

extracting a jump information eigenvector and a text information eigenvector from the object information of the to-be-notified event, analyzing the text information eigenvector by using the text classification model, to obtain a first category, analyzing the jump information eigenvector by using the jump classification model, to obtain a second category, and analyzing the first category and the second category by using the fusion classification model, to obtain an analysis result. The analysis result corresponds to one notification type.

According to this embodiment, the text information and the jump information of the to-be-notified event are separately analyzed by using the classification model, and a final notification type is obtained based on an analysis result of the two, thereby improving accuracy of the solution.

In one embodiment, in a process of extracting, by the terminal, a jump information eigenvector and a text information eigenvector from the object information of the to-be-notified event, when the processor executes the instruction, the terminal is enabled to specifically perform the following operations:

obtaining the jump information from the object information, dividing a value of each field in the jump information into a plurality of characters, and combining several of characters through vectorization, to obtain the jump information eigenvector; obtaining the text information from the object information, dividing the text information into a plurality of words and/or phrases, and combining the plurality of words and/or phrases through vectorization, to obtain the text information eigenvector.

This embodiment provides a specific manner of extracting the eigenvector, to improve the feasibility of the solution.

In one embodiment, in a process of displaying by classification by the terminal, when the processor executes the instruction, the terminal is enabled to specifically perform the following operations:

displaying a notification corresponding to a to-be-notified event of a same notification type in a same display pane in a centralized manner, that is, displaying a notification in a display pane corresponding to a notification type to which the notification belongs.

With reference to the seventh implementation of the fifth aspect in this application, in an eighth implementation of the fifth aspect in this application, in a process of displaying by classification by the terminal, when the processor executes the instruction, the terminal is enabled to specifically perform the following operations:

displaying a notification of a notification type in expanded form in one display pane in a centralized manner.

This embodiment provides a specific manner of displaying the notification by classification, to improve the feasibility of the solution.

In one embodiment, in a process of displaying by classification by the terminal, when the processor executes the instruction, the terminal is enabled to specifically perform the following operations:

displaying a notification of a notification type in one display pane in a centralized manner, determining a display mode of the notification in the display pane based on a priority of the obtained notification, and displaying the notification in the display pane in corresponding display mode. The display mode includes: displaying in expanded form or displaying in collapsed form. Alternatively, the display mode includes: displaying in a first mode or displaying in a second mode, and content displayed in the first mode is more than content displayed in the second mode.

This embodiment provides another specific manner of displaying the notification by classification, to improve the flexibility of the solution.

It should be noted that, the displaying in expanded form refers to partially or completely displaying text information of a notification, and the displaying in collapsed form refers to hiding or displaying only part of text information of a notification.

In one embodiment, when displaying, by the terminal, a notification in the second mode, the processor executes the instruction, and the terminal is enabled to further perform the following operations:

displaying the notification in the first mode in response to detecting an input operation performed on the displayed notification.

This embodiment provides another specific manner of displaying the notification by classification, to improve the flexibility of the solution.

In one embodiment, in a process of displaying by classification by the terminal, when the processor executes the instruction, the terminal is enabled to specifically perform the following operations:

obtaining priority information corresponding to the notification, and determining the priority corresponding to the notification based on the priority information. The priority information includes at least one of the following: first priority information corresponding to the notification type to which the notification belongs, second priority information of an application corresponding to the notification, and user usage habit information corresponding to the notification.

According to this embodiment, the priorities of the notifications may be determined based on information such as the notification type, the attribute of an application, or a user habit, and the notifications may be classified, so that the requirements of the users may be better met, thereby improving user experience.

In one embodiment, the user usage habit information includes at least one of the following: user historical notification tapping frequency information, user historical notification deletion frequency information, and user profile information.

According to this embodiment, the user usage habit may be determined based on a plurality of pieces of information, to improve accuracy of the solution.

A sixth aspect of this application provides a terminal, and the terminal includes: a touchscreen, one or more processors, a memory, a plurality of application programs, and one or more computer programs. The touchscreen includes a touch-sensitive surface and a display, the one or more computer programs are stored in the memory, the one or more computer programs include an instruction, and when the instruction is executed by the terminal, the terminal is enabled to perform the following operations:

when there is a to-be-notified event, displaying a notification by classification based on a notification type of the notification. In addition, because priorities of notifications are different, display modes corresponding to the notifications are different. Specifically, the different display modes may include the following two display modes: displaying in expanded form and displaying in collapsed form. Alternatively, the different display modes include the following two display modes: displaying in a first mode and displaying in a second mode, and content displayed in the first mode is more than content displayed in the second mode.

In this embodiment, the terminal may display the notification in different modes based on the priority of the notification. Less content may be displayed for the notification that has a relatively low priority, and more content may be displayed for the notification that has a high priority. In this case, the user may be allowed to quickly find out notifications of interest on the notification display interface, thereby improving search efficiency and improving user experience.

In one embodiment, in a process of displaying by classification by the terminal, when the processor executes the instruction, the terminal is enabled to specifically perform the following operations:

displaying a notification corresponding to a to-be-notified event of a same notification type in a same display pane in a centralized manner, that is, centralizing the notification of a same notification type in one display pane.

In one embodiment, in a process of displaying by classification by the terminal, when the processor executes the instruction, the terminal is enabled to specifically perform the following operation:

displaying, by the terminal, a notification in expanded form in a same display pane in a centralized manner.

It should be noted that, the displaying in expanded form refers to partially or completely displaying text information of a notification in expanded form.

This embodiment provides a specific manner of displaying by classification, to improve the feasibility of the solution.

In one embodiment, in a process of displaying by classification by the terminal, when the processor executes the instruction, the terminal is enabled to specifically perform the following operations:

a manner in which the notification is displayed in a same display pane in a centralized manner may specifically be determining a display mode of the notification in a corresponding display pane based on the priority of the notification corresponding to the to-be-notified event, and displaying the notification based on the determined display mode. The display mode may include: displaying in expanded form or displaying in collapsed form, or may include: displaying in a first mode or displaying in a second mode, and content displayed in the first mode is more than content displayed in the second mode.

It should be noted that, the displaying in expanded form refers to partially or completely displaying text information of a notification in expanded form, and the displaying in collapsed form refers to hiding or displaying part of content of text information of a notification.

In one embodiment, when displaying, by the terminal, a notification in the second mode, the processor executes the instruction, and the terminal is enabled to further perform the following operations:

displaying the notification in the first mode in response to detecting an input operation performed on the displayed notification.

This embodiment provides another specific manner of displaying the notification by classification, to improve the flexibility of the solution.

In one embodiment, the processor executes the instruction, and the terminal is enabled to further perform the following operations:

determining the priority corresponding to the notification based on the obtained priority information. The priority information includes at least one of the following: first priority information corresponding to the notification type to which the notification belongs, second priority information of an application corresponding to the notification, and user usage habit information corresponding to the notification.

According to this embodiment, the priorities of the notifications may be determined based on information such as the notification type, the attribute of an application, or a user habit, and the notifications may be classified, so that the requirements of the users may be better met, thereby improving user experience.

In one embodiment, the user usage habit information includes at least one of the following: user historical notification tapping frequency information, user historical notification deletion frequency information, and user profile information.

According to this embodiment, the user usage habit may be determined based on a plurality of pieces of information, to improve accuracy of the solution.

A seventh aspect of this application provides a terminal, and the terminal includes: a matching module, a display module, and an analysis module.

When there is a to-be-notified event, the matching module is configured to: obtain matching information from object information of the to-be-notified event, and match the matching information against at least one rule in a rule repository. The display module is configured to display, if the matching performed by the matching module succeeds, a notification corresponding to the to-be-notified event by classification based on a notification type corresponding to the matching rule. The analysis module is configured to: extract, if the matching performed by the matching module fails, at least one piece of feature information from the object information of the to-be-notified event, and analyze the feature information by using a classification model. The display module is alternatively configured to display a notification corresponding to the to-be-notified event by classification based on a notification type obtained by an analysis by the analysis module.

Each rule in the rule repository includes at least one condition, and each rule corresponds to one notification type. The object information of the to-be-notified event includes at least text information, jump information, and application package name information corresponding to the to-be-notified event.

In one embodiment, when there is a to-be-notified event, the matching module may match the matching information against the rules in the rule repository, to obtain the notification type; the analysis module may analyze the feature information by using the classification model, to obtain the notification type; and the display module may display the notification by classification based on the notification type. The rules in the rule repository and the classification model are determined based on a large amount of sample data based on a large amount of sample data that is manually labeled with the notification types, so that accurate classification of notifications may be achieved to meet requirements of users, to help the users to screen out notifications of interest, thereby improving user experience.

In one embodiment, the rule in the rule repository includes at least one text matching condition. The matching module is specifically configured to: obtain the text information from the object information of the to-be-notified event, and match the text information against a text matching condition in the rule.

This embodiment provides a specific manner of matching the matching information against the rule, to improve the feasibility of the solution.

In one embodiment, the rule in the rule repository includes the at least one text matching condition and an application package name matching condition corresponding to each text matching condition.

The matching module is specifically configured to: obtain the text information and the application package name information from the object information of the to-be-notified event, match the text information against a text matching condition in the rule, and match the application package name information against an application package name matching condition corresponding to the text matching condition in the rule.

This embodiment provides another specific manner of matching the matching information against the rule, to improve the flexibility of the solution.

In one embodiment, the rule in the rule repository includes at least one jump matching condition and an application package name matching condition corresponding to each jump matching condition.

The matching module is specifically configured to: obtain the jump information and the application package name information from the object information of the to-be-notified event, match the jump information against a jump matching condition in the rule, and match the application package name information against a corresponding application package name matching condition.

This embodiment provides another specific manner of matching the matching information against the rule, to improve the flexibility of the solution.

In one embodiment, the jump information includes standard jump information and self-defined jump information.

According to this embodiment, the terminal may not only match the standard jump information, but also match the self-defined jump information, to improve accuracy of classification.

In one embodiment, the classification model may include: a text classification model, a jump classification model, and a fusion classification model.

The analysis module is specifically configured to: extract a jump information eigenvector and a text information eigenvector from the object information of the to-be-notified event, analyze the text information eigenvector by using the text classification model, to obtain a first category, analyze the jump information eigenvector by using the jump classification model, to obtain a second category, and analyze the first category and the second category by using the fusion classification model, to obtain an analysis result. The analysis result corresponds to one notification type.

According to this embodiment, the text information and the jump information of the to-be-notified event are separately analyzed by using the classification model, and a final notification type is obtained based on an analysis result of the two, thereby improving accuracy of the solution.

In one embodiment, the classification model is specifically configured to: obtain the jump information from the object information, divide a value of each field in the jump information into a plurality of characters, and combine the plurality of characters through vectorization, to obtain the jump information eigenvector.

The analysis module is further specifically configured to: obtain the text information from the object information, divide the text information into a plurality of words and/or phrases, and combine the plurality of words and/or phrases through vectorization, to obtain the text information eigenvector.

This embodiment provides a specific manner of extracting the eigenvector, to improve the feasibility of the solution.

In one embodiment, the display module is specifically configured to display a notification corresponding to a to-be-notified event of a same notification type in a same display pane in a centralized manner, that is, display a notification in a display pane corresponding to a notification type to which the notification belongs.

In one embodiment, the display module is specifically configured to display a notification of a notification type in expanded form in one display pane in a centralized manner.

This embodiment provides a specific manner of displaying the notification by classification, to improve the feasibility of the solution.

In one embodiment, the display module is specifically configured to: display a notification of a notification type in one display pane in a centralized manner, determine a display mode of the notification in the display pane based on a priority of the obtained notification, and display the notification in the display pane in corresponding display mode. The display mode includes: displaying in expanded form or displaying in collapsed form. Alternatively, the display mode includes: displaying in a first mode or displaying in a second mode, and content displayed in the first mode is more than content displayed in the second mode.

This embodiment provides another specific manner of displaying the notification by classification, to improve the flexibility of the solution.

It should be noted that, the displaying in expanded form refers to partially or completely displaying text information of a notification in expanded form, and the displaying in collapsed form refers to hiding or displaying only part of text information of a notification.

In one embodiment, when the display module is configured to display the notification in the second mode, the display module may be further configured to display the notification in the first mode in response to a detected input operation performed on the displayed notification.

This embodiment provides another specific manner of displaying the notification by classification, to improve the flexibility of the solution.

In one embodiment, the terminal further includes a determining module. The determining module is configured to obtain priority information corresponding to the notification, and determine the priority corresponding to the notification based on the priority information. The priority information includes at least one of the following: first priority information corresponding to the notification type to which the notification belongs, second priority information of an application corresponding to the notification, and user usage habit information corresponding to the notification.

According to this embodiment, the priorities of the notifications may be determined based on information such as the notification type, the attribute of an application, or a user habit, and the notifications may be classified, so that the requirements of the users may be better met, thereby improving user experience.

In one embodiment, the user usage habit information includes at least one of the following: user historical notification tapping frequency information, user historical notification deletion frequency information, and user profile information.

According to this embodiment, the user usage habit may be determined based on a plurality of pieces of information, to improve accuracy of the solution.

An eighth aspect of this application provides a terminal, and the terminal includes a display module.

The display module id configured to display, when there is a to-be-notified event, a notification by classification based on a notification type of the notification, and display in different display modes based on a priority of the notification. Specifically, the different display modes may include the following two display modes: displaying in expanded form and displaying in collapsed form. Alternatively, the different display modes include the following two display modes: displaying in a first mode and displaying in a second mode, and content displayed in the first mode is more than content displayed in the second mode.

In this embodiment, the display module may display the notification in different modes based on the priority of the notification. Less content may be displayed for the notification that has a relatively low priority, and more content may be displayed for the notification that has a high priority. In this case, the user may be allowed to quickly find out notifications of interest on the notification display interface, thereby improving search efficiency and improving user experience.

In one embodiment, the display module is configured to display a notification corresponding to a to-be-notified event of a same notification type in a same display pane in a centralized manner, that is, centralize the notification of a same notification type in one display pane.

In one embodiment, the display module is configured to display the notifications in expanded form in a same display pane, that is, display the notifications of a same notification type in expanded form in one display pane.

It should be noted that, the displaying in expanded form refers to partially or completely displaying text information of a notification in expanded form.

This embodiment provides a specific manner of displaying by classification, to improve the feasibility of the solution.

In one embodiment, the display module is configured to centralize the notification in a same display pane, determine a display mode of the notification in a corresponding display pane based on the priority of the notification corresponding to the to-be-notified event, and display the notification based on the determined display mode. The display mode may include: displaying in expanded form or displaying in collapsed form, or may include: displaying in a first mode or displaying in a second mode, and content displayed in the first mode is more than content displayed in the second mode.

It should be noted that, the displaying in expanded form refers to partially or completely displaying text information of a notification in expanded form, and the displaying in collapsed form refers to hiding or displaying part of content of text information of a notification.

In one embodiment, when the display module is configured to display the notification in the second mode, the display module is further configured to display the notification in the first mode in response to a detected input operation performed on the displayed notification.

This embodiment provides another specific manner of displaying the notification by classification, to improve the flexibility of the solution.

In one embodiment, the terminal further includes an obtaining module, configured to determine the priority corresponding to the notification based on the obtained priority information. The priority information includes at least one of the following: first priority information corresponding to the notification type to which the notification belongs, second priority information of an application corresponding to the notification, and user usage habit information corresponding to the notification.

According to this embodiment, the priorities of the notifications may be determined based on information such as the notification type, the attribute of an application, or a user habit, and the notifications may be classified, so that the requirements of the users may be better met, thereby improving user experience.

In one embodiment, the user usage habit information includes at least one of the following: user historical notification tapping frequency information, user historical notification deletion frequency information, and user profile information.

According to this embodiment, the user usage habit may be determined based on a plurality of pieces of information, to improve accuracy of the solution.

A ninth aspect of this application provides a graphical user interface (GUI), and the graphical user interface is stored in a terminal, the terminal includes a touchscreen, a memory, one or more processors, and the one or more processors are configured to execute one or more computer programs stored in the memory, where when there is a to-be-notified event, the graphical user interface includes:

a first GUI displayed on the touchscreen, where the first GUI includes a notification corresponding to the to-be-notified event, the notification is displayed by classification on the first GUI based on a notification type of the notification, and the notification is displayed in different display modes based on a priority of the notification, where the different display modes include: displaying in expanded form or displaying in collapsed form in the corresponding display pane, or the different display modes include: displaying in a first mode or displaying in a second mode in the corresponding display pane, and content displayed in the first mode is more than content displayed in the second mode.

In one embodiment, the first GUI further includes at least one display pane, and the display pane is configured to centralize notifications corresponding to to-be-notified events of the same notification type, as shown in the following FIG. 9A to FIG. 9I.

In one embodiment, the displaying by classification includes: displaying the notification in expanded form in a corresponding display pane, as shown in FIG. 9A.

In one embodiment, the displaying by classification includes: determining a display mode of the notification in a corresponding display pane based on the priority of the notification corresponding to the to-be-notified event, and displaying the notification based on the determined display mode, as shown in FIG. 9B to FIG. 9F.

The display mode includes: displaying in expanded form or displaying in collapsed form in the corresponding display pane.

Alternatively, the display mode includes: displaying in the first mode or displaying in the second mode in the corresponding display pane, and the content displayed in the first mode is more than the content displayed in the second mode.

In one embodiment, the displaying by classification includes: displaying in the first mode or displaying in the second mode in the corresponding display pane, and the content displayed in the first mode is more than the content displayed in the second mode.

The displaying by classification further includes:

when the notification is displayed in the second mode, displaying, by the terminal, the notification in the first mode in response to detecting an input operation performed on the displayed notification, as shown in FIG. 9C-1 and FIG. 9C-2.

In one embodiment, the priority of the notification is determined based on the priority information, where the priority information includes at least one of the following:

first priority information corresponding to the notification type corresponding to the notification;

second priority information of an application corresponding to the notification; and user usage habit information corresponding to the notification.

In one embodiment, the user usage habit information includes at least any one of the following:

user historical notification tapping frequency information;

user historical notification deletion frequency information; and user profile information.

A tenth aspect of this application provides a computer-readable storage medium, including an instruction. When the instruction is run on a computer, the computer is enabled to perform the method according to any one of the first aspect, the first to the twelfth implementations of the first aspect, and the second aspect.

An eleventh aspect of this application provides a computer-readable storage medium, including an instruction. When the instruction is run on a computer, the computer is enabled to perform the method according to any one of the second aspect, the first to the sixth implementations of the second aspect, and the third aspect.

A twelfth aspect of this application provides a computer program product. When the computer program product is run on a computer, the computer is enabled to perform the method according to any one of the first aspect, the first to the twelfth implementations of the first aspect, and the second aspect.

A thirteenth aspect of this application provides a computer program product. When the computer program product is run on a computer, the computer is enabled to perform the method according to any one of the second aspect, the first to the sixth implementations of the second aspect, and the third aspect.

The technical solutions provided in this embodiment of this application have the following beneficial effects.

In the embodiments of this application, when there is a to-be-notified event, the terminal extracts the matching information or the feature information of the to-be-notified event, and matches the matching information against the rule in the rule repository, to obtain the notification type, or analyzes the feature information by using the classification model, to obtain the notification type. The rules in the rule repository and the classification model are determined based on a large amount of sample data that is manually labeled with the notification types, so that accurate classification of notifications may be achieved to meet requirements of users, to help the users to screen out notifications of interest, thereby improving user experience.

BRIEF DESCRIPTION OF DRAWINGS

FIG. 2D-1 and FIG. 2D-2 are schematic diagrams of notifications displayed by a terminal on a notification bar display interface;

FIG. 5A is a schematic diagram of a jump rule according to an embodiment of this application;

FIG. 5B is a schematic diagram of object information of a notification according to an embodiment of this application;

FIG. 9C-1 and FIG. 9C-2 are schematic diagrams of notifications displayed on a notification bar display interface according to an embodiment of this application;

FIG. 9G-1, FIG. 9G-2, and FIG. 9G-3 are schematic diagrams of setting user habit information by a user according to an embodiment of this application;

FIG. 10B-1 and FIG. 10B-2 are schematic diagrams of notifications displayed on a notification bar display interface according to an embodiment of this application;

FIG. 11A-1, FIG. 11A-2, FIG. 11A-3, and FIG. 11A-4 are schematic diagrams of an operation of starting smart classification by a user according to an embodiment of this application;

FIG. 11B-1 and FIG. 11B-2 are schematic diagrams of an operation of setting a display mode corresponding to a notification type by a user according to an embodiment of this application;

FIG. 12C-1 and FIG. 12C-2 are schematic diagrams of notifications displayed on a notification bar display interface according to an embodiment of this application;

FIG. 12D-1 and FIG. 12D-2 are schematic diagrams of notifications displayed on a notification bar display interface according to an embodiment of this application;

FIG. 12F shows an example of jump information according to an embodiment of this application;

FIG. 12G shows an example of jump rule according to an embodiment of this application;

DESCRIPTION OF EMBODIMENTS

Figure 1A:
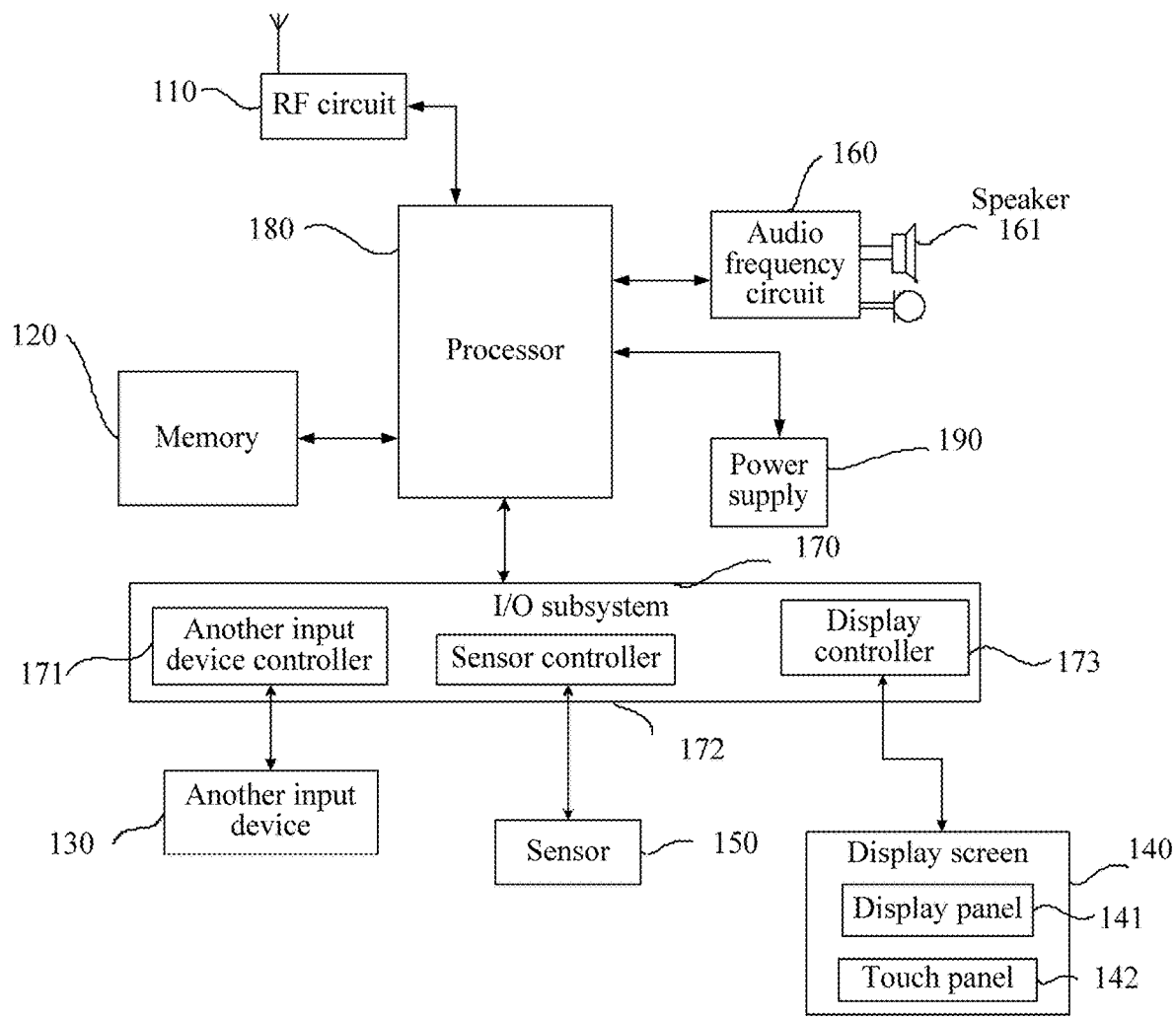
FIG. 1A is a schematic structural diagram of a terminal according to an embodiment of this application.

The technical solutions in the embodiments of this application are described below with reference to the accompanying drawings in the embodiments of this application. The described embodiments are merely a part rather than all of the embodiments of this application.

In the specification, claims, and accompanying drawings of this application, the phrases "first", "second", "third", "fourth", and so on (if existent) are intended to distinguish between similar objects but do not necessarily indicate a specific order or sequence. It should be understood that, the data termed in such a way are interchangeable in proper circumstances, so that the embodiments of the present invention described herein can be implemented in other orders than the order illustrated or described herein. Moreover, the phrases "comprise", "include" and any other variants mean to cover the non-exclusive inclusion, for example, a process, method, system, product, or device that includes a list of operations or units is not necessarily limited to those units, but may include other units not expressly listed or inherent to such a process, method, system, product, or device.

Embodiments of this application provide a notification message display method and a terminal, to facilitate search for important information by a user and improve user experience.

To help understand the embodiments of this application, some phrases related to the embodiments of this application are defined below.

Notification bar: The notification bar is a display area, in a terminal, used for centralized presentation of received notification messages. The notification messages in this application include but are not limited to: a short message, an instant message (for example, a QQ, WeChat, or SMS message), a push message (for example, a new issue, an advertisement, or recommended news) from a client, and ongoing things (for example, a music player, and a download progress during version update). Based on different notification mechanisms of the terminals, the notification messages may be displayed in different forms on the notification bar.

Ongoing attribute: The ongoing attribute is used to indicate an ongoing notification, and is usually used to indicate a background task (for example, playing music) in which a user is actively participating or a background task for which a user is waiting in a manner. An application service provider may assign, based on a requirement, the ongoing attribute to a notification message that requires continuous attention of the user.

Text information: The text information is text content given by an application when the application generates a notification.

Jump information: The jump information is a description that is given by the application and that is related to jumping to a specific interface to load a specific resource after a notification is clicked. The jump information in the embodiments of this application includes at least one of the following: an Action field, a Class field, a uriString field, and an extras field. Standard jump information includes: the Action field, the Class field, and the uriString field, and a user-defined field includes the extras field.

Application package name information: The application package name information is used to indicate an application that triggers a to-be-notified event, that is, used to indicate an application that sends a notification.

Rule repository: The rule repository is a set of rules used to be matched against matching information.

Display pane: The display pane is a display object, on a notification display interface, used to distinguish between notifications of different sets, and the terminal determines that notifications belonging to a same set need to be placed in a same display pane. The display object may specifically be a rectangular frame, a list, or another object. For example, in FIG. 1B, A1, A2, B1, and B2 are notifications to be displayed by the terminal. A1 and A2 form a display set, and A is a display pane corresponding to the set. B1 and B2 form a display set, and B is a display pane corresponding to the set. For another example, in FIG. 1C, A1, A2, B1, and B2 are notifications to be displayed by the terminal. A1 and A2 form a display set, and C is a display pane corresponding to the set. B1 and B2 form a display set, and D is a display pane corresponding to the set.

Obtaining time: The obtaining time is a time for obtaining a notification by the terminal.

With development of smart services, some intelligent notifications or services may be provided on the terminal based on a historical behavior habit of the user or some rules or models, to facilitate use of the terminal by the user, so that the user feels that the terminal becomes more intelligent.

The various smart services may be implemented by the terminal or a combination of the terminal and a cloud. Specifically, the terminal may include a rule platform, an algorithm platform, and a user profile platform. The terminal may implement various smart services, for example, 1. Service recommendation service, 2. Notification service, and 3. Notification filtering service, by using one or more of these three platforms and other resources.

1. Service recommendation service: The terminal includes a recommendation service framework configured to implement the service recommendation service. The recommendation service framework may include at least the algorithm platform, the rule platform, and the user profile platform. The rule platform may find, through matching according to a rule, a service that the user of the terminal expects to use in a current scenario. The algorithm platform may predict, based on a model, a service that the user of the terminal expects to use in a current scenario. The recommendation service framework may place the service predicted by the rule platform or the algorithm platform into a display interface of a recommendation application, so that the user can easily enter an interface corresponding to the service through the display interface of the recommendation application. The rule may be delivered by a server (that is, the cloud) to the terminal. The rule may be obtained through big data statistics, or may be obtained through summary based on empirical data. The model may be obtained in the following manner: User historical data and user feature data is trained by using the algorithm platform, to obtain the model; and the model may be updated based on new user data and feature data. The user historical data may be behavioral data of the user using the terminal within a time period. The user feature data may include a user profile or another type of feature data. For example, the another type of feature data may be behavioral data of the current user. The user profile may be obtained through the user profile platform of the terminal.

2. Notification service: The terminal includes a recommendation framework (framework) configured to implement the notification service. The recommendation framework may include at least the rule platform, a graphical user interface (GUI), and the user profile platform. The rule platform may listen to various events. The application in the terminal may register various rules with the rule platform. The rule platform then listens to, based on the registered rules, the various events in the terminal, matches the found events against the rules, and triggers, when a found event matches all conditions of a rule, a notification corresponding to the rule, that is, recommends a highlight event to the user. The notification is finally displayed by a graphical user interface or the application that registers the rule. Conditions of some rules may limit the user profile. The rule platform may request a current user profile from the user profile platform, to determine whether the current user profile matches a condition in the rules.

3. Notification filtering service: The terminal includes a notification filtering framework configured to implement the notification filtering service. The notification filtering framework may include at least the rule platform, the algorithm platform, and the user profile platform. When obtaining a notification, the notification filtering framework may determine a notification type by using the rule platform, or may determine a notification type through the algorithm platform; and then determines, based on the notification type and user preference, whether the notification is a notification in which the user is interested, and displays, based on the notification in which the user is interested and a notification in which the user is not interested, the notification in different manners. The user preference may include the user profile, or may include historical processing behavior of the user for one type of notification. The user profile is provided by the user profile platform.

It should be noted that the terminal may include one rule platform, and the rule platform provides a capability required by each framework to the foregoing three frameworks. The terminal may alternatively include a plurality of rule platforms, and the plurality of rule platforms respectively provide capabilities to the foregoing three frameworks. Similarly, the terminal may include one algorithm platform, and the algorithm platform provides a capability required by each framework to the recommendation service framework and the notification filtering framework; or the terminal may include two algorithm platforms, to respectively provide capabilities to the two frameworks. The terminal may include one user profile platform, and the user profile platform provides a capability required by each framework to the foregoing three frameworks. Alternatively, the terminal may include a plurality of user profile platforms, to respectively provide a capability to each framework.

The following embodiments of this application mainly provide a detailed description of the third service described above, that is, the notification filtering service. The following description of the rule platform, the user profile platform, and the algorithm platform is mainly used to describe functions related to the notification filtering service, and the rule platform, the user profile platform, and the algorithm platform included in the terminal are not limited to the functions described below.

The embodiments of this application provide a notification display method and a terminal, capable of helping the user screen effective notification messages, thereby improving user experience.

A terminal 100 in this embodiment of this application may include, but is not limited to: a mobile phone, a tablet computer, an e-reader, a personal digital assistant (PDA), a vehicle-mounted electronic device, a wearable device, a virtual reality (VR) device, an augmented reality (AR) device, or the like. An operating system of the terminal 100 may be a system such as Android, iOS, Windows Phone, or BlackBerry OS. This is not specifically limited in the embodiments of this application.

Figure 1B:
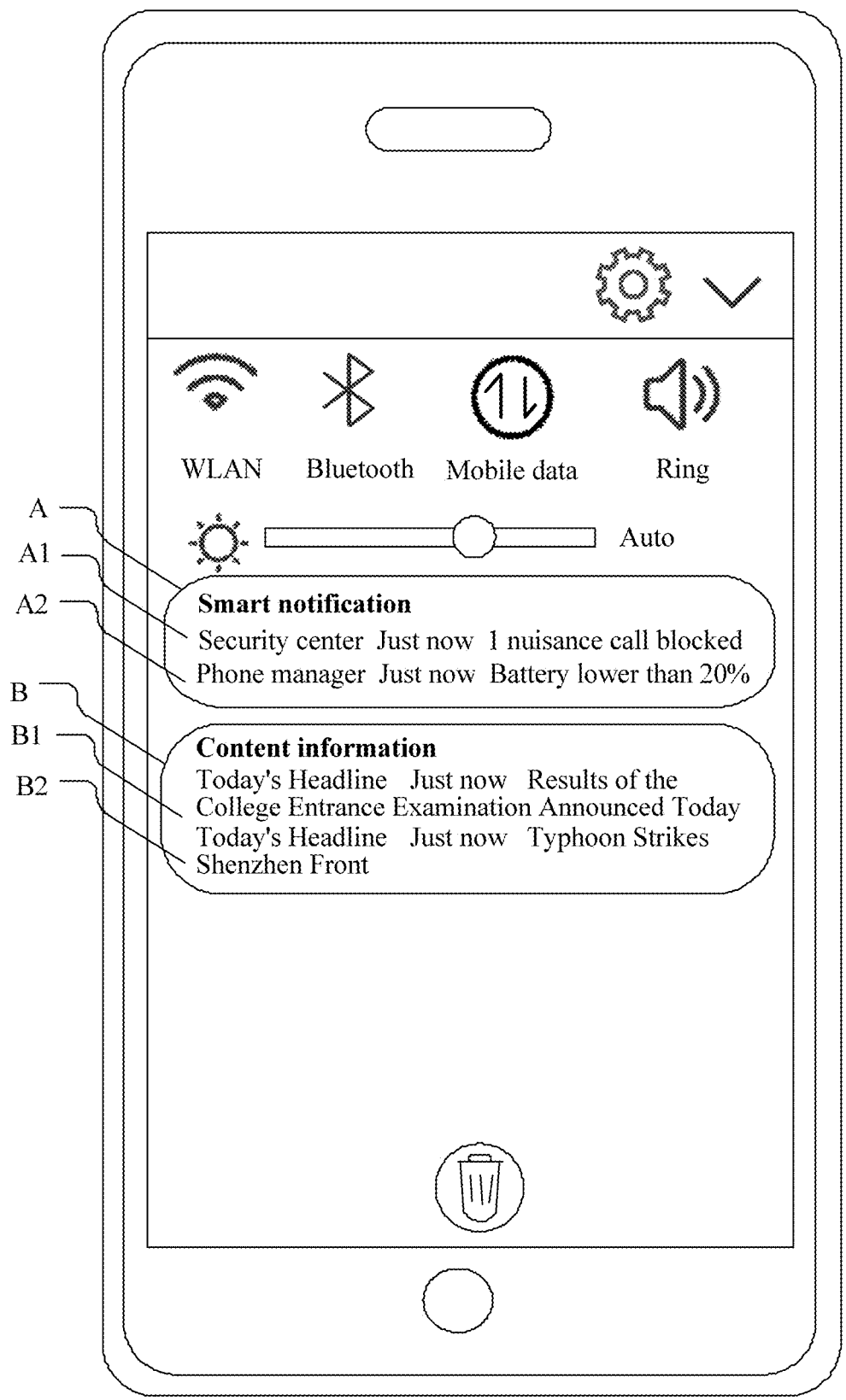
FIG. 1B is a schematic diagram of a display pane according to an embodiment of this application.
Figure 1C:
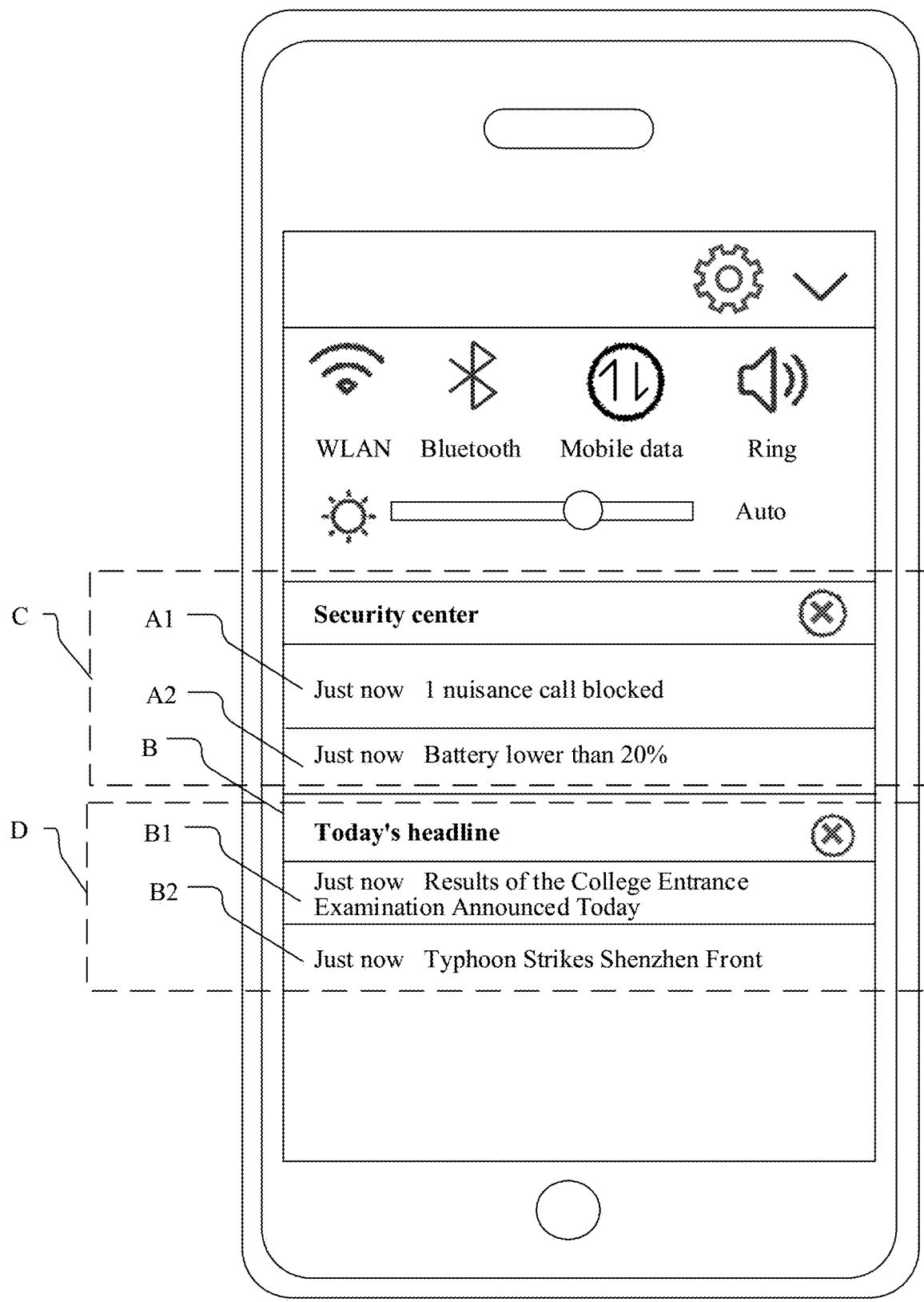
FIG. 1C is another schematic diagram of a display pane according to an embodiment of this application.

For example, the terminal device 100 is a mobile phone. FIG. 1A is a block diagram of a part of a structure of a mobile phone 100 related to this embodiment of this application. Referring to FIG. 1A, the mobile phone 100 includes components such as an RF (radio frequency) circuit 110, a memory 120, another input device 130, a display screen 140, a sensor 150, an audio frequency circuit 160, an I/O subsystem 170, a processor 180, and a power supply 190. A person skilled in the art may understand that the structure of the mobile phone shown in FIG. 1A does not constitute a limitation to the mobile phone, and the mobile phone may include more components or fewer components than those shown in the figure, or some components may be combined, or some components may be separated, or a different component deployment may be used. A person skilled in the art may understand that the display screen 140 belongs to a user interface (UI, User Interface), and the mobile phone 100 may include more or fewer user interfaces than those shown in the figure.

The following specifically describes the components of the mobile phone 100 with reference to FIG. 1A.

An RF circuit 110 may be configured to receive and send information and receive and send a signal during a call process. Specifically, the RF circuit receives downlink information from a base station, then delivers the downlink information to a processor 180 for processing, and sends related uplink data to the base station. Usually, the RF circuit includes, but is not limited to, an antenna, at least one amplifier, a transceiver, a coupler, a low noise amplifier (LNA), a duplexer, and the like In addition, the RF circuit 110 may also communicate with a network and another device by wireless communication. The wireless communication may use any communications standard or protocol, including but not limited to: Global System for Mobile Communications (GSM), General Packet Radio Service (GPRS), Code Division Multiple Access (CDMA), Wideband Code Division Multiple Access (WCDMA), Long Term Evolution (LTE), email, a short messaging service (SMS), and the like.

The memory 120 may be configured to store a software program and a module. The processor 180 runs the software program and the module stored in the memory 120, to implement various functional applications and data processing of the mobile phone 100. The memory 120 may mainly include a program storage area and a data storage area. The program storage area may store an operating system, an application program required by at least one function (such as a sound playback function and an image display function), and the like. The data storage area may store data (such as audio data and an address book) created based on use of the mobile phone 100, and the like. In addition, the memory 120 may include a high-speed random access memory, and may further include a non-volatile memory such as at least one disk storage device, a flash memory device, or another volatile solid-state storage device.

The another input device 130 may be configured to receive input digit or character information, and generate a keyboard signal input related to the user setting and function control of the mobile phone 100. Specifically, the another input device 130 may include but is not limited to one or more of a physical keyboard, a function key (for example, a volume control key or a power on/off key), a trackball, a mouse, a joystick, or an optical mouse (the optical mouse is a touch-sensitive surface that does not display a visible output, or an extension of a touch-sensitive surface including a touchscreen). The another input device 130 is connected to another input device controller 171 of the I/O subsystem 170, and performs signal interaction with the processor 180 under the control of the another device input controller 171.

The display screen 140 may be configured to display information input by the user or information provided for the user, and various menus of the mobile phone 100, and may further receive a user input. Specifically, the display screen 140 may include a display panel 141 and a touch panel 142. The display panel 141 may be configured by using an LCD (liquid crystal display), or an OLED (organic light-emitting diode), or in another form. The touch panel 142 is also referred to as a touchscreen, a touch-sensitive screen, or the like, and may collect a touch operation or non-touch operation of a user on or near the touch panel (such as an operation of a user on the touch panel 142 or near the touch panel 142 by using any suitable object or accessory such as a finger or a stylus, or including a motion sensing operation including operation types such as an isolated control operation and a multipoint control operation), and drives a corresponding connection apparatus according to a preset program. Optionally, the touch panel 142 may include two parts: a touch detection apparatus and a touch controller. The touch detection apparatus detects a touch position and a gesture of the user, detects a signal generated by the touch operation, and transfers the signal to the touch controller. The touch controller receives touch information from the touch detection apparatus, converts the touch information into information that may be processed by the processor and sends the information to the processor 180, and may receive a command sent by the processor 180 and execute the command. In addition, the touch panel 142 may be implemented by using various types, such as a resistive type, a capacitance type, an infrared type, and a surface sound wave type. Alternatively, the touch panel 142 may be implemented by using any technology developed in the future. Further, the touch panel 142 may cover the display panel 141. The user may perform, based on content displayed on the display panel 141 (where the displayed content includes but is not limited to a soft keyboard, a virtual mouse, a virtual key, an icon, or the like), an operation on or near the touch panel 142 covering the display panel 141. After detecting the touch operation on or near the touch panel 142, the touch panel 142 transfers the touch operation to the processor 180 by using the I/O subsystem 170 to determine a type of a touch application, to determine a user input. Subsequently, the processor 180 provides a corresponding visual output on the display panel 141 based on the type of the touch application and based on the user input by using the I/O subsystem 170. Although in FIG. 1A, the touch panel 142 and the display panel 141 are used as two separate components to implement input and output functions of the mobile phone 100, in some embodiments, the touch panel 142 and the display panel 141 may be integrated to implement the input and output functions of the mobile phone 100.

The mobile phone 100 may further include at least one sensor 150, such as a light sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the mobile phone 100 is moved to the ear. As one type of motion sensor, an acceleration sensor may detect magnitude of accelerations in various directions (generally on three axes), may detect magnitude and a direction of the gravity when static, and may be configured to identify an application of the mobile phone gesture (such as switchover between landscape orientation and portrait orientation, a related game, and gesture calibration of a magnetometer), a function related to vibration recognition (such as a pedometer and a knock), and the like. Other sensors such as a gyroscope, a barometer, a hygrometer, a thermometer, and an infrared sensor that may be further configured in the mobile phone 100. Details are not described herein again.

The audio frequency circuit 160, a speaker 161, and a microphone 162 may provide audio interfaces between the user and the mobile phone 100. The audio circuit 160 may convert received audio data into a signal and transmit the signal to the speaker 161. The speaker 161 converts the signal into a sound signal for output. On the other hand, the microphone 162 converts a collected sound signal into a signal. The audio circuit 160 receives the signal and converts the signal into audio data, and outputs the audio data to the RF circuit 108 to send the audio data to, for example, another mobile phone, or outputs the audio data to the memory 120 for further processing.

The I/O subsystem 170 is configured to control input and output peripheral devices, and may include the another device input controller 171, a sensor controller 172, and a display controller 173. Optionally, one or more another input control device controllers 171 receive a signal from the another input device 130 and/or send a signal to the another input device 130. The another input device 130 may include a physical button (a pressing button, a rocker button, and the like), a dial pad, a slider switch, a joystick, a click scroll wheel, or an optical mouse (the optical mouse is a touch-sensitive surface that does not display a visible output, or an extension of a touch-sensitive surface formed by a touch-screen). It should be noted that, the another input control device controller 171 may be connected to any one of or a plurality of the foregoing devices. The display controller 173 in the I/O subsystem 170 receives a signal from the display screen 140 or sends a signal to the display screen 140. After the display screen 140 detects the user input, the display controller 173 converts the detected user input into interaction with an object displayed on the user interface of the display screen 140, that is, man-machine interaction is implemented. The sensor controller 172 may receive a signal from one or more sensors 150 and/or may send a signal to the one or more sensors 150.

The processor 180 is a control center of the mobile phone 100, and is connected to various parts of the entire mobile phone by using various interfaces and lines. By running or executing a software program and/or module stored in the memory 120, and invoking data stored in the memory 120, the processor 1080 executes various functions of the mobile phone 100 and performs data processing, thereby monitoring the entire mobile phone. Optionally, the processor 180 may include one or more processing units. Preferably, the processor 180 may integrate an application processor and a modem. The application processor mainly processes an operating system, a user interface, an application program, and the like. The modem mainly processes wireless communication. It may be understood that the foregoing modem processor may not be integrated into the processor 180.

The mobile phone 100 further includes the power supply 190 (such as a battery) for supplying power to the components. Optionally, the power supply may be logically connected to the processor 180 by using a power management system, thereby implementing functions such as charging and discharging management and power consumption management by using the power management system.

Although not shown, the mobile phone 100 may further include a camera, a Bluetooth module, and the like, and details are not described herein again.

Figure 2A:
FIG. 2A is a schematic diagram of notifications displayed by a terminal on a lock screen interface.
Figure 2B:
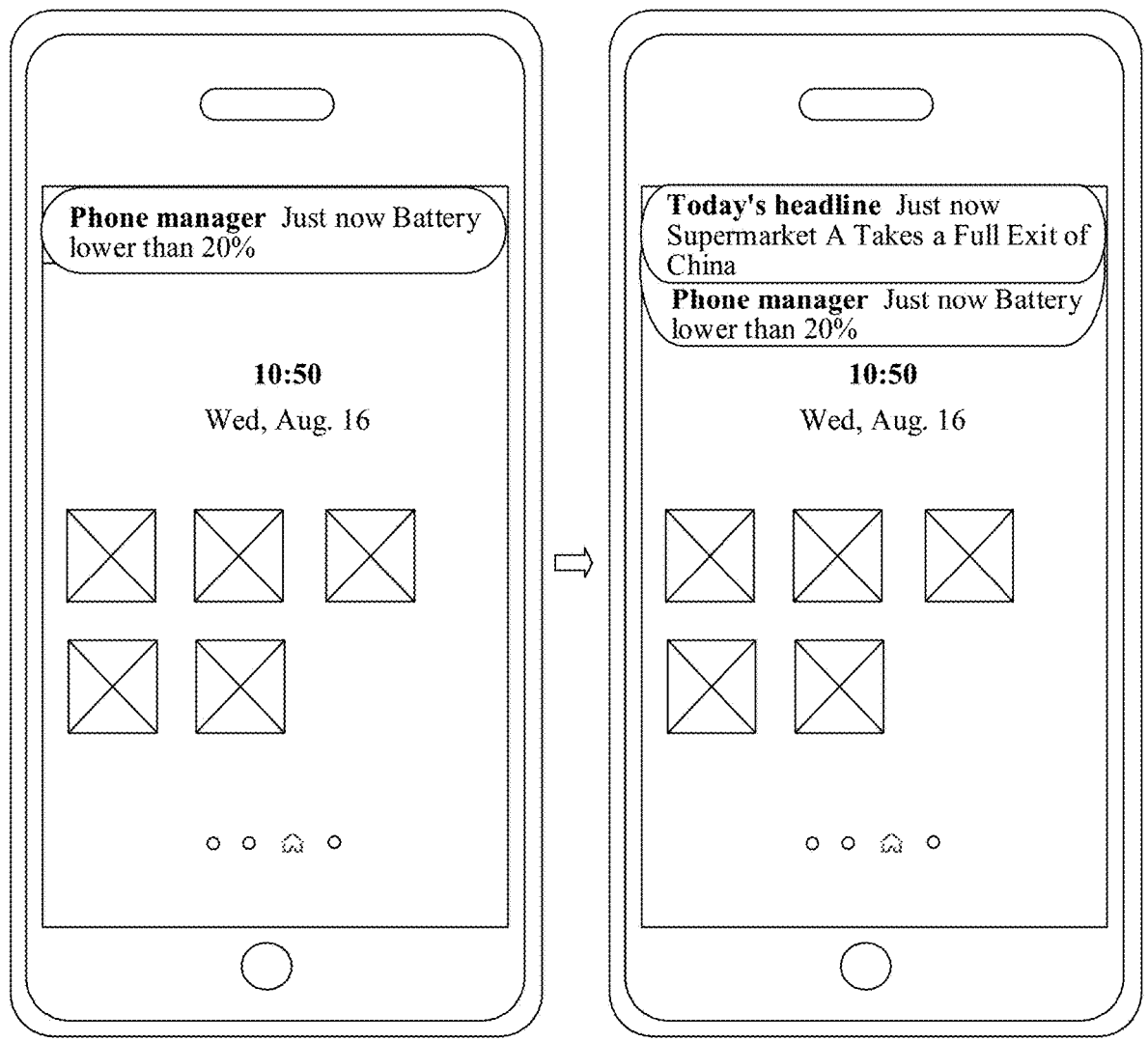
FIG. 2B is another schematic diagram of notifications displayed by a terminal on a current interface.

Two applications, that is, "Today's Headline" and "Phone Manager" are installed on the mobile phone 100. By monitoring notification messages triggered by the two applications, at 10:50, the mobile phone receives a notification message "Supermarket A Takes a Full Exit of the China" pushed by the "Today's Headline" and a notification message "Battery lower than 20%" sent by the "Phone Manager". In this case, if the mobile phone is in a locked state, the mobile phone sends a corresponding notification (such as ring, vibration, or a flashing light), and displays the notification message on a lock screen interface, as shown in FIG. 2A. If the mobile phone is in an unlocked state, the mobile phone sends a corresponding notification, and displays the notification message on a current display interface (such as a desktop), as shown in FIG. 2B.

Figures 1, 2C:
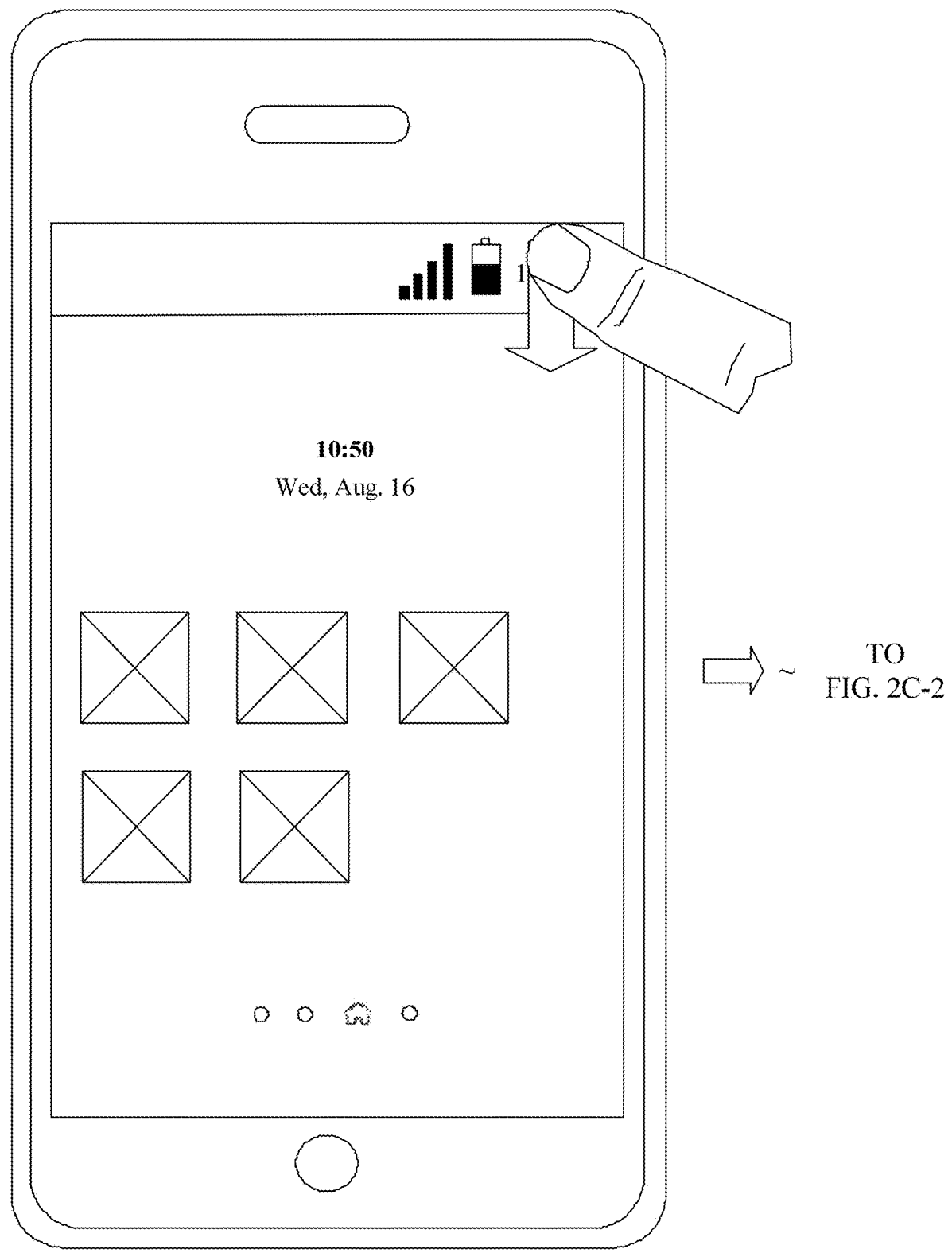
FIG. 2C-1 and FIG. 2C-2 are schematic diagrams of notifications displayed by a terminal on a notification bar display interface.
Figures 2, 2C:
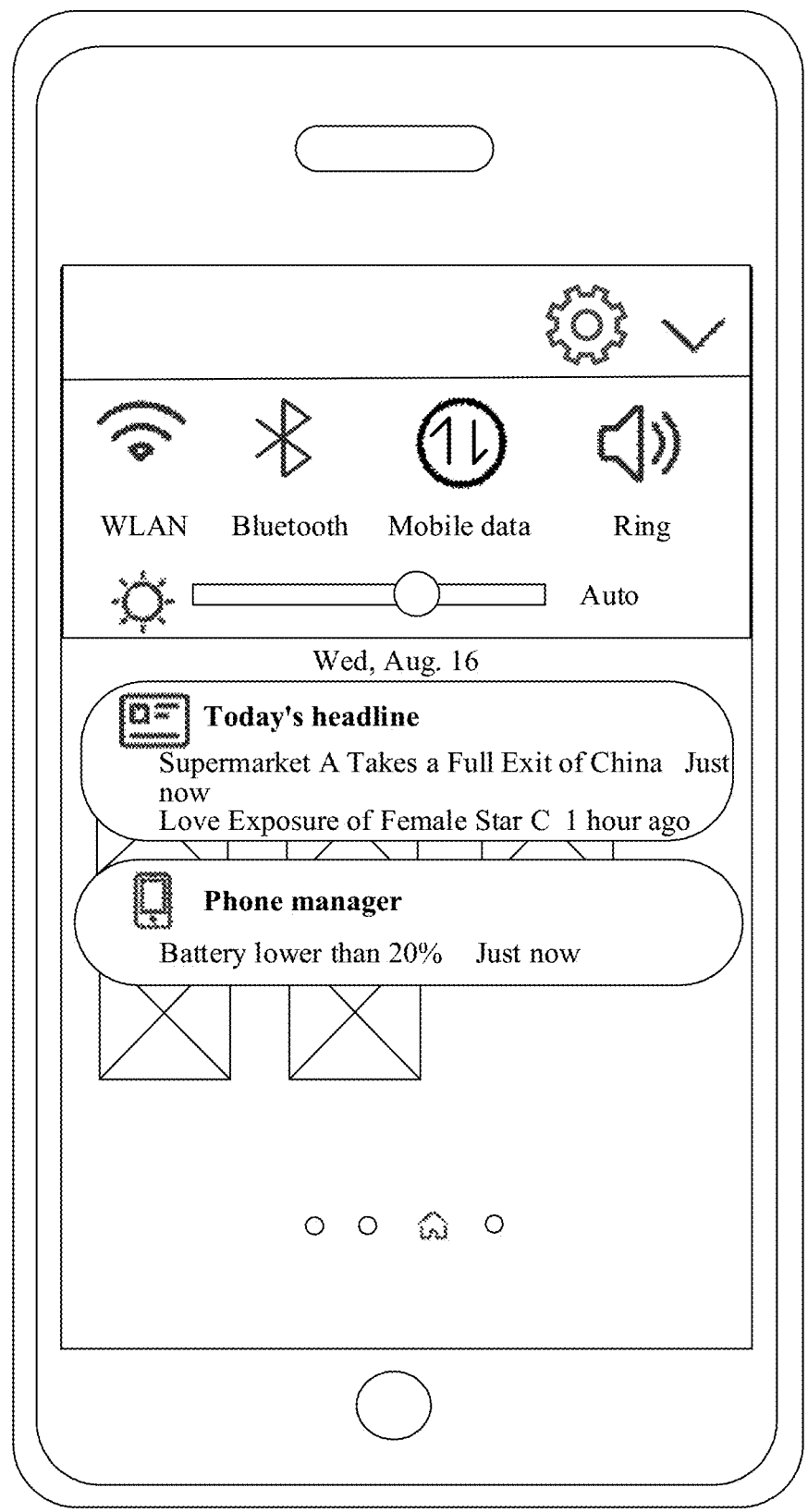
Figures 1, 2D:
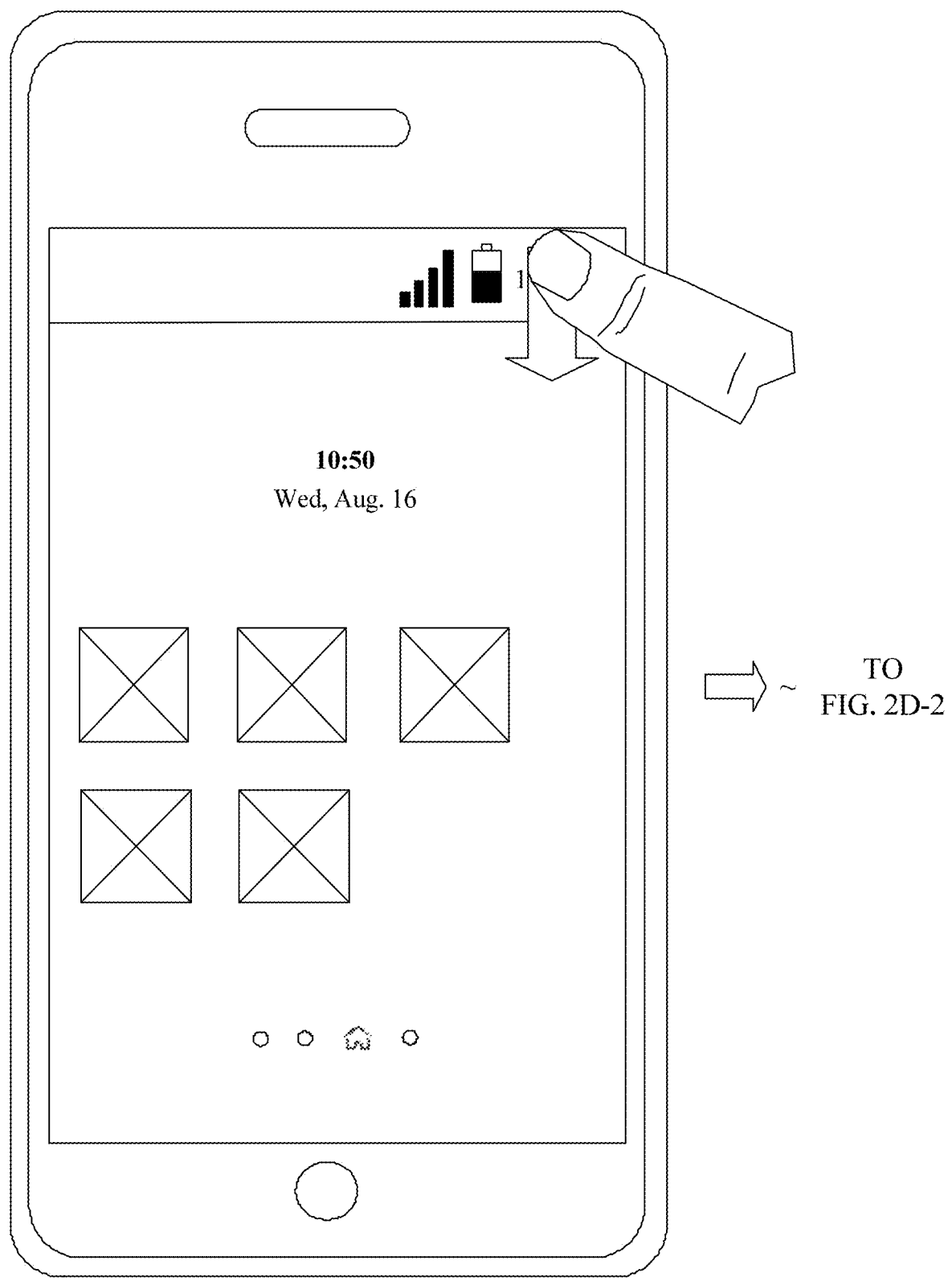
Figures 2, 2D:
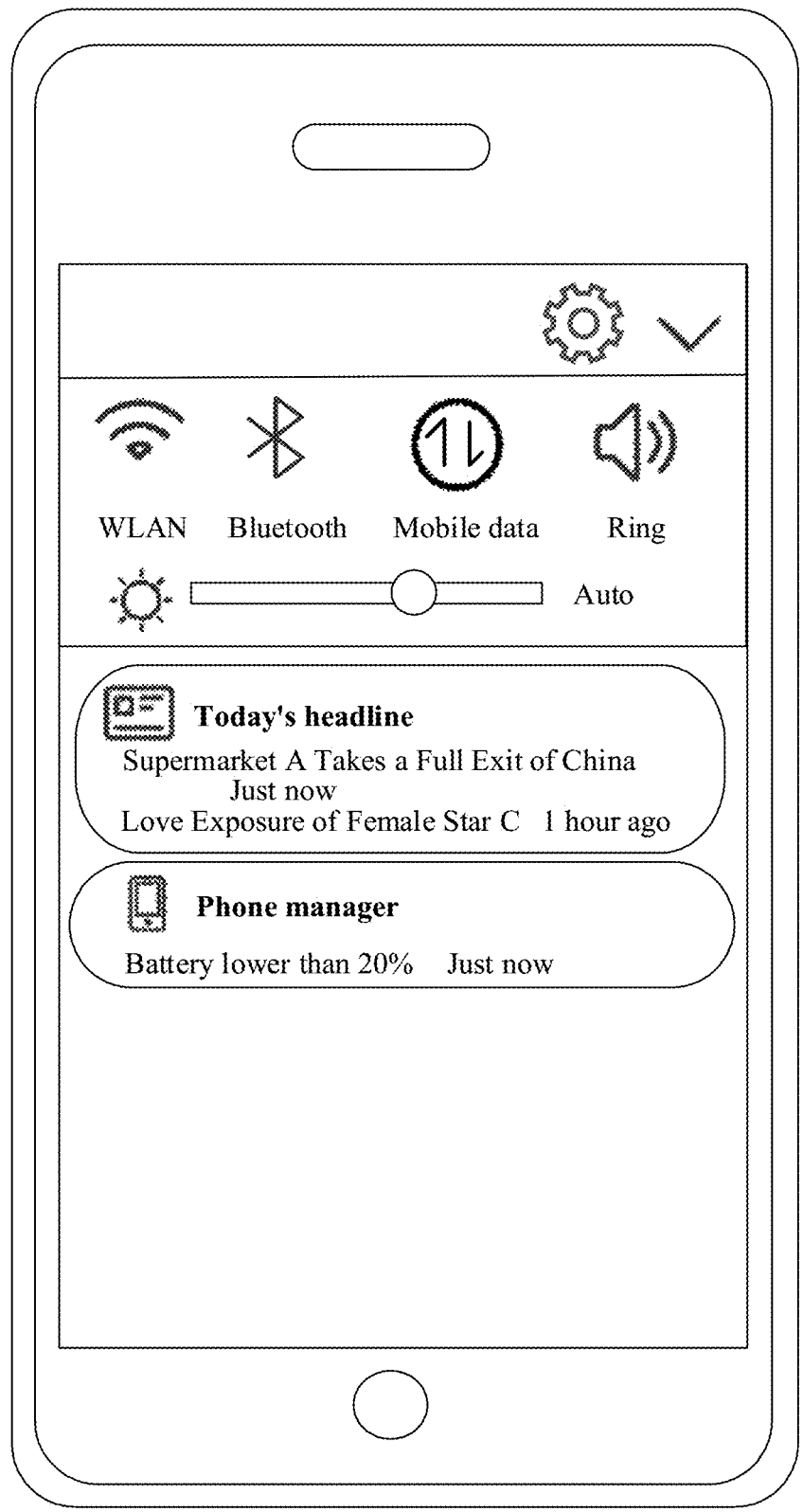

When obtaining an instruction for invoking the notification bar, the mobile phone displays, in a centralized manner on the notification bar, notification messages that are not read by the user. For example, the user slides down from the top of the display screen of the mobile phone to invoke the notification bar, and the mobile phone covers a part of the notification bar on the current display interface, as shown in FIG. 2C-1 and FIG. 2C-2, or covers all the notification bar on the current display interface, as shown in FIG. 2D-1 and FIG. 2D-2, and centralizes the unread notification messages belonging to a same application into a same pane for expanded display.

According to the foregoing embodiment, classification and display are performed based only on the application to which the notification message belongs, which cannot help the user screen effective messages. When there are too many notification messages, the user still needs to search for interesting notification messages one by one for reading, which takes a relatively long time and has relatively low efficiency.

For ease of understanding, the following describes a scenario applicable to the notification display method and the terminal in the embodiments of this application.

Figure 3:
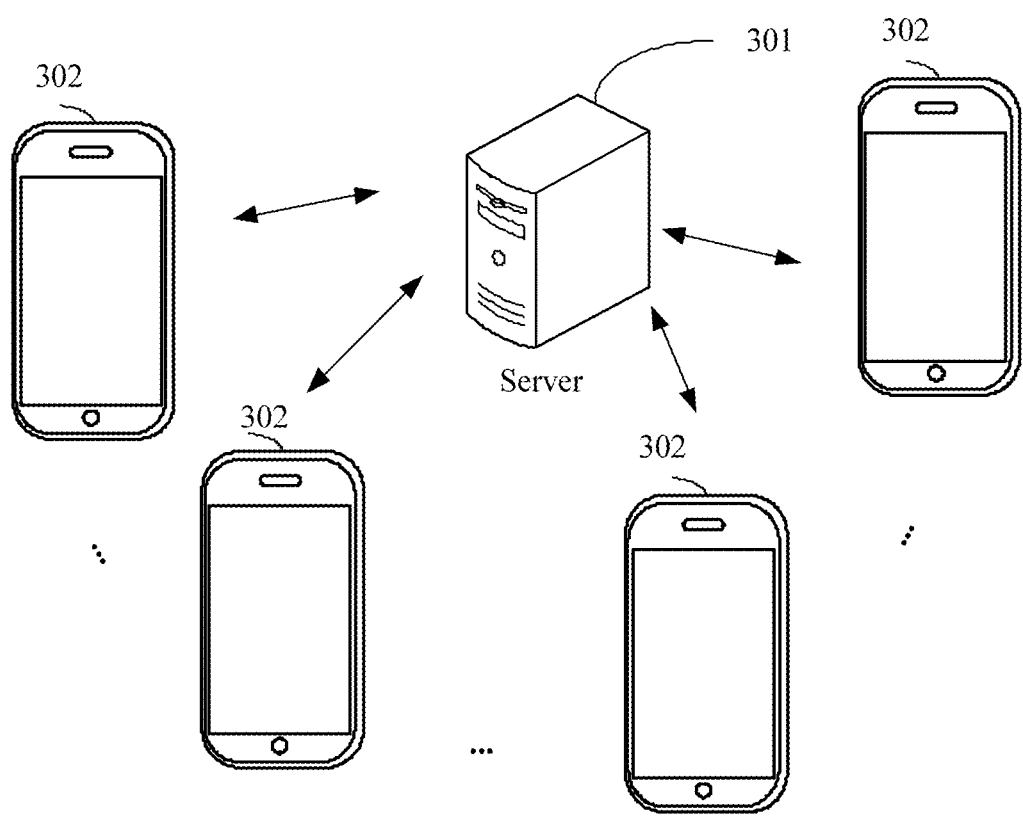
FIG. 3 is a schematic structural diagram of a system to which a notification display method is applied according to an embodiment of this application.

FIG. 3 shows a system to which a notification display method is applied according to an embodiment of this application. The system includes a terminal 302 and a service system that includes at least a server 301. The server 301 is configured to generate a rule and a model that are used to classify notifications in this embodiment of this application. The terminal 302 is configured to classify and display notifications sent by various applications of the terminal.

The server 301 collects a large number of notifications manually labeled with notification types as sample data, obtains, by analyzing the sample data, a plurality of rules used for classification, and obtains classification models by training the sample data through a classification algorithm.

It should be understood that, the sample data collected by the server 301 needs to include as many applications as possible in the market. The sample data may be reported by a user to the server 301 during a process of using the terminal 302, or may be reported by an operation and maintenance engineer to the server 301 by using a test mobile phone.

The rules and the classification models generated by the server 301 may be uploaded to the terminal 302 by a maintenance personnel before delivery of the terminal 302; or the rules and the classification models are automatically sent by the server 301 to the terminal 302 after delivery of the terminal 302; or the rules and the classification models are downloaded, based on a user operation, from the server 301 after delivery of the terminal 302.

It should be understood that, because new applications are continuously launched in the market, the server 301 needs to update the generated rules and the generated classification models periodically or aperiodically, and the terminal 302 downloads the updated rules and the updated classification models from the server 301.

It should be noted that, in addition to the foregoing scenario corresponding to FIG. 3, in some embodiments, the rules and the classification models that are used for classification may be generated by the terminal or another device, and the generation method thereof is the same as the manner in which the server generates the rules and the classification models. Details are not described herein again.

Figure 4:
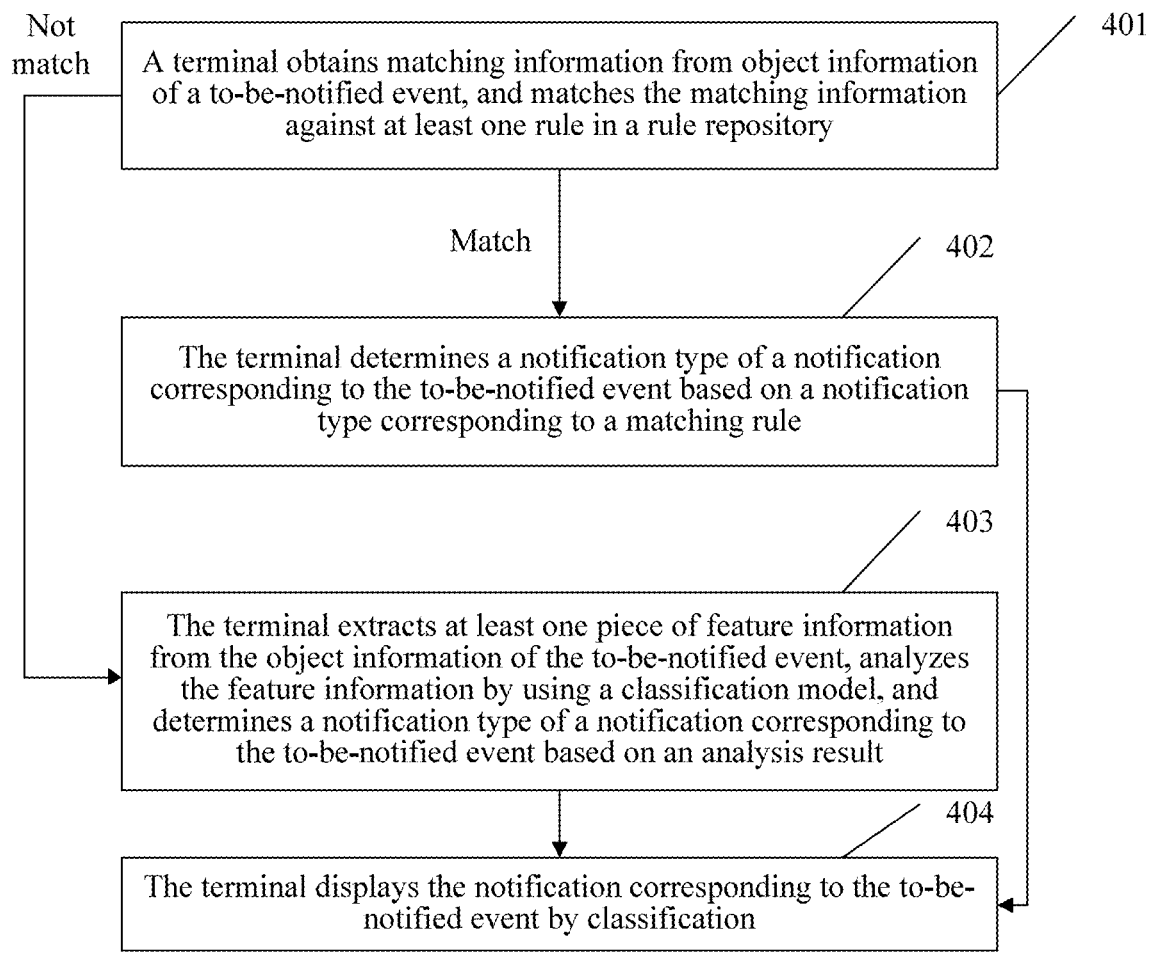
FIG. 4 is a flowchart of an embodiment of a notification display method according to an embodiment of this application.

The following describes a process in which the terminal 302 classifies, based on the classification rules and the classification models, the notifications sent by the applications. Referring to FIG. 4, an embodiment of a notification display method in the embodiments of this application includes the following operations.

401: A terminal obtains matching information from object information of a to-be-notified event, and matches the matching information against at least one rule in a rule repository.

In one embodiment, when there is a to-be-notified event, the terminal obtains the matching information from the object information of the to-be-notified event, and matches the matching information against at least one rule in the rule repository. The object information includes text information, jump information, and application package name information corresponding to the to-be-notified event. Each rule includes at least one condition, and each rule corresponds to one notification type.

It should be understood that, the to-be-notified event may include a local notification event and a push notification event. The local notification event is a notification event triggered by a local application and is a notification form that is based on time behavior, such as alarm clock timing and a to-do reminder. The push notification event is a notification event that is sent by an application service provider to an application client, that is, a notification event obtained by an application of the terminal, such as an application update notification.

It should be understood that the rule repository includes a plurality of rules used for classification, and the rules may be divided into two types: text rules and jump rules.

Specifically, when there is a to-be-notified event, the terminal may first obtain the text information and/or the application package name information of the to-be-notified event, and match the text information and/or the application package name information against the text rules. If the text rule matching fails, the terminal obtains the jump information of the to-be-notified event and matches the jump information against the jump rules. If the jump rule matching fails, the terminal determines that the matching information of the to-be-notified event fails to match the rules in the rule repository.

The following separately describes examples of the text rule and the jump rule.

1. Text Rule

In the embodiments of this application, the text rule may be subdivided into two types: general rules and special rules. Each general rule includes at least one text matching condition and corresponds to one notification type. Each special rule includes at least one text matching condition and an application package name matching condition corresponding to the text matching condition and corresponds to one notification type.

For any general rule, if the text information of the to-be-notified event satisfies a text matching condition in the general rule, it is determined that the matching information of the to-be-notified event matches the general rule, and a notification type corresponding to the general rule is a notification type of a notification corresponding to the to-be-notified event. On the contrary, if the text information of the to-be-notified event dissatisfies a text matching condition in the general rule, it is determined that the matching information of the to-be-notified event does not match the general rule.

For any special rule, if the text information of the to-be-notified event satisfies a text matching condition in the special rule and the application package name information corresponding to the to-be-notified event satisfies the application package name matching condition corresponding to the text matching condition in the special rule, it is determined that the matching information of the to-be-notified event matches the special rule, and a notification type corresponding to the special rule is a notification type of a notification corresponding to the to-be-notified event. On the contrary, if the text information of the to-be-notified event dissatisfies a text matching condition in the special rule and/or the application package name information of the to-be-notified event dissatisfies an application package name matching condition in the special rule, it is determined that the matching information of the to-be-notified event does not match the special rule.

For any to-be-notified event, if a matching general rule or special rule cannot be found, in the rule repository, for matching information of the to-be-notified event, it is determined that the matching information of the to-be-notified event fails to match the text rule.

The following separately describes examples of the general rule and the special rule.

(1) General Rule

In this embodiment, the text matching condition in the general rule corresponds to at least one key phrase and/or keyword and a logical relationship between key phrases and/or keywords.

The text information of the to-be-notified event satisfies the text matching condition in the general rule. Specifically, the text information of the to-be-notified event may include at least one preset key phrase and/or keyword, and the key phrases and/or keywords satisfy a preset logical relationship.

Optionally, in some embodiments, there is no logical relationship between key phrases and/or keywords included in the text matching condition in the general rule. It is considered that the text information of the to-be-notified event satisfies the text matching condition in the general rule, provided that the text information of the to-be-notified event includes the key phrases and/or keywords.

(2) Special Rule

In one embodiment, the text matching condition in the general rule corresponds to at least one key phrase and/or keyword and a logical relationship between key phrases and/or keywords.

The text information of the to-be-notified event satisfies the text matching condition in the special rule. Specifically, the text information of the to-be-notified event may include at least one preset key phrase and/or keyword, and the key phrases and/or keywords satisfy a preset logical relationship.

Optionally, in some embodiments, there is no logical relationship between key phrases and/or keywords included in the text matching condition of the special rule. It is considered that the text information of the to-be-notified event satisfies the text matching condition in the special rule, provided that the text information of the to-be-notified event includes the key phrases and/or keywords.

In this embodiment, the application package name matching condition of the general rule further includes at least one piece of application package name information.

The application package name information corresponding to the to-be-notified event satisfies the application package name matching condition corresponding to the text matching condition in the special rule. Specifically, application package name information corresponding to the preset key phrases and/or keywords included in the to-be-notified event may include the application package name information corresponding to the to-be-notified event.

In some embodiments, the server may generate the text matching condition of the general rule in the following manner.

The server obtains notifications that are sent by different applications and that are manually labeled with notification types, and analyzes text information of the notifications. If notifications whose text information includes some key phrases and/or keywords having a logical relationship always belong to a notification type (recorded as a first notification type), the key phrases and/or keywords and the logical relationship between the key phrases and/or keywords are used as the text matching condition in the general rule, and the text matching condition corresponds to the first notification type. If only notifications that are sent by some applications and whose text information includes some key phrases and/or keywords having a logical relationship belong to a notification type (recorded as a second notification type), the key phrases and/or keywords having the logical relationship and the logical relationship between the key phrases and/or keywords are used as the text matching condition in the special rule, application package name information of the applications is used as the application package name matching condition corresponding to the text matching condition, and the special rule corresponds to the second notification type.

It should be understood that the logical relationship described in this embodiment refers to linguistic logic and a linguistic order, for example, and, or, non, or a sequence of phrases or words.

The following example describes a process in which the server generates the special rule and the general rule.

Scenario A: In the sample data, notifications that include "being downloaded", "being uploaded", "downloading", "uploading", "download failed", and "upload failed" and that are sent by different applications are all labeled as a notification type "operating status". Sample notifications that include "payment succeeds" and "payment successful" and that are sent by the application Alipay and the application WeChat are all labeled as the notification type "consumption". Sample data that includes key phrases "payment succeeds" and "payment successful" and that is sent by an application other than the application Alipay and the application WeChat is labeled as a notification type "risk alert".

A server generates a general rule x. The notification type corresponding to this general rule is "operating status", keywords (key phrases) corresponding to the text matching condition that is included in the general rule are "being", "download", "upload", "ing" and "fail". These keywords (key phrases) satisfy a logical relationship that "download" and "upload" are preceded by the key phrase "being", or key phrases "fail" and "ing" are preceded by the key phrases "download" and "upload".

The server generates two special rules y and z. Key phrases corresponding to the text matching condition that are included in the two special rules are all "payment", "pay" and "successful". These key phrases satisfy a logical relationship that key phrases "payment" or "pay" is preceded by the key phrase "successful". The application package name information corresponding to the application package name matching condition that is included in the special rule y are "Alipay" and "WeChat", and the notification type corresponding to the special rule is "consumption". Application package name information corresponding to the application package name matching condition that is included in the special rule z is application package name information of an application other than "Alipay" and "WeChat", and the notification type corresponding to the special rule is "risk alert".

The rules x, y and z are generated based on the scenario A. The manner in which a terminal matches the matching information against the general rule and the special rule is described in examples as follows:

A terminal triggers to generate two to-be-notified events v and w. The to-be-notified event v is triggered by "Phone Manager", and the text information of the to-be-notified event v is "Arena of Valor" being downloaded". The text information includes keywords "being" and "download" corresponding to the text matching condition in the rule x, and a logical relationship that "download" is preceded by "being" is satisfied. The text information of the to-be-notified event v matches the general rule x. The notification type "operating status" corresponding to the general rule x is the notification type of the notification corresponding to the to-be-notified event v.

Another to-be-notified event w is triggered by "WeChat". The text information of the to-be-notified event w is "DiDi: payment successful". The text information includes keywords "payment" and "successful" corresponding to the text matching condition in the special rule y, and the logical relationship that "payment" is preceded by "successful" is satisfied. The text information of the to-be-notified event w satisfies the text matching condition in the special rule y. The application package name information of the to-be-notified event w "WeChat", which corresponds to "WeChat" in the application package name information in the application package name matching condition in the special rule y. The application package name information of the to-be-notified event w satisfies the application package name matching condition in the special rule y. The matching information of the to-be-notified event w matches the special rule y, and the notification type "consumption" corresponding to the special rule y is the notification type of the notification corresponding to the to-be-notified event w.

2. Jump Rule

In an embodiment of this application, each jump rule includes at least one jump matching condition, and an application package name matching condition corresponding to each jump matching condition, and each jump rule corresponds to a notification type.

For any to-be-notified event, if the jump information of the to-be-notified event satisfies a jump matching condition of any jump rule, and the application package name information of the to-be-notified event satisfies the application package name matching condition corresponding to the jump matching condition, it is determined that the jump information of the to-be-notified event matches the jump rule, and the notification type corresponding to the jump rule is the notification type of the notification corresponding to the to-be-notified event. If the jump information of the to-be-notified event does not satisfy a jump matching condition of any jump rule and/or the application package name information the to-be-notified event does not satisfy the application package name matching condition, it is determined that the jump information of the to-be-notified event does not match any jump rule.

In some embodiments, the jump matching condition may be subdivided into a fuzzy match condition and an exact match condition, and the two jump matching condition are separately described as follows.

(1) Exact Match Condition

In this embodiment, each exact match condition corresponds to some fields, and corresponds to a character string (which may also be referred to as a field value) corresponding to each field.

The terminal obtains all fields in the jump information of the to-be-notified event and the value of each field. If all fields in the jump information are consistent with some fields corresponding to the exact match condition, and the value of each field in the jump information is consistent with the character string corresponding to the field in the exact match condition, the terminal determines that the jump information of the to-be-notified event satisfies the exact match condition.

In one embodiment, the application package name matching condition corresponding to each exact match condition includes at least one piece of application package name information.

The terminal obtains the application package name information corresponding to the to-be-notified event. If the application package name information corresponding to the exact match condition satisfied by the jump information of the to-be-notified event is the same as the application package name information corresponding to the to-be-notified event, the terminal determines that the application package name information of the to-be-notified event satisfies the application package name matching condition corresponding to the exact match condition.

(2) Fuzzy Match Condition

In one embodiment, each fuzzy match condition corresponds to some fields, and corresponds to a character string (which may also be referred to as a field value) corresponding to each field.

The terminal obtains all fields in the jump information of the to-be-notified event and a value of each field. If all fields in the jump information are consistent with several fields corresponding to a fuzzy match condition, and a value of each field in the jump information includes a character string corresponding to a field in an accurate match condition, the terminal determines that the jump information of the to-be-notified event matches the fuzzy match condition.

Specifically, in some embodiments, the several fields corresponding to the fuzzy match condition include a standard field and a user-defined field.

The terminal obtains all standard fields and a value corresponding to each standard field (standard jump information), and all user-defined fields and a value corresponding to each user-defined field (user-defined jump information) that are in the jump information of the to-be-notified event. If all standard fields in the jump information are the same as all standard fields corresponding to the fuzzy match condition, all user-defined fields in the jump information are the same as all user-defined fields corresponding to the fuzzy match condition, a value of each standard field in the jump information is the same as a character string corresponding to the standard field in the fuzzy match condition, and a value of each user-defined field in the jump information includes a character string corresponding to the user-defined field in the fuzzy match condition, the terminal determines that the jump information of the to-be-notified event matches the fuzzy match condition.

In one embodiment, an application package name match condition corresponding to each accurate match condition includes at least one piece of application package name information.

The terminal obtains application package name information corresponding to the to-be-notified event. If application package name information corresponding to a fuzzy match condition matched by the jump information of the to-be-notified event is the same as application package name information corresponding to the to-be-notified event, the terminal determines that the application package name information of the to-be-notified event matches an application package name match condition corresponding to the fuzzy match condition.

In some embodiments, a server configured to generate a classification rule may generate a jump rule in the following manner: For each application, sample notifications with different text information that are sent from an application are collected (A sample notification means a notification manually labeled with a notification type). If all fields included in jump information of notifications labeled with a same notification type sent by the application are the same, and a value of each field is also the same, all fields and a value (character string) of each field that are included in the jump information of the notifications are used as an accurate match condition. Application package name information of the application is used as an application package name match condition, and the application package name match condition corresponds to the accurate match condition.

The following uses an example to describe a process in which the server generates the accurate match condition.

Scenario B: There are 100 notifications that have different text information and that are sent by Tencent Phone Manager in sample data collected by the server. Intent objects (jump information) of the 100 notifications include a Class field. Notification types of the 100 notifications are all labeled as a "Phone Optimization". Class fields of the 100 notifications labeled as "content information" are all "com.tencent.serverfore.QuickLoadActivity". The server stores, in the terminal, the Class field and a value of "com.tencent.server-.fore.QuickLoadActivity" corresponding to the Class field as an accurate match condition of a jump rule, and stores, in the terminal, application package name information (com-.tencent.qqpimsure) of "Tencent Phone Manager" as an application package name match condition of the jump rule. A notification type corresponding to the jump rule is the "Phone Optimization". The jump rule may be specifically stored in the terminal in a form shown in FIG. 5A.

Based on the rule generated in the foregoing scenario B, the following uses a manner in which the terminal matches the matching information against the accurate match condition as an example for description.

The terminal triggers to generate one to-be-notified event. Object information of the to-be-notified event is shown in FIG. 5B. An Intent object (object information) of the to-be-notified event includes a Class field (jump information). A value of the Class filed is "com.tencent.server.fore.QuickLoadActivity". Package name information of the to-be-notified event is "com.tencent.qqpimsure". The terminal determines that a notification type of a notification corresponding to the to-be-notified event is the "Phone Optimization".

For some special applications, all fields included in jump information of notifications that are sent by the special applications and that are labeled as a same notification type are the same, and a value of each field has a same character string. All fields and a same character string in a value of each field that are in the jump information are used as a fuzzy match condition. Application package name information of the application is used as an application package name match condition. The application package name match condition corresponds to the fuzzy match condition.

For some special applications, all fields included in jump information of notifications that are sent by the special applications and that are labeled as a same notification type are the same. Values of standard jump fields are the same, and values of user-defined jump fields have a same character string. Various standard jump fields, values (character strings) of various standard jump fields, various user-defined fields, and a same character string in each user-defined field that are in the jump information are used as a fuzzy match condition. Application package name information of the application is used as an application package name match condition. The application package name match condition corresponds to the fuzzy match condition.

It should be understood that, a rule in the rule repository is obtained by using notifications manually labeled with notification types as sample data for induction. Therefore, specific notification types depend on notification types manually labeled. For example, notifications are classified into the following types: advertisement promotion, content information, social dynamic, phone optimization, running status, consumption, prompt, and immediate communication. A notification type determined according to a rule is one of the foregoing types.

In one embodiment, labeling personnel may classify notifications for a notification being performed (that is, a notification having an ongoing attribute) and a notification not being performed (that is, a notification not having an ongoing attribute). Text rules may be classified into a text rule corresponding to a notification being performed, and a text rule corresponding to a notification not being performed. Jump rules may be classified into a jump rule corresponding to a notification being performed and a jump rule corresponding to a notification not being performed.

In some embodiments, when there is a to-be-notified event on the terminal, if a notification corresponding to the to-be-notified event is the notification being performed, a notification type to which the notification belongs is determined according to a text rule and a jump rule that are corresponding to the notification being performed. If the notification is a notification not being performed, the notification type to which the notification belongs is determined according to a text rule and a jump rule that are corresponding to the notification not being performed.

402. If the matching succeeds, the terminal determines the notification type of the notification corresponding to the to-be-notified event based on a notification type corresponding to the matching rule.

If the text information of the to-be-notified event matches a general rule in the rule repository, a notification type corresponding to the general rule is the notification type of the notification corresponding to the to-be-notified event.

If the text information and the application package name information of the to-be-notified event matches a special rule in the rule repository, a notification type corresponding to the special rule is the notification type of the notification corresponding to the to-be-notified event.

If the jump information of the to-be-notified event matches a jump rule in the rule repository, a notification type corresponding to the jump rule is the notification type of the notification corresponding to the to-be-notified event.

403. If the matching fails, the terminal extracts at least one piece of feature information from the object information of the to-be-notified event, analyzes the feature information by using a classification model, and determines the notification type of the notification corresponding to the to-be-notified event based on an analysis result.

In some embodiments, the classification model may include at least one of or a combination of several of a jump classification model, a text classification model, and a fusion model. The jump classification model is used to obtain a first category based on a text information eigenvector of the notification, the text classification model is used to obtain a second category based on a jump information eigenvector of the notification, and the fusion model is used to obtain a final classification result, that is, the notification type, based on the first category and the second category.

Specifically, if the matching information of the to-be-notified event does not match any rule in the rule repository, the terminal extracts at least one text information eigenvector from the text information of the to-be-notified event, and extracts at least one jump information eigenvector from the jump information of the to-be-notified event; then obtains the first category through analyzing the extracted text information eigenvector by using the text classification model, and obtains the second category through analyzing the extracted jump information eigenvector by using the jump classification model; and finally obtains an analysis result, that is, obtains the notification type of the to-be-notified event through analyzing the first category and the second category by using the fusion model.

More specifically, that the terminal extracts at least one text information eigenvector from the text information of the to-be-notified event may be performed in the following manner: The terminal divides the text information of the to-be-notified event into several words and/or several phrases, and combines the several words and/or the several phrases through vectorization, to obtain the text information eigenvector.

More specifically, that the terminal extracts at least one jump information eigenvector from the jump information of the to-be-notified event may be performed in the following manner: The terminal divides values of all fields in the jump information of the to-be-notified event into several character strings, and combines the several characters through vectorization, to obtain the jump information eigenvector.

Figure 6:
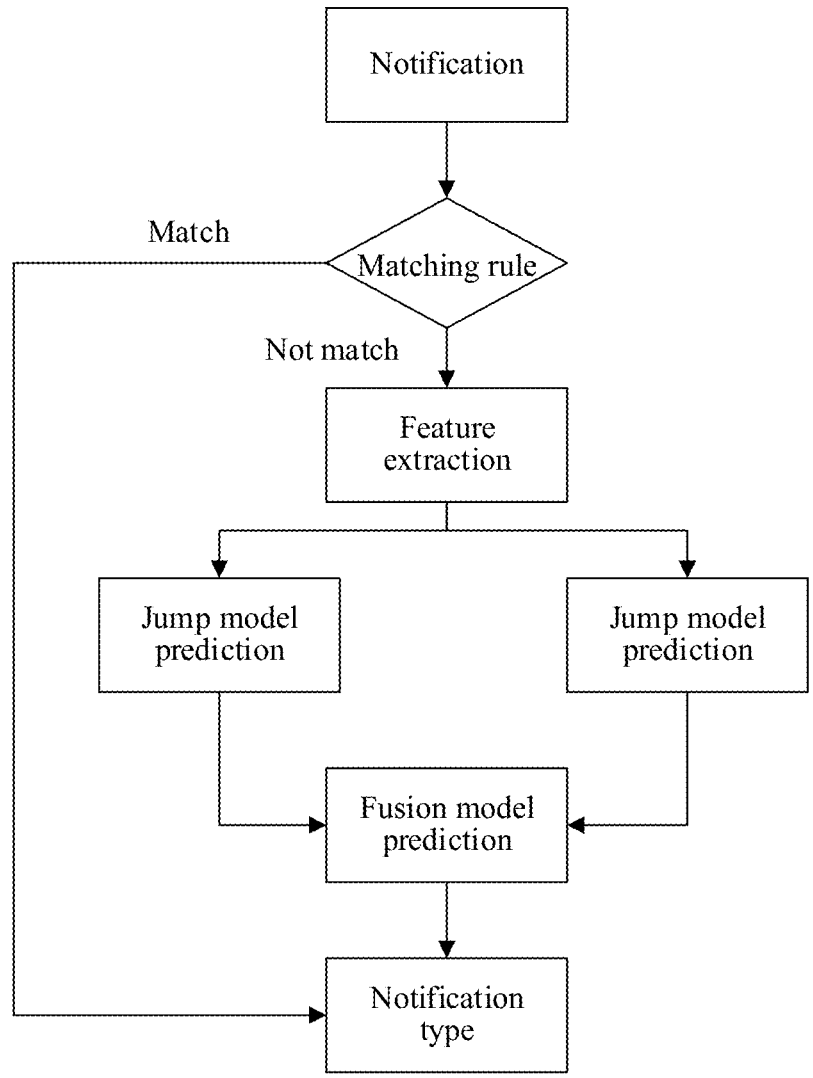
FIG. 6 is a flowchart of matching a notification type against a rule in a rule repository according to an embodiment of this application.

It should be understood that, the classification model may be obtained through training performed by a server on a large quantity of sample data based on data processing logic. In some embodiments in the following, FIG. 6 is a flowchart of training a classification model offline. A training procedure specifically includes the following operations:

S1. Collect notifications of a large quantity of notification types, and record label information as sample data. The label information may be information manually labeled on the notifications.

S2. Respectively extract features (jump information and text information) of various sample data, divide values of fields in the text information into several characters, and combine the several characters through vectorization, to obtain a text information eigenvector. For example, a packet name of xxx.yyy.zzz is resolved into a field of zzz,yyy,zzz, and vectorized by using an encoding technology (such as onehot encoding); and the text information is divided into several key phrases and/or keywords, and the several key phrases and/or keywords are vectorized and combined, to obtain a text information eigenvector.

S3. Generate a jump classification model by using a classification algorithm (such as a logistic regression, a linear vector machine, or a gradient boosted decision tree, GBDT) and based on the jump information eigenvector corresponding to the sample data and a labeled notification type, and generate a jump classification model by using a classification algorithm GBDT) and based on the jump information eigenvector corresponding to the sample data and a labeled notification type.

S4. Generate a fusion model by using a classification algorithm and based on a first category output by the jump classification model, the second category output by a text classification model, and the labeled notification type.

Figure 7:
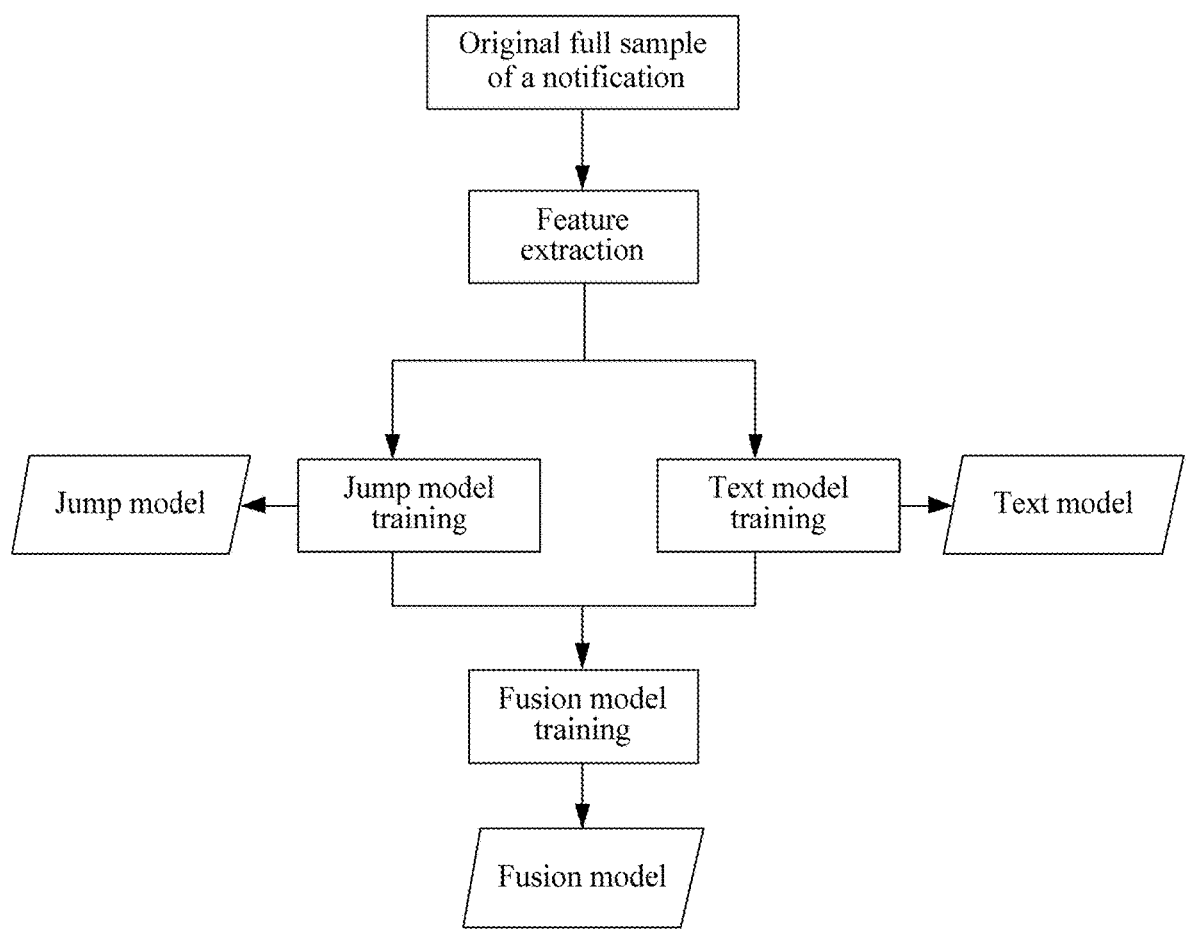
FIG. 7 is a flowchart of an embodiment of generating a classification model by a server according to an embodiment of this application.

Data volume of an application continually increases. Therefore, new notification samples need to be added in a timely manner to update the classification models and the rule repository. For specific details, refer to FIG. 7. FIG. 7 is a flowchart of a case in which a server updates the classification models and the rule repository. An updating procedure specifically includes the following operations.

The server obtains any notification (a target notification) sent by a newly added application. If a notification type of the target notification may be determined according to a rule in the rule repository, the server adds the target notification as sample data after labeling the target notification with a corresponding notification type. If a notification type of the target notification cannot be determined according to a rule in the rule repository, the server obtains, by using the classification models, a notification type (assuming as a notification type A) to which the target notification belongs.

The server obtains notifications sent by a large quantity of newly added applications. For various notifications, the terminal performs high-dimensional clustering on the notifications based on the jump information eigenvector and the text information eigenvector, and divides the notifications into several types. A cluster category corresponding to each type, that is, a notification type corresponding to each type, is manually labeled.

The server determines jump information eigenvector and text information eigenvector that are of the target notification, and similarity between the target notification and various cluster categories, and determines a cluster category having highest similarity as the notification type (assuming as a notification type B) to which the target notification belongs.

If the notification type A is the same as the notification type B, the server uses the target notification as sample data. If the notification type A is different from the notification type B, the notification type to which the target notification belongs is manually inspected, and the server adds the target notification as sample data after the target notification is labeled with a corresponding notification type.

The described "adding the target notification as sample data" in the foregoing updating procedure means that a notification labeled with a corresponding notification type is input into the server as sample data that generates a rule and classification models, and the server updates the rule and the classification models.

Figure 8:
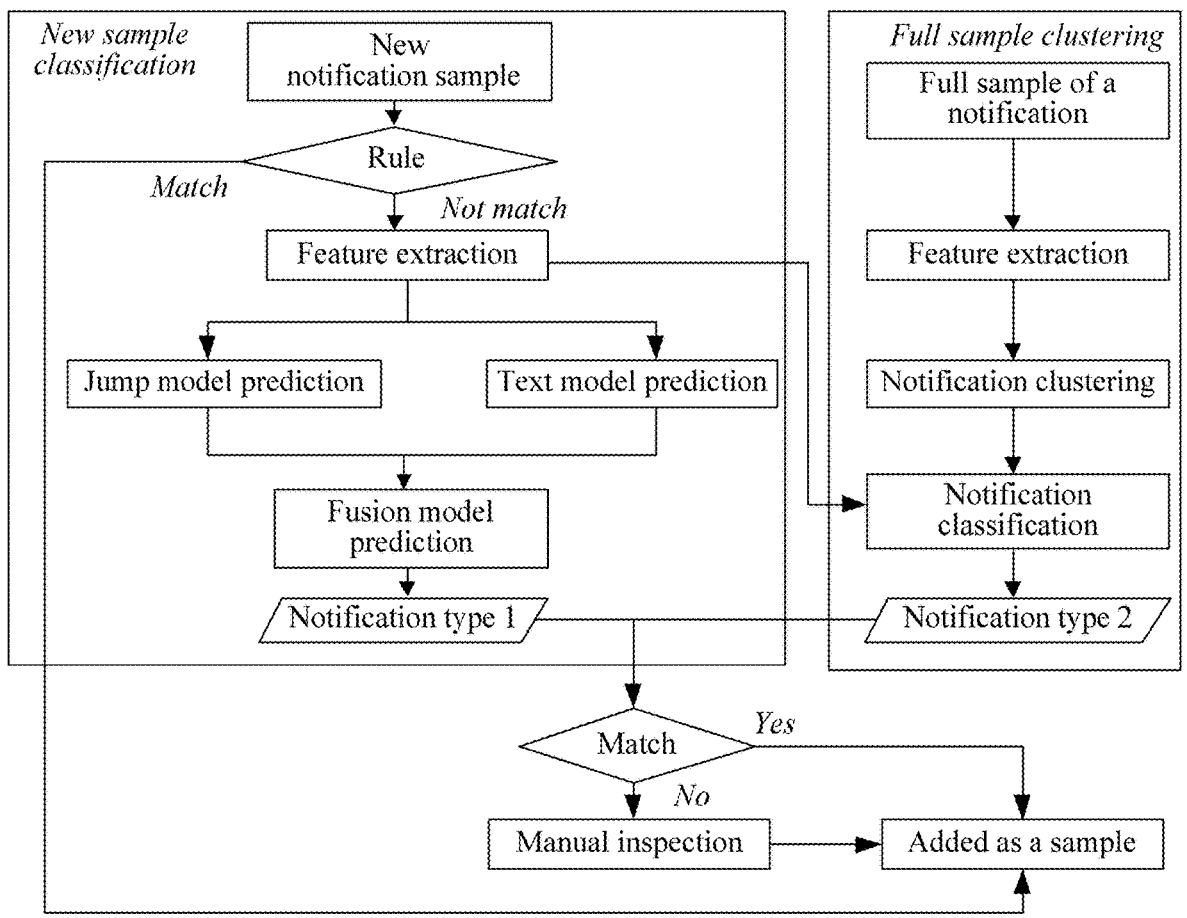
FIG. 8 is a flowchart of an embodiment of updating a classification model by a server according to an embodiment of this application.

In addition to the foregoing updating manner described in FIG. 7, the server may further perform updating based on a feedback sent by a user by using a terminal. Specifically, FIG. 8 is a flowchart of that a server updates classification models and a rule repository. An updating procedure specifically includes the following operations:

A terminal determines a notification type (assuming as a notification type C) of a notification based on classification models or a rule in the rule repository. A user performs feedback on the classification result, and if the user feeds back that the result has an error, the terminal reports the error to a server.

The server counts, based on errors reported by various terminals, error times corresponding to each notification. If counted error times reach a threshold, the server calculates jump information eigenvector and text information eigenvector that are of a notification, and similarity between the notification and various cluster categories, and determines a cluster category having highest similarity as the notification type (assuming as a notification type D) to which the notification belongs.

If the server determines that the notification type C is the same as the notification type D, whether a category of the notification is incorrect is manually inspected. That is, whether the notification belongs to the notification type C (the notification type D) is manually determined. If the incorrect category of the notification is manually inspected and found, the notification type to which the notification belongs is labeled again, and the notification after being labeled again is entered as sample data to the server. The server updates the rule and the classification models.

404. The terminal displays a notification corresponding to the to-be-notified event by classification.

Display mode I: The terminal displays a notification of a same notification type in a same display pane in a centralized manner.

Specifically, the terminal may perform displaying in various display panes in any one of the following manners.

Display mode 1: Display various notifications in corresponding display panes in expanded form.

In an optional manner, the various notifications in corresponding display panes may be sorted in a descending sequence in phrases of obtaining time.

The following uses an actual scenario as an example for description.

Scenario C: A terminal obtains a notification 9033 sent by an "Arena of Valor" 5 hours ago, a notification 9032 sent by a "Ele.me" 2 hours ago, a notification 9023 sent by a "Tencent News" and a notification 9013 sent by a "Security Center" 1 hour ago, a notification 9022 sent by a "Sina News" 10 minutes ago, a notification 9031 sent by a "Jingdong Mall" 7 minutes ago, a notification 9012 sent by a "SmartCare" 5 minutes ago, and a notification 9011 sent by a "Phone Manager" and a notification 9021 sent by a "Today's Headline" 1 minute ago. The terminal determines that a notification type to which the 9011, 9012, and 9013 belong is a "smart notification", a notification type to which the 9021, 9022, and 9023 belong is a "content information", and a notification type to which the 9031, 9032, and 9033 belong is an "advertisement promotion".

Figure 9A:
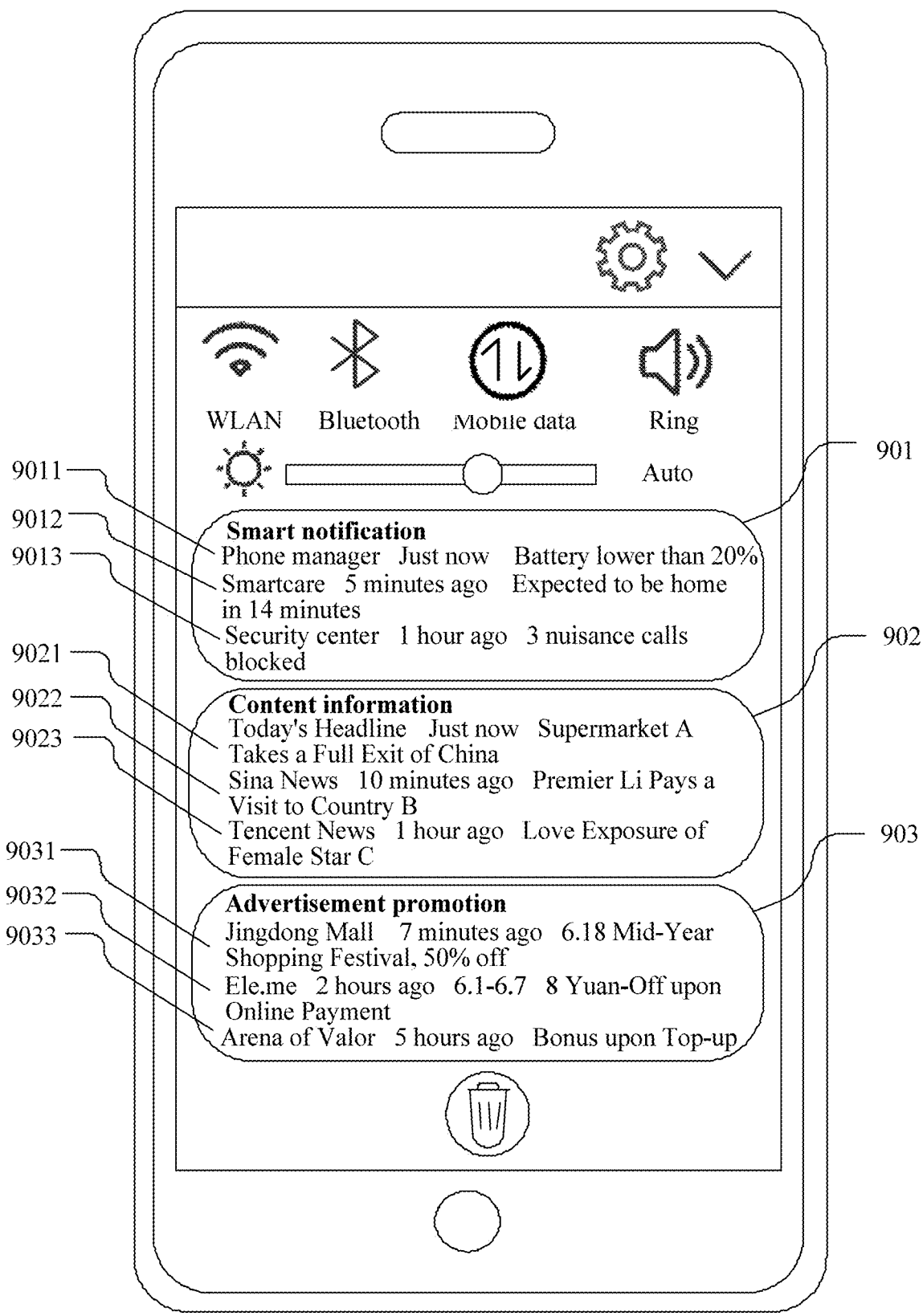
FIG. 9A is a schematic diagram of notifications displayed on a notification bar display interface according to an embodiment of this application.

The terminal displays notifications of a same notification type in a pane in a centralized manner, that is, displays the 9011, 9012, and 9012 in a pane 901 in a centralized manner, displays the 9021, 9022, and 9023 in a pane 902 in a centralized manner, and displays the 9031, 9032, and 9033 in a pane 903 in a centralized manner, and displays notifications in various panes in the foregoing display mode 1, as shown in FIG. 9A.

Display mode 2: Display a notification in a corresponding display pane based on a display mode corresponding to a priority of the notification.

Specifically, for any notification, the terminal obtains a priority of the notification, and determines a display mode of the notification in a corresponding display pane based on the priority. The display mode includes: displaying in a first mode or displaying in a second mode, where text content displayed in the first mode is more than text content displayed in the second mode.

Optionally, in some embodiments, displaying in the first mode may mean displaying in expanded form or fully displaying, the displaying in expanded form means that a part or all of text information of a notification is displayed in expanded form, and the fully displaying means that full text information of a notification is displayed, or text in text information of a notification is displayed. Displaying in the second mode may mean displaying in collapsed form or briefly displaying, the displaying in collapsed form means that text information of a notification is hidden and displayed in one message that indicates a quantity of collapsed notification, or text information of only one notification is displayed and text information of other notifications is hidden, and the briefly displaying means that a digest of text information of a notification, or a title of a notification, or another piece of brief content extracted from text information, is displayed.

Optionally, in some embodiments, when the terminal displays a notification in the second mode the terminal displays the notification in the first mode in response to detecting an entered operation performed on the notification.

In this embodiment of this application, the priority of the notification is used to identify the notification as an important notification or an unimportant notification. Specifically, that the terminal determines a display mode of the notification in a corresponding display pane based on the priority includes: displaying an important notification in the first mode in a corresponding pane, and displaying an unimportant notification in the second mode in a corresponding pane.

In some embodiments, a priority of a notification may be determined based on priority information. The priority information may at least include as follows: first priority information corresponding to a notification type, second priority information of an application corresponding to a notification, and user usage habit information corresponding to the notification. The following respectively describes the information in detail.

(1) First Priority Information Corresponding to a Notification Type

The first priority information corresponding to a notification type is used to identify a priority of the notification type. The priority of the notification type is preset by operating and maintenance personnel based on a service requirement. In a possible design, the priority may be modified based on a click frequency and/or a delete frequency from a user on the notification type. Specifically, a priority of a notification type having a corresponding click frequency greater than a preset value is modified to be higher, and a priority of a notification type having a corresponding delete frequency greater than a preset value is modified to be lower. In another possible design, the priority may be manually modified by a user on the terminal.

Specifically, in a possible design, when based on a service requirement, a priority corresponding to an important notification type is set to be high, a priority corresponding to an unimportant notification type is set to be low, and the first priority information is used to identify the priority of the notification type as high or low.

That the terminal determines a priority of a notification based on first priority information corresponding to a notification type specifically includes: if the first priority information corresponding to the notification type to which the notification belongs indicates that the priority of the notification type is high, determining that the priority of the notification is high, and displaying the notification in a corresponding pane in the first mode; or if the first priority information corresponding to the notification type to which the notification belongs indicates that the priority of the notification type is low, determining that the priority of the notification is low, displaying the notification in a corresponding pane in the second mode, and when detecting an expanded operation entered by a user for the notification, displaying, by the terminal, the notification in the second mode.

Figure 9B:
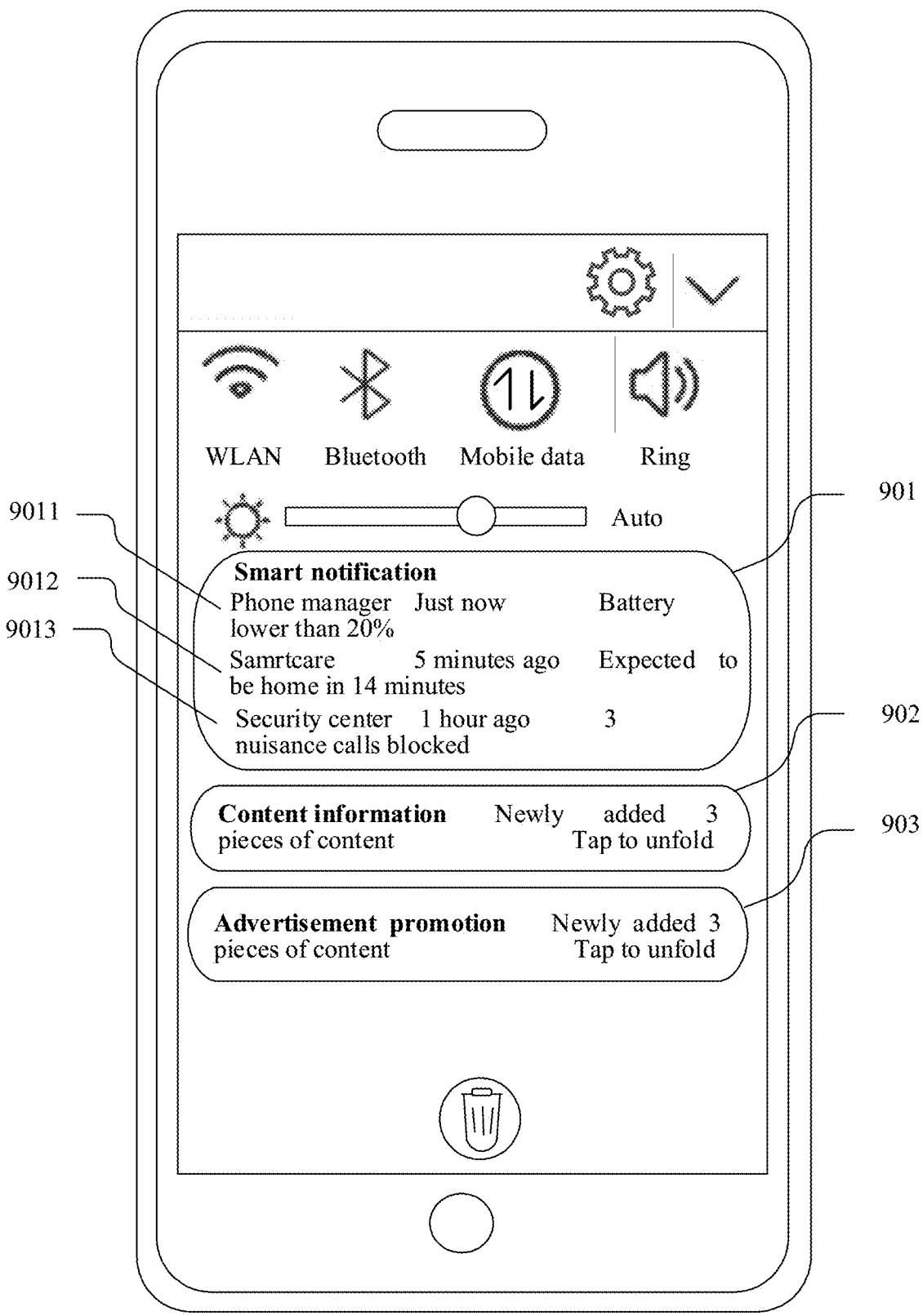
FIG. 9B is a schematic diagram of notifications displayed on a notification bar display interface according to an embodiment of this application.
Figures 1, 9C:
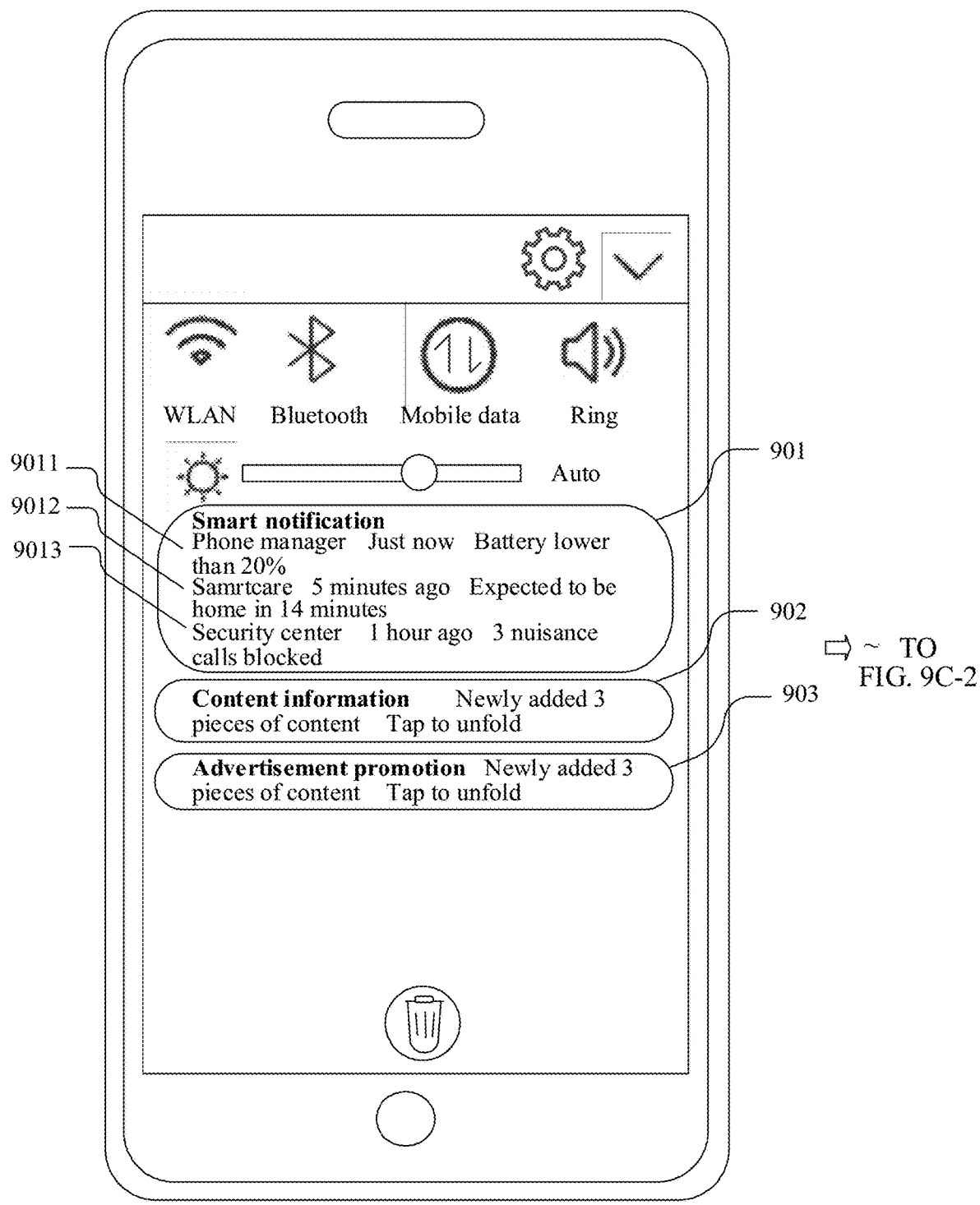
Figures 2, 9C:
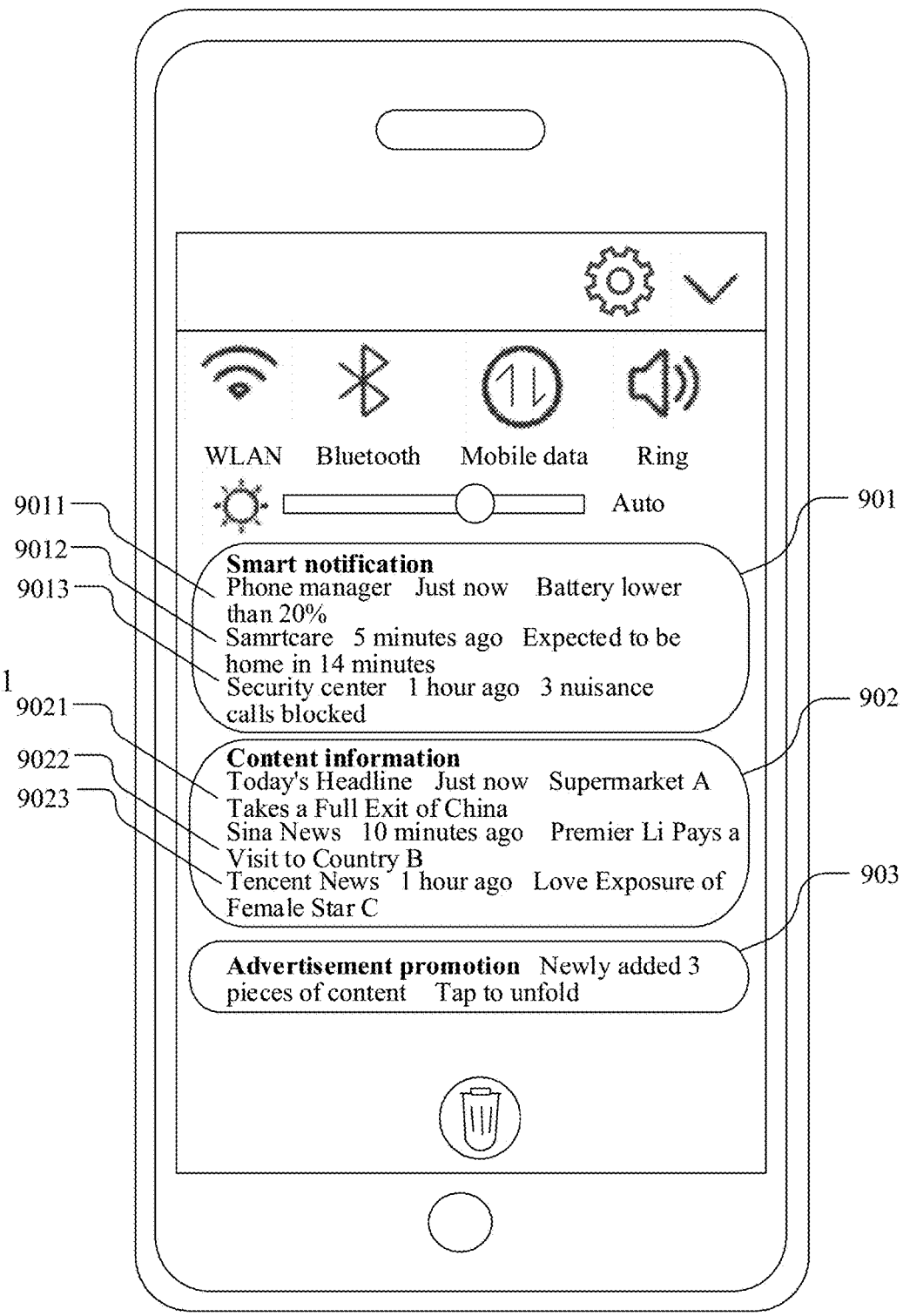

The foregoing scenario C is used as an example. In the terminal, a priority corresponding to the notification type "smart notification" is high (first priority information), and priorities corresponding to the notification type "advertisement promotion" and "content information" are low (first priority information). The terminal displays notifications in the notification type "smart notification" subsequently in expanded form (in the first mode), performs sorting based on a descending sequence in phrases of obtaining time, and displays notifications in the notification type "content information" and "advertisement promotion" in collapsed form (in the second mode), as shown in FIG. 9B. A user taps "tap to unfold" (unfold operation) in the pane 902 on a display interface corresponding to FIG. 9B. The terminal responds to the instruction, and displays notifications in the pane 902 in expanded form (in the second mode), as shown in FIG. 9C-1 and FIG. 9C-2.

(2) Second Priority Information of an Application Corresponding to the Notification The second priority information is used to identify a priority of an application. The priority may be manually set by a user on a terminal, or the priority may be determined by the terminal based on operation data of a user on the application.

In a possible design, the priority of the application is divided into two levels: high and low. If times of a user tapping an icon of an application on a desktop exceed preset times, or an accumulated duration of a user using an application exceeds a preset duration, a priority of the application is high, or if a duration in which a user does not use an application exceeds a preset duration, a priority of the application is low. That the terminal determines a priority of a notification based on second priority information corresponding to an application to which the notification belongs specifically includes: if the second priority information corresponding to the application to which the notification belongs indicates that the priority of the application is high, determining that the priority of the notification is high, and displaying the notification in a corresponding pane in the first mode; or if the second priority information corresponding to the application to which the notification belongs indicates that the priority of the application is low, determining that the priority of the notification is low, displaying the notification in a corresponding pane in the second mode, and when detecting an expanded operation entered by a user for the notification, displaying, by the terminal, the notification in the second mode.

(3) User Usage Habit Information Corresponding to the Notification

In this embodiment of this application, user usage habit information may include at least one of the following: user historical notification tapping frequency information, user historical notification deletion frequency information, user profile information, user habit setting information.

The user profile information is provided by a user profile platform. The user profile information specifically may perform listening generation by using an entered operation (such as, a tap operation, a search operation, or a browsing operation), used to indicate user preference, of a user on the terminal.

In a possible embodiment, that the terminal determines a priority of a notification based on user usage habit information corresponding to the notification specifically includes: if text information of the notification matches user profile information, determining that the priority of the notification is high, and displaying the notification in the second mode.

Figure 9D:
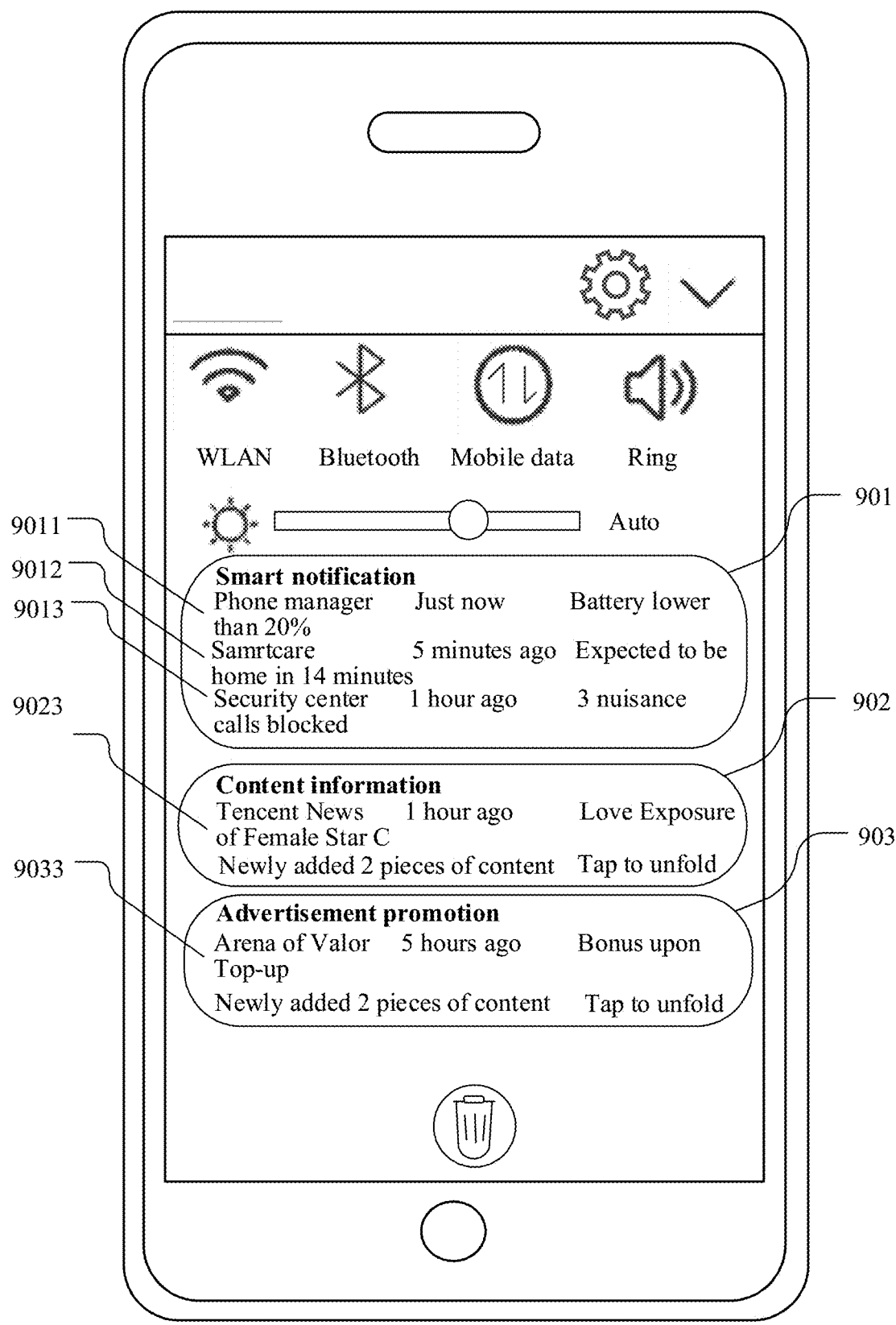
FIG. 9D is a schematic diagram of notifications displayed on a notification bar display interface according to an embodiment of this application.

The foregoing scenario C is used as an example. In the terminal, a priority corresponding to the notification type "smart notification" is high (first priority information), and priorities corresponding to the notification type "advertisement promotion" and "content information" are low (first priority information). If a user usually browses entertainment category news, the user profile platform adds an "entertainment gossip" on user profile information based on such behavior. If the user further enjoys playing a game of "Arena of Valor" and usually uses the application of "Arena of Valor", the user profile platform adds an "Arena of Valor" on the user profile information based on such behavior. The notification 9033 matches "Arena of Valor", and the notification 9023 matches "entertainment gossip", so that the terminal determines that priorities of the two notifications are high, displays the two notifications in their corresponding panes in expanded form, and displays the remaining notifications in their corresponding panes based on priorities that are respectively of the remaining notifications and that are determined based on the first priority information, as shown in FIG. 9D.

In a possible embodiment, that the terminal determines a priority of a notification based on user usage habit information corresponding to the notification specifically includes: if text information of the notification does not match user profile information, determining that the priority of the notification is low, displaying the notification in a corresponding pane in the second mode, and when detecting an expanded operation entered by the user for the notification, displaying, by the terminal, the notification in the first mode.

The user historical notification deletion frequency information is information obtained by the terminal through counting tap delete operations performed by the user for a notification historically. The tap delete operation means a delete operation performed by the user for a notification.

In a possible embodiment, that the terminal determines the priority of the notification based on the user usage habit information corresponding to the notification specifically includes: if times of the user tapping to delete a notification that belongs to a notification type and that is sent by an application (user historical notification deletion frequency information) exceed preset times, determining that a priority of the notification that belongs to the notification type and that is sent by the application is low, displaying the notification in a corresponding pane in the second mode, and when detecting an expanded operation entered by the user for the notification, displaying the notification in the first mode.

Figure 9E:
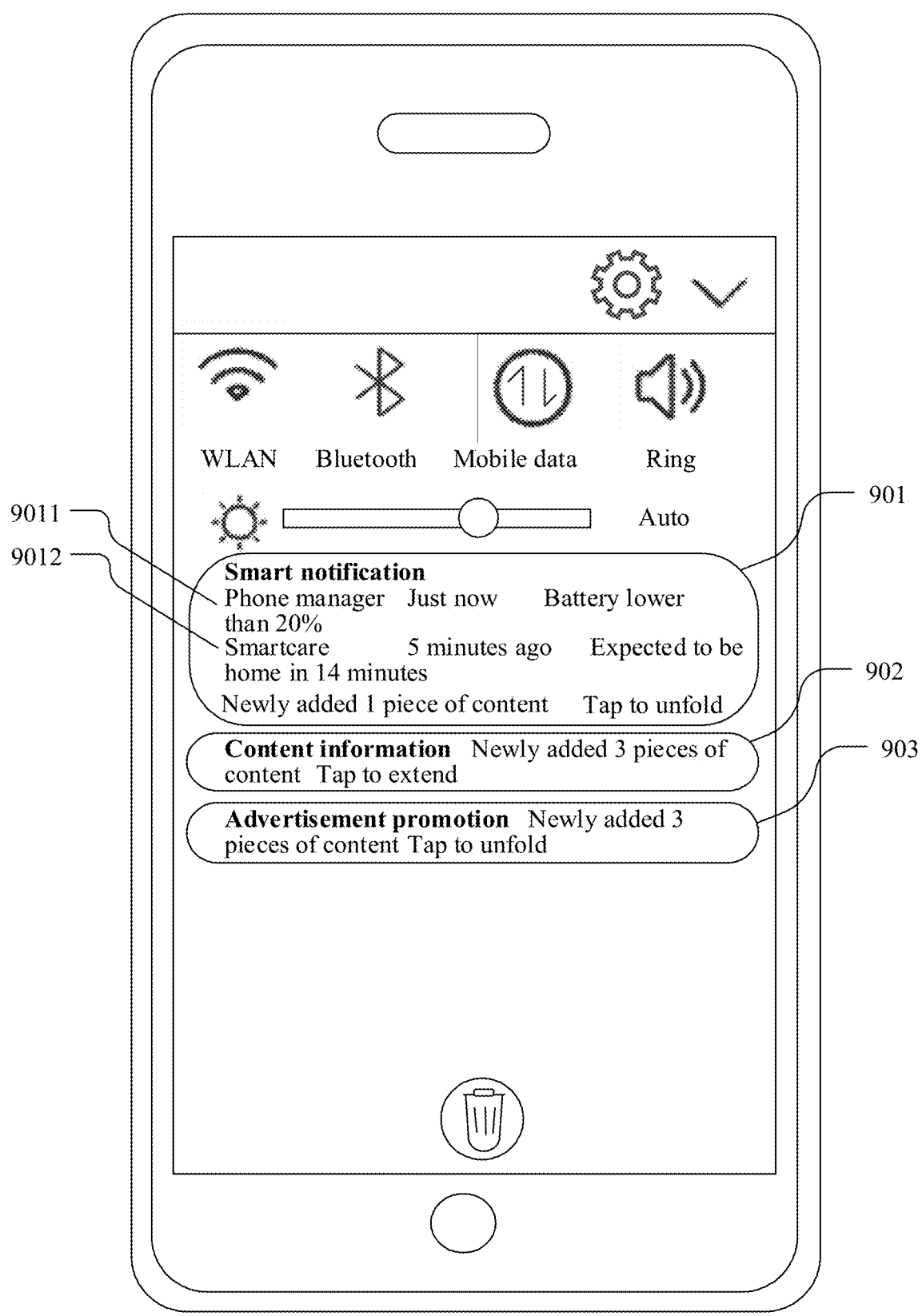
FIG. 9E is a schematic diagram of notifications displayed on a notification bar display interface according to an embodiment of this application.

The foregoing scenario C is used as an example. In the terminal, a priority corresponding to the notification type "smart notification" is high (first priority information), and priorities corresponding to the notification type "advertisement promotion" and "content information" are low (first priority information). Before obtaining the notification 9013, the user taps to delete a notification of the "smart notification" category sent by a "Security Center" for 6 times, exceeding 5 times (preset times). The terminal determines, based on the user historical notification deletion frequency information, that a priority of the notification 9013 that is sent by the "Security Center" and that is in the pane 901 corresponding to the "Smart notification" is low, displays the notification in collapsed form, and displays the remaining notifications in their corresponding panes based on priorities that are respectively of the remaining notifications and that are determined based on the first priority information, as shown in FIG. 9E.

In a possible embodiment, each notification type may include several notification subtypes. That the terminal determines the priority of the notification based on the user usage habit information corresponding to the notification specifically includes: if times of the user tapping to delete a notification of a notification subtype (user historical notification deletion frequency information) exceed a preset value, determining that a priority of the notification belonging to the notification subtype is low, displaying the notification in a corresponding pane in the second mode, and when detecting an expanded operation entered by the user for the notification, displaying the notification in the first mode.

Figure 9F:
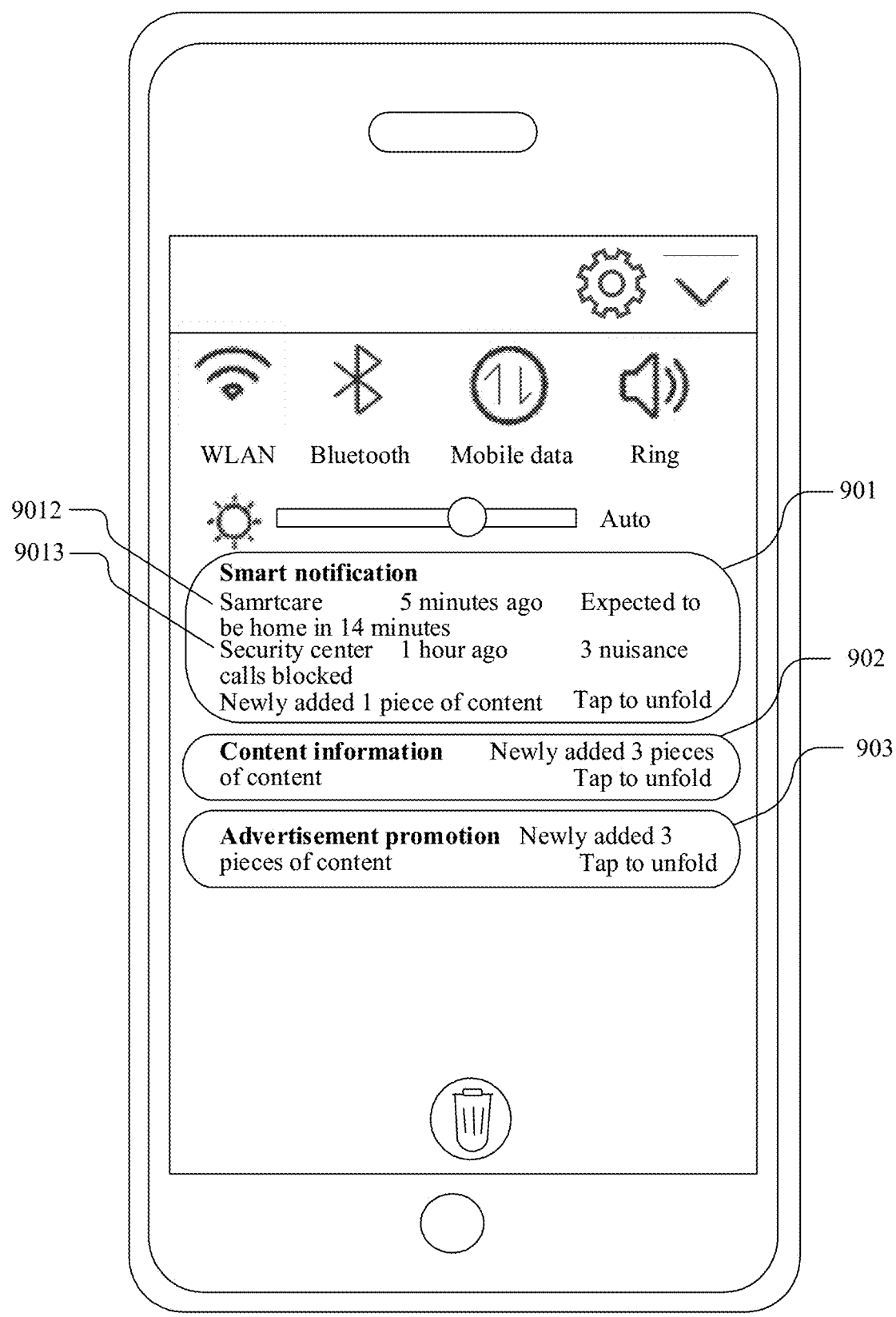
FIG. 9F is a schematic diagram of notifications displayed on a notification bar display interface according to an embodiment of this application.
Figures 1, 9G:
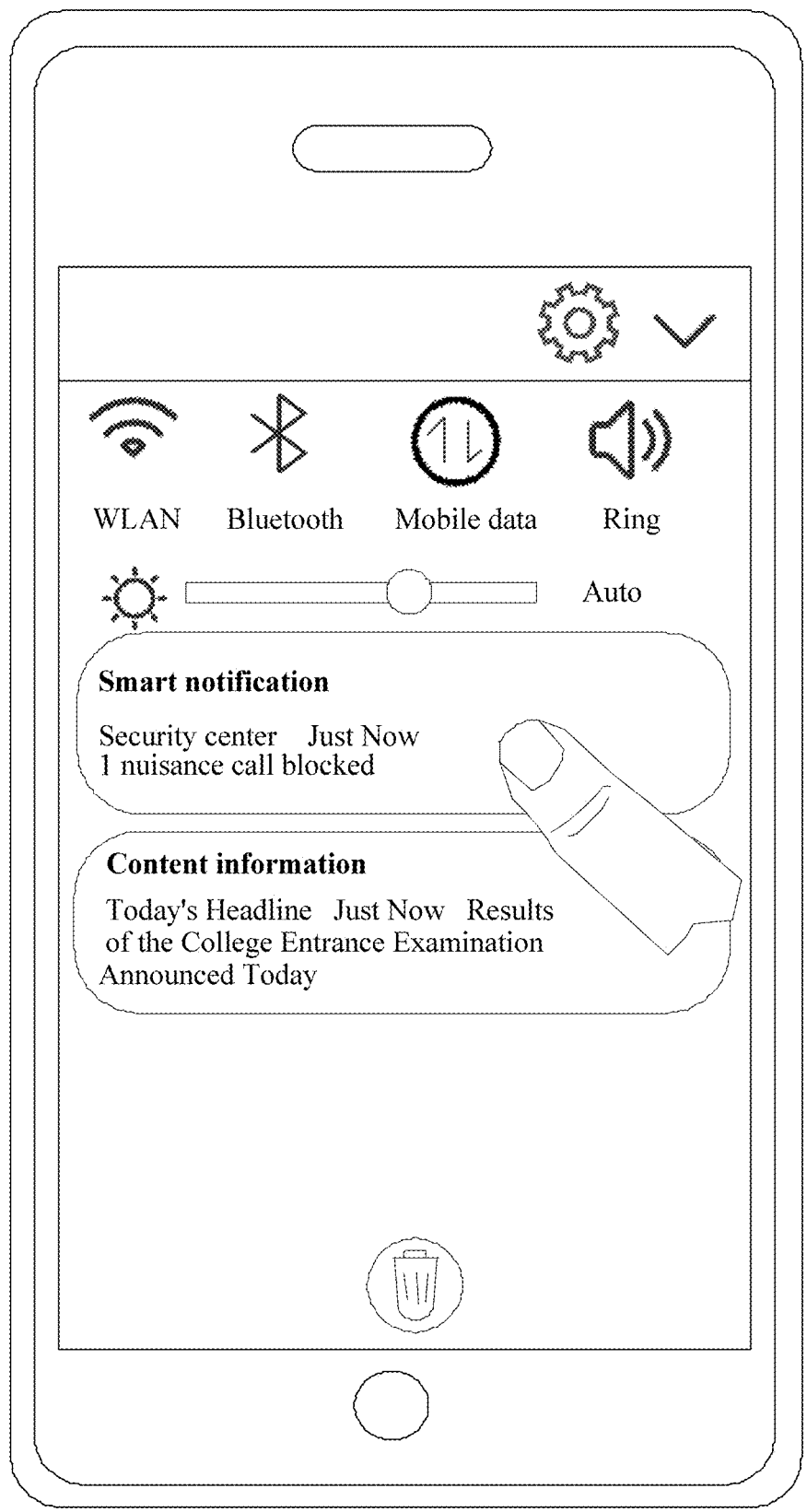
Figures 2, 9G:
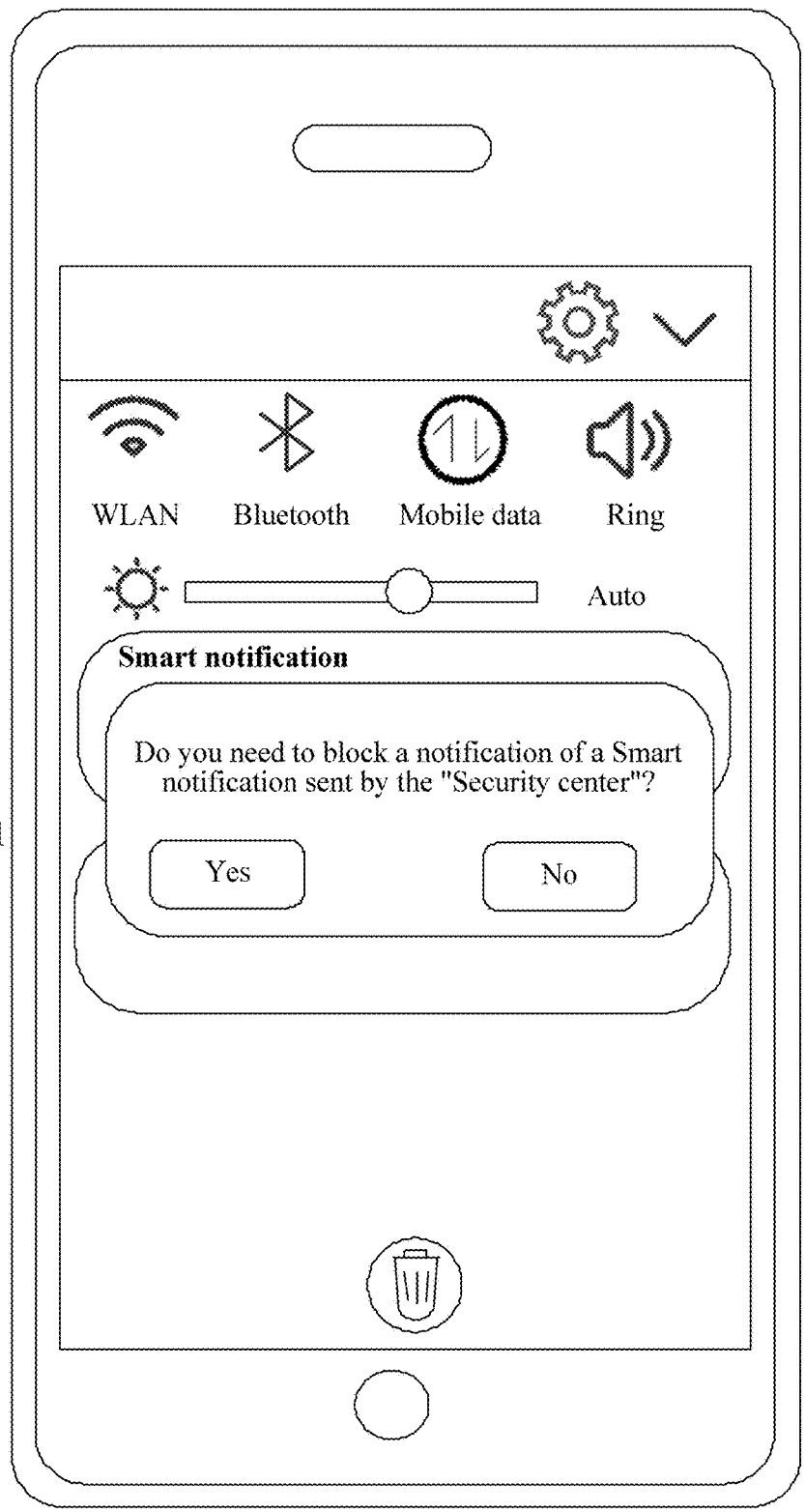
Figures 3, 9G:
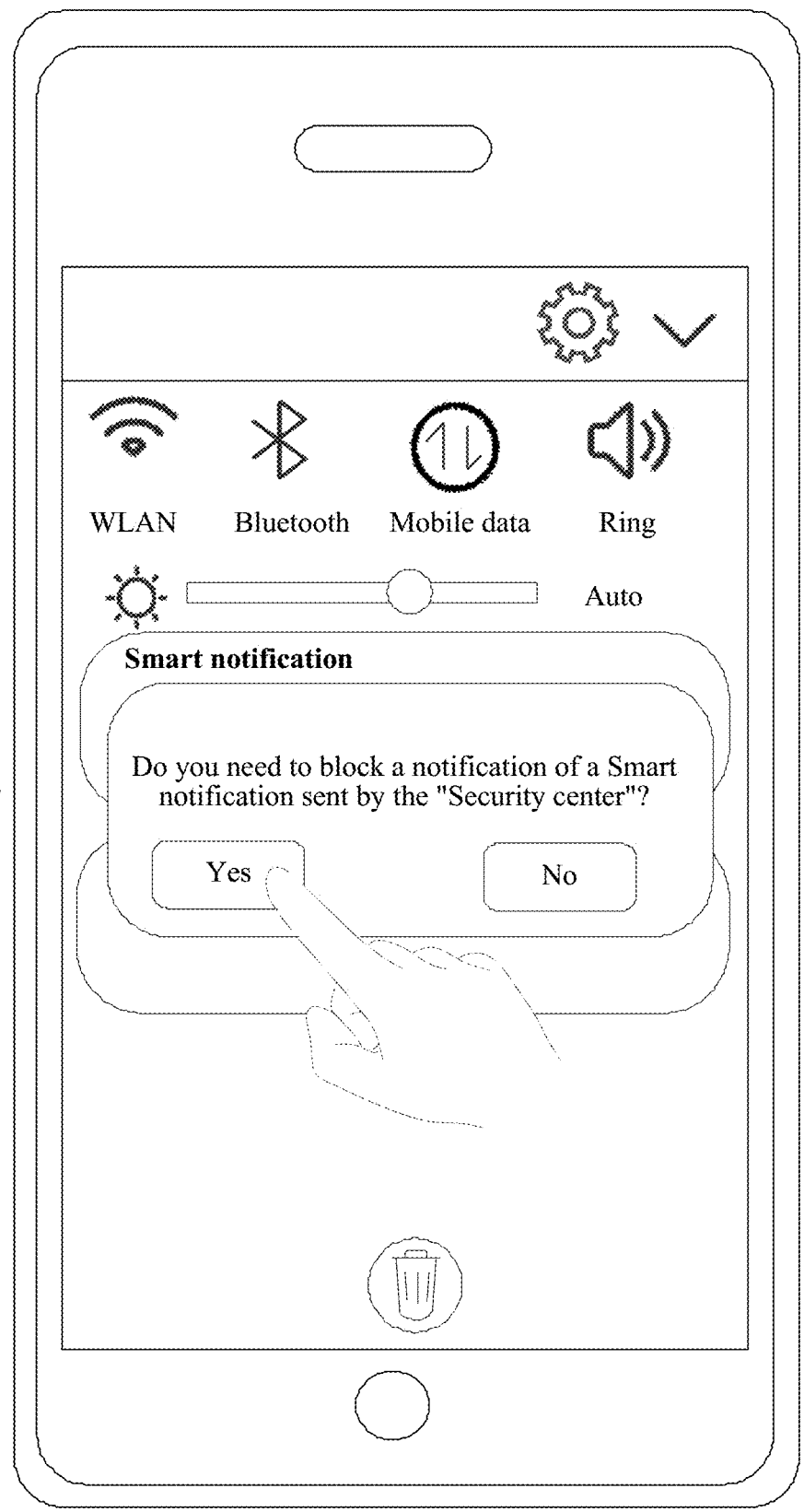

For example, the notification type "smart notification" includes the following notification subtypes: a "phone electricity quantity", a "call block", and "other". The foregoing scenario C is used as an example. In the terminal, an identifier corresponding to the notification type "smart notification" is important (first priority information), and identifiers corresponding to the notification type "advertisement promotion" and "content information" are both "unimportant" (first priority information). Before obtaining the notification 9011, times of the user tapping to delete a notification about phone electricity quantity (notification subtype) notification exceeds 5 times (a preset value), and the terminal determines, based on the user historical notification deletion frequency information, that a priority of the notification 9011 belonging to the notification subtype is low, displays the notification 9011 in collapsed form, and displays the remaining notifications in their corresponding panes based on priorities that are respectively of the remaining notifications and that are determined based on the first priority information, as shown in FIG. 9F.

The user historical notification tapping frequency information is information obtained by the terminal through counting tapping and enabling operations performed by the user for a notification historically. The tapping and enabling operation means an operation in which a jump interface corresponding to a notification is entered through tapping the notification.

In a possible embodiment, that the terminal determines the priority of the notification based on the user usage habit information corresponding to the notification specifically includes: if times of the user tapping and enabling a notification that belongs to a notification type and that is sent by an application (user historical notification tapping frequency information) exceed preset times, determining that a priority of the notification that belongs to the notification type and that is sent by the application is high, displaying the notification in a corresponding pane in the second mode.

In a possible embodiment, each notification type may include several notification subtypes. That the terminal determines the priority of the notification based on the user usage habit information corresponding to the notification specifically includes: if times of the user tapping and enabling a notification of a notification subtype (user historical notification tapping frequency information) exceed a preset value, determining that a priority of the notification belonging to the notification subtype is low, displaying the notification in a corresponding pane in the second mode, and when detecting an expanded operation entered by the user for the notification, displaying the notification in the first mode. In a possible design, different information included in the user usage habit information corresponds to different habit priorities. If the terminal determines a priority of a notification as a first priority based on first information, and determines a priority of a notification as a second priority based on the second information. When the first priority is different from the second priority, the terminal uses, in priority, a priority of a notification determined based on information having a higher habit priority. That is, if a habit priority of the first information is higher than that of the second information, the terminal determines that the priority of the notification is the first priority. If a habit priority of the second information is higher than that of the first information, the terminal determines that the priority of the notification is the second priority.

The user habit setting information means habit information set by the user on the terminal. Specifically, the user may set habit information in the following manners: The user enters operations for a target notification on a notification display interface. The terminal responds to the operation, and displays habit setting prompt information. The user inputs a corresponding instruction based on the setting prompt information. The terminal responds to the instruction, and determines that a priority of a notification of a notification type (a notification type to which the target notification belongs) corresponding to the target notification and corresponding to target application package name information (application package name information corresponding to the target notification) is low.

Figure 9H:
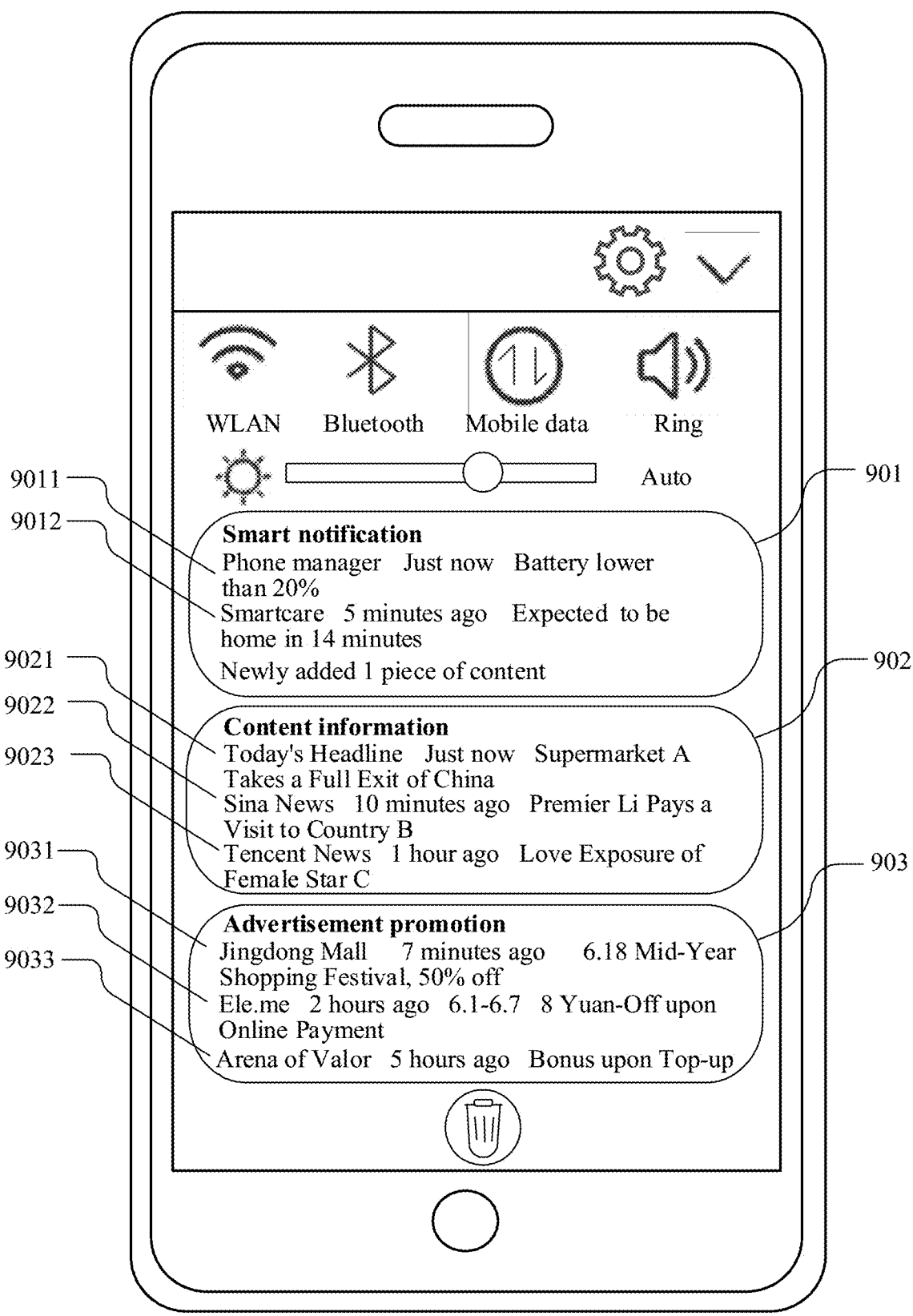
FIG. 9H is a schematic diagram of notifications displayed on a notification bar display interface according to an embodiment of this application.

As shown in FIG. 9G-1, FIG. 9G-2, and FIG. 9G-3, the user touches and holds a notification sent by the "Security Center" in a display pane corresponding to the smart notification on the notification display interface. The terminal responds to the operation. The terminal prompts the user whether a notification that belongs to the "smart notification" category and that is sent by the "Security Center" needs to be blocked. If the user taps "Yes", when receiving a notification that belongs to the "smart notification" category and of which application package name information is the "Security Center", the terminal determines that a priority of the notification is low. In the foregoing scenario C, the notification 9013 matches the habit information, so that a priority corresponding to the notification 9013 is low, and the terminal displays the notification in collapsed form, as shown in FIG. 9H.

It should be understood that, apart from that the user may enter specific operation setting habit information on the notification display interface, the user may further set habit information in another interface, such as a system setting interface, and this is not specifically limited in this application.

Display mode II. Display all notifications that have priorities as a first priority and that belong to a same notification type in a display pane in a centralized manner in the first mode, and display all notifications that have priorities as a second priority in a display pane in a centralized manner in the second mode.

In this embodiment, a priority means a priority of a notification, and the first priority is higher than the second priority. A priority of a notification may be specifically determined based on priority information of the notification.

Figure 9I:
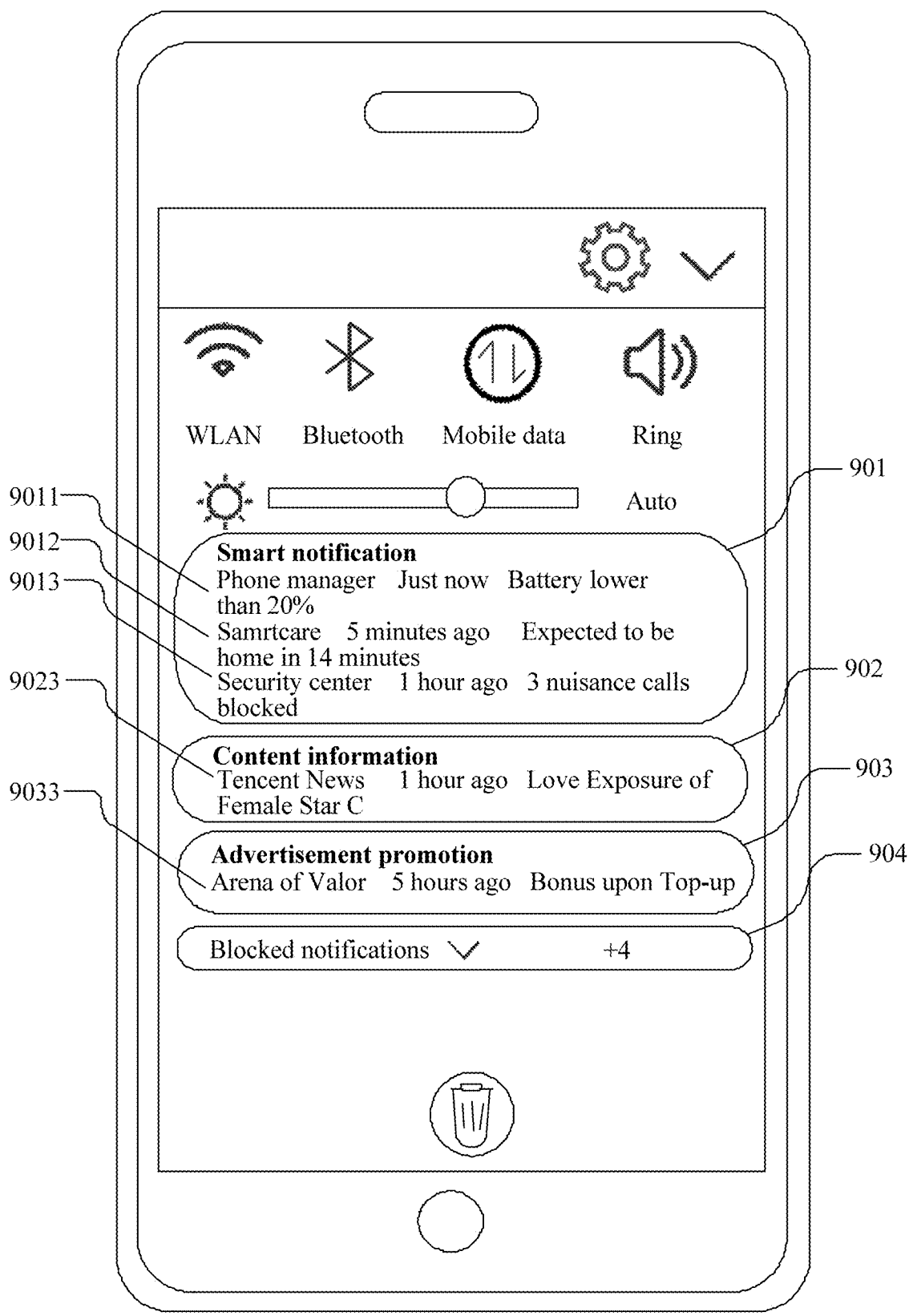
FIG. 9I is a schematic diagram of notifications displayed on a notification bar display interface according to an embodiment of this application.

The following uses an example for description. In the terminal, a priority corresponding to the notification type "smart notification" is high (first priority information), and priorities corresponding to the notification type "advertisement promotion" and "content information" are low (first priority information). The terminal generates the user profile information "entertainment gossip" and "Arena of Valor" based on user usage habits. In the foregoing scenario C, the notification 9033 matches the "Arena of Valor", and the notification 9023 matches the "entertainment gossip". The terminal determines, based on the user profile information, that priorities of the two notifications are high, and determines priorities of other notifications based on the first priority information. The terminal displays notifications that belong to a same notification type and that have a "high" priority in a pane in a centralized manner in expanded form, and displays all notifications that have a "low" priority in a pane in a centralized manner in collapsed form. That is, the terminal displays the 9011, 9012, and 9013 in the pane 901 in a centralized manner in expanded form, displays the 9023 in the pane 902 in expanded form, displays the 9033 in the pane 903 in expanded form, and displays the 9021, 9022, 9031, and 9032 in the pane 904 in a centralized manner in collapsed form, as shown in FIG. 9I. Display mode III. Display notifications corresponding to to-be-notified events having same application package name information in a display pane in a centralized manner, display all notifications that have priorities as the first priority and that are in the display pane in the first mode, and display all notifications that have priorities as the second priority and that are in the display pane in the second mode.

In this embodiment, a priority means a priority of a notification, and the first priority is higher than the second priority.

In some embodiments, a priority of a notification may be specifically determined based on first priority information of a notification type.

The following uses a specific application scenario as an example for description.

Scenario D: The terminal obtains a notification 1031 and a notification 1032 that are sent by an application "Ele.me" respectively 3 hours ago and 2 hours ago, and obtains notifications 1021 and 1022 that are sent by a "Today's Headline" respectively 1 hour ago and 1 minute ago. The user enables "Kugou Music" and plays a song "Honey" by using the application 5 minutes ago. In this case, the terminal obtains a display notification 1011 generated by the "Kugou Music", and a notification 1012 pushed by the "Kugou Music". The terminal determines, based on the manner described in operation 402 or operation 403 in the embodiment corresponding to FIG. 4, that a notification type to which the 1031, 1032, 1012 belong is an "advertisement promotion", a notification type to which the 1021 and 1022 belong is a "content information", and a notification type to which the 1011 belongs is a "music playing". Priorities corresponding to the "content information" and "advertisement promotion" are "low" (first priority information), a priority corresponding to the "music playing" is high (first priority information).

The terminal displays the notifications 1031 and 1032 sent by the "Ele.me" in a pane 103 in a centralized manner. Notification types to which the two notifications belong are both the "advertisement promotion". The terminal determines, based on first priority information of the two notifications, that priorities of the two notifications are "low", so that the terminal displays the two notifications in the pane 103 in collapsed form. The terminal displays the notifications 1011 and 1012 sent by the "Kugou Music" in a pane 101 in a centralized manner. A notification type to which the notification 1011 belongs is the "music playing". The terminal determines, based on first priority information of the notification, that a priority of the notification is "high", so that the terminal displays the notification in the pane 101 in expanded form. A notification type to which the notification 1012 belongs is the "advertisement promotion". The terminal determines that a priority of the notification is "low", so that the terminal displays the notification in the pane 101 in collapsed form. The terminal displays the notifications 1021 and 1022 sent by the "Today's Headline" in a pane 102 in a centralized manner. Notification types to which the two notifications belong are both the "content information". The terminal determines, based on first priority information of the notifications, that priorities of the notifications are "low", so that the terminal always displays the notifications in the pane 102 in collapsed form. A final display result is shown in FIG. 10A.

Figure 10A:
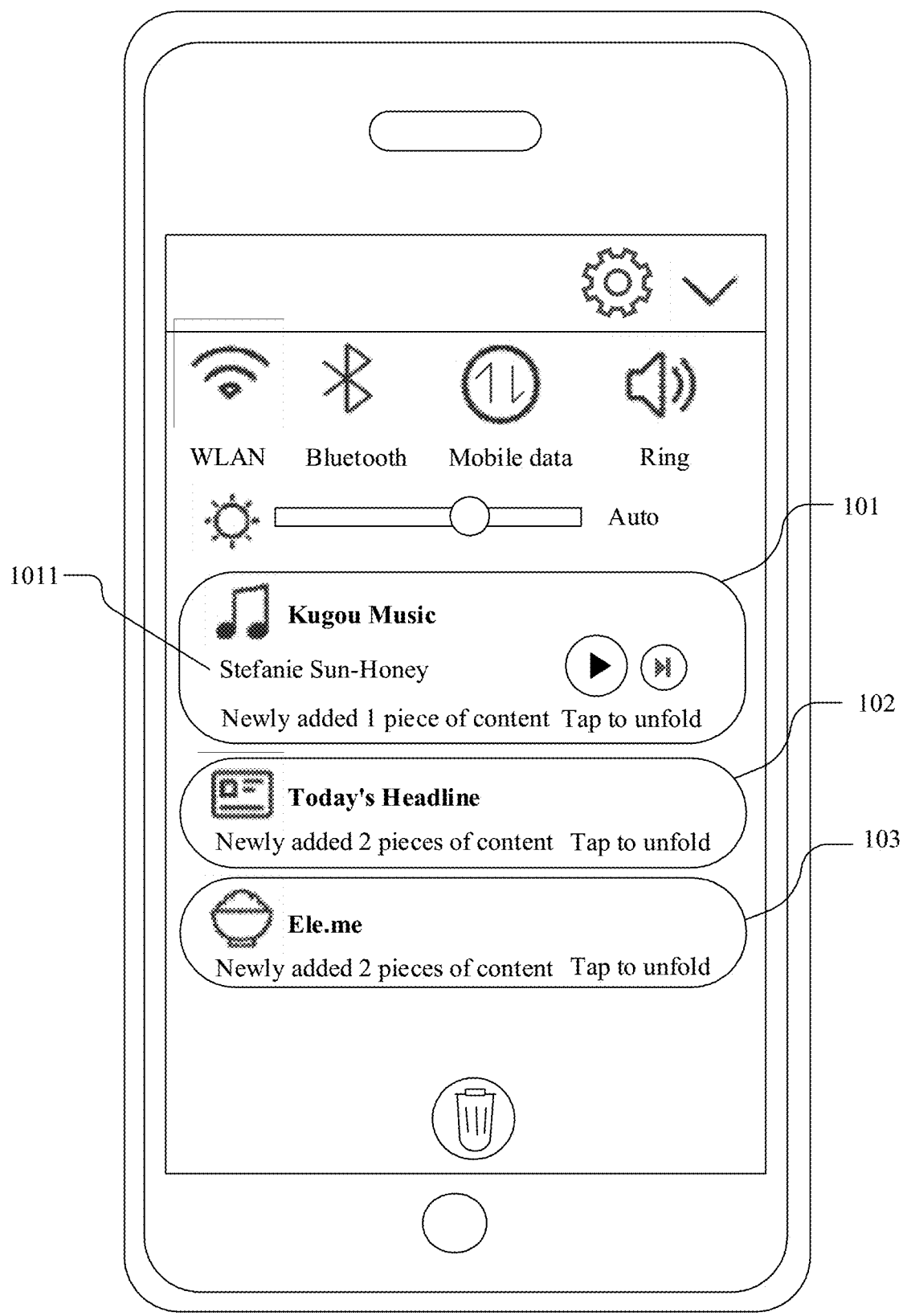
FIG. 10A is a schematic diagram of notifications displayed on a notification bar display interface according to an embodiment of this application.
Figures 1, 10B:
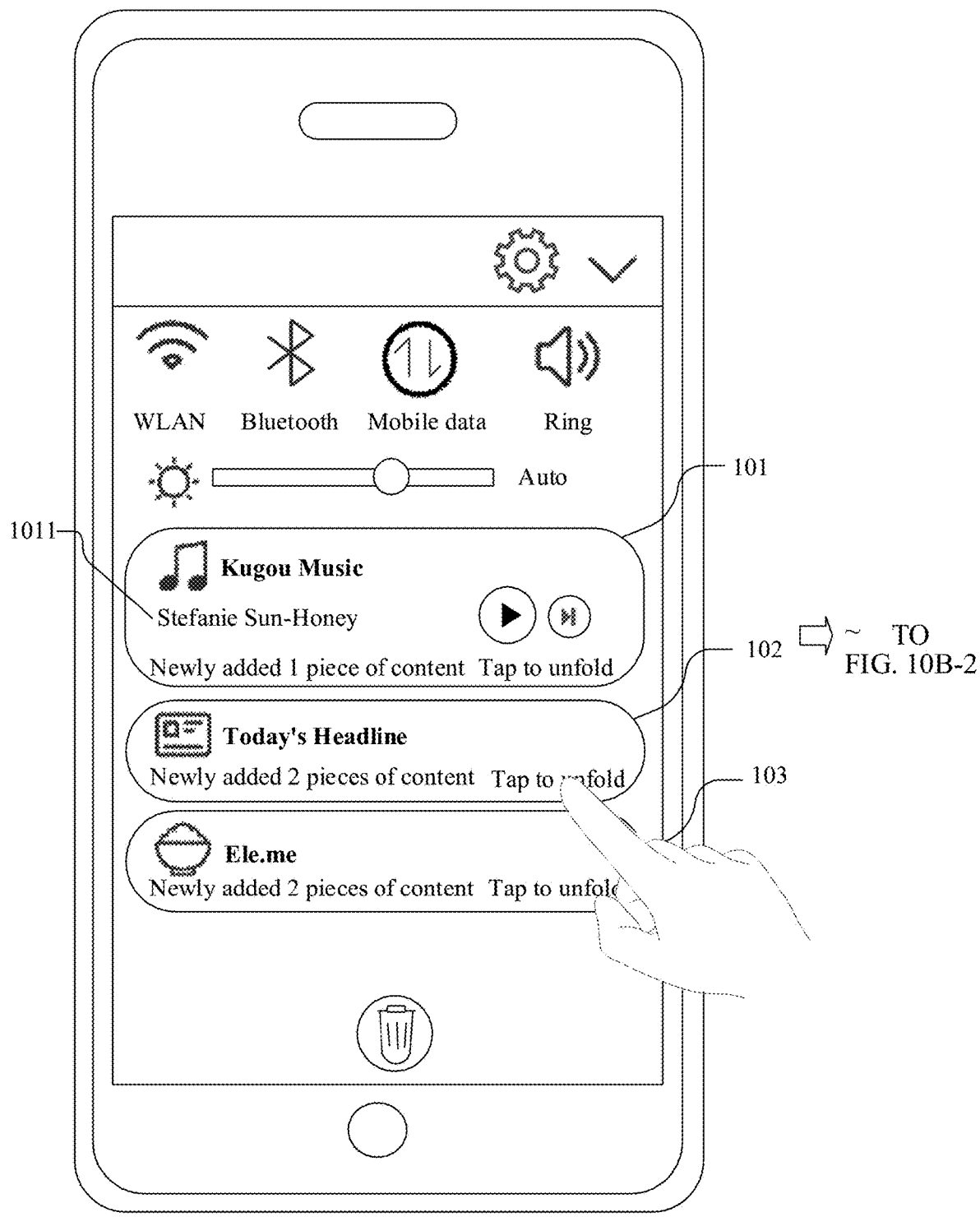
Figures 2, 10B:
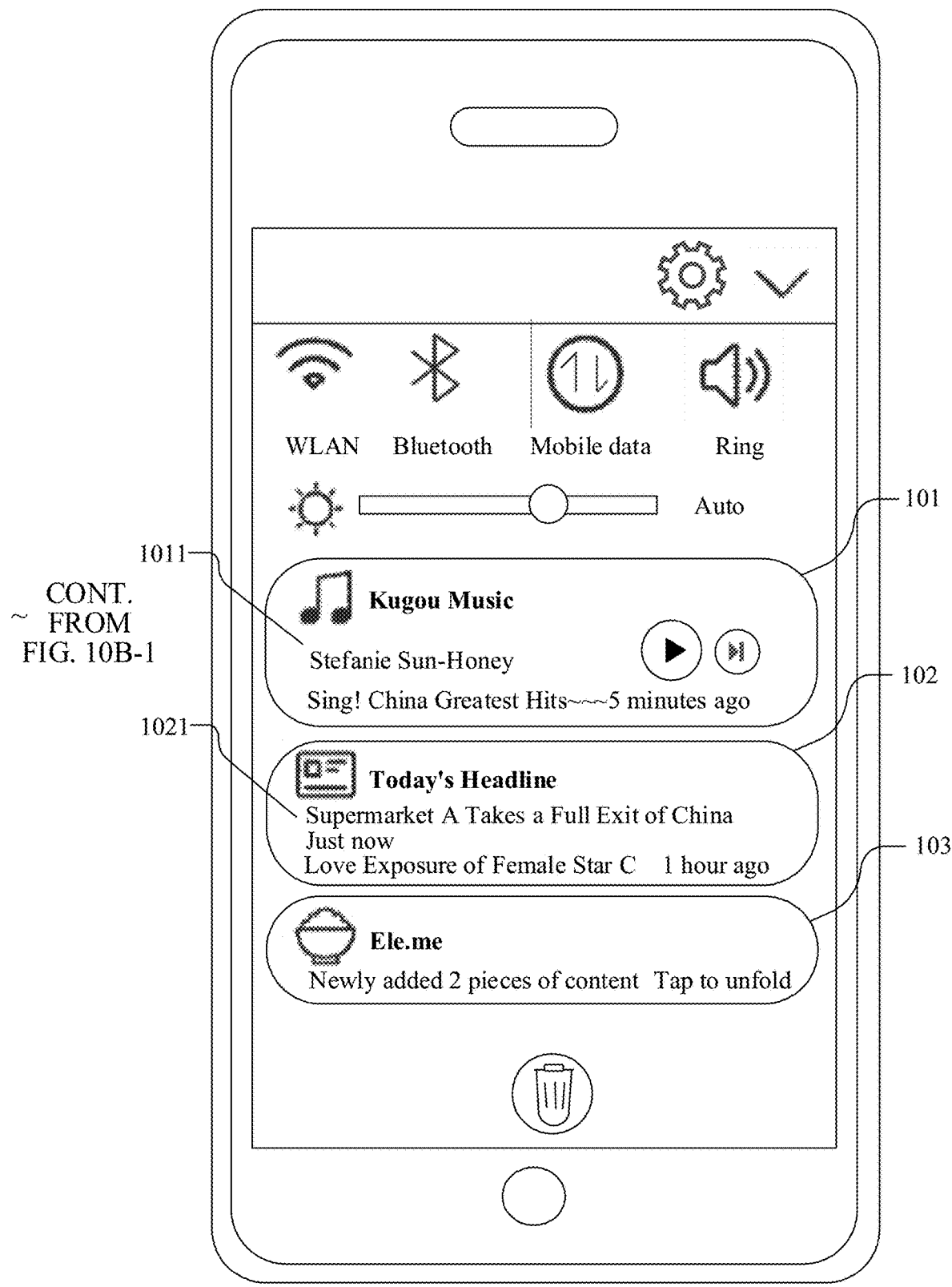

A user taps "tap to unfold" in the pane 102 on a display interface shown in FIG. 10A. The terminal responds to the instruction, and displays hidden notifications 1021 and 1022 in the pane 102 in expanded form, as shown in FIG. 10B-1 and FIG. 10B-2.

In some embodiments, a priority of a notification may further be specifically determined based on user habit information.

Figure 10C:
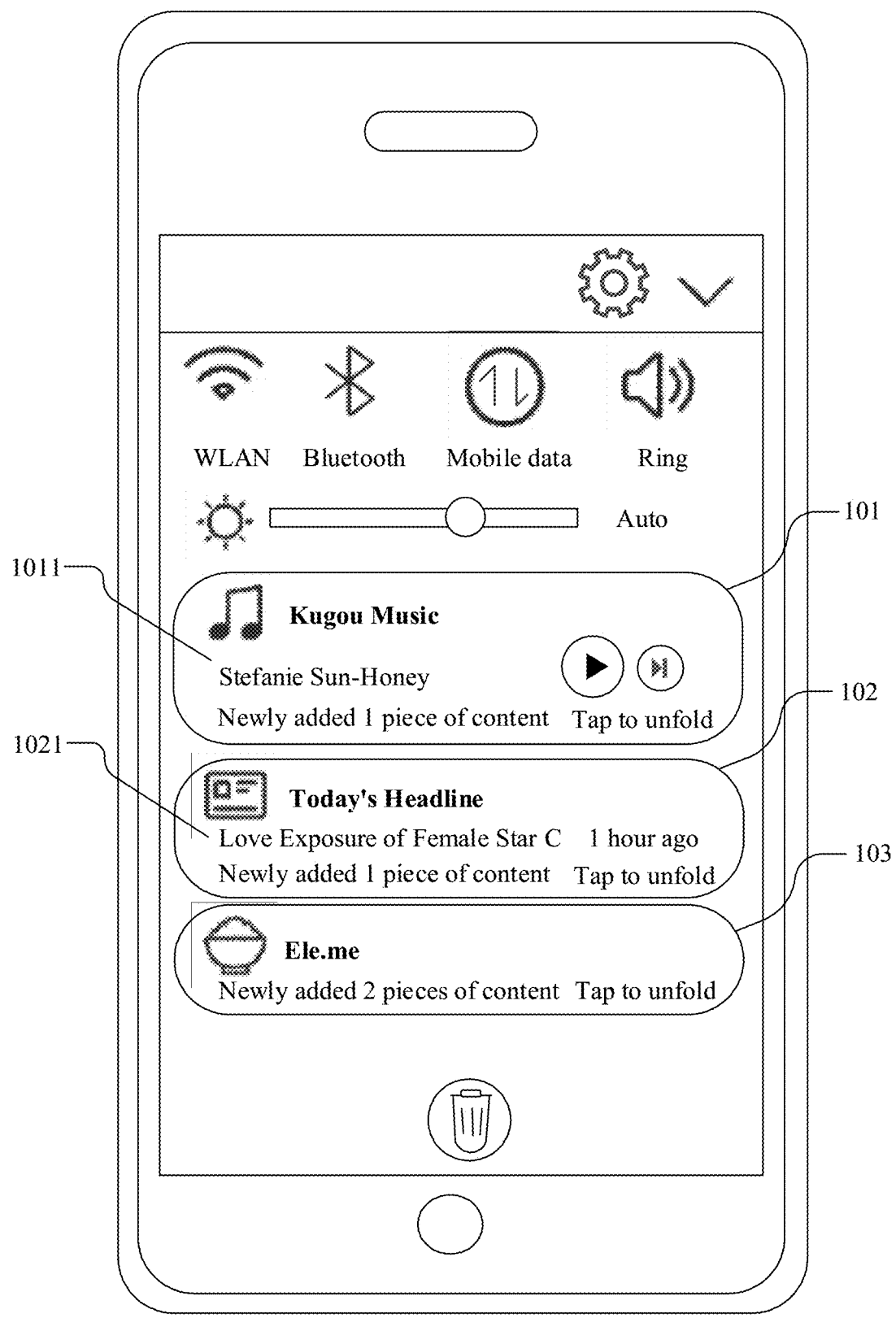
FIG. 10C is a schematic diagram of notifications displayed on a notification bar display interface according to an embodiment of this application.

The scenario D is used as an example. The user usually browses entertainment category news on the terminal, and the terminal adds, based on the behavior, "entertainment gossip" as a profile tag (user profile information) corresponding to the user. The notification 1021 matches the profile tag. The terminal determines that a priority of the notification 1021 is high, so that the terminal displays the notification in a pane 1012 in expanded form, and displays the remaining notifications in their corresponding panes of which priorities are determined based on first priority information of the remaining notifications (as shown in foregoing FIG. 10A). A final display result is shown in FIG. 10C.

Display mode IV. Display all notifications that have priorities as the first priority and that have same application package name information in a display pane in a centralized manner in the first mode, and display all notifications that have priorities as the second priority and that have same application package name information in a display pane in a centralized manner in the second mode.

In some embodiments, a priority of a notification may be specifically determined based on first priority information of a notification type.

Figure 10D:
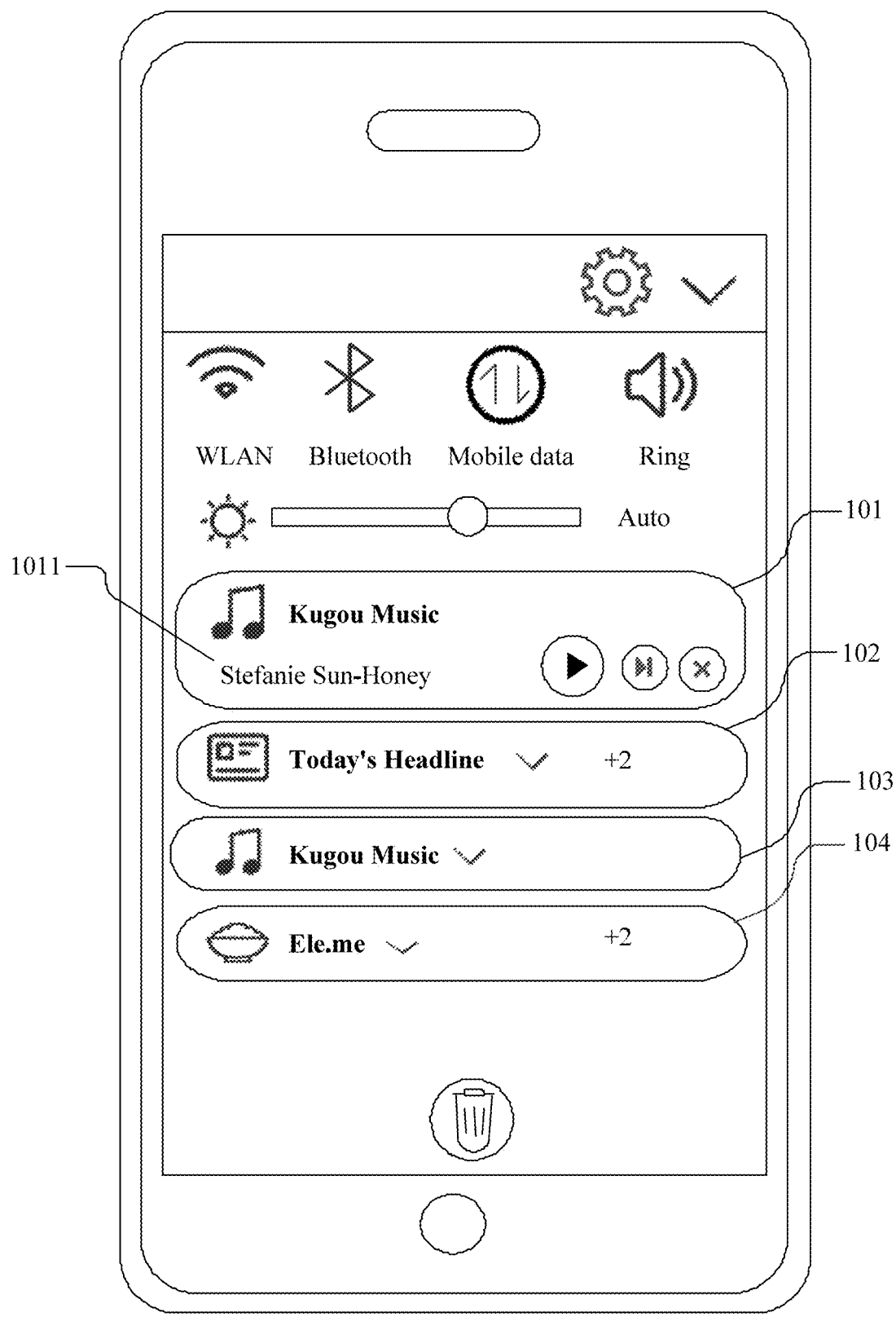
FIG. 10D is a schematic diagram of notifications displayed on a notification bar display interface according to an embodiment of this application.

The scenario D is used as an example. The terminal displays the notification 1011 that is sent by the "Kugou Music" and that is of a notification type having a "high" priority in the pane 101 in expanded form, and displays the notification 1012 that is sent by the "Kugou Music" and that is of a notification type having a "low" priority in the pane 103 in collapsed form. The terminal displays the notifications 1021 and 1022 that are sent by the "Today's Headline" and that are of a notification type having a "low" priority in a centralized manner in the pane 102 in collapsed form. The terminal displays the notifications 1031 and 1032 that are sent by the "Ele.me" and that are of a notification type having a "low" priority in a centralized manner in the pane 104 in collapsed form. A final display result is shown in FIG. 10D.

In some embodiments, a priority of a notification may further be specifically determined based on user habit information.

Figure 10E:
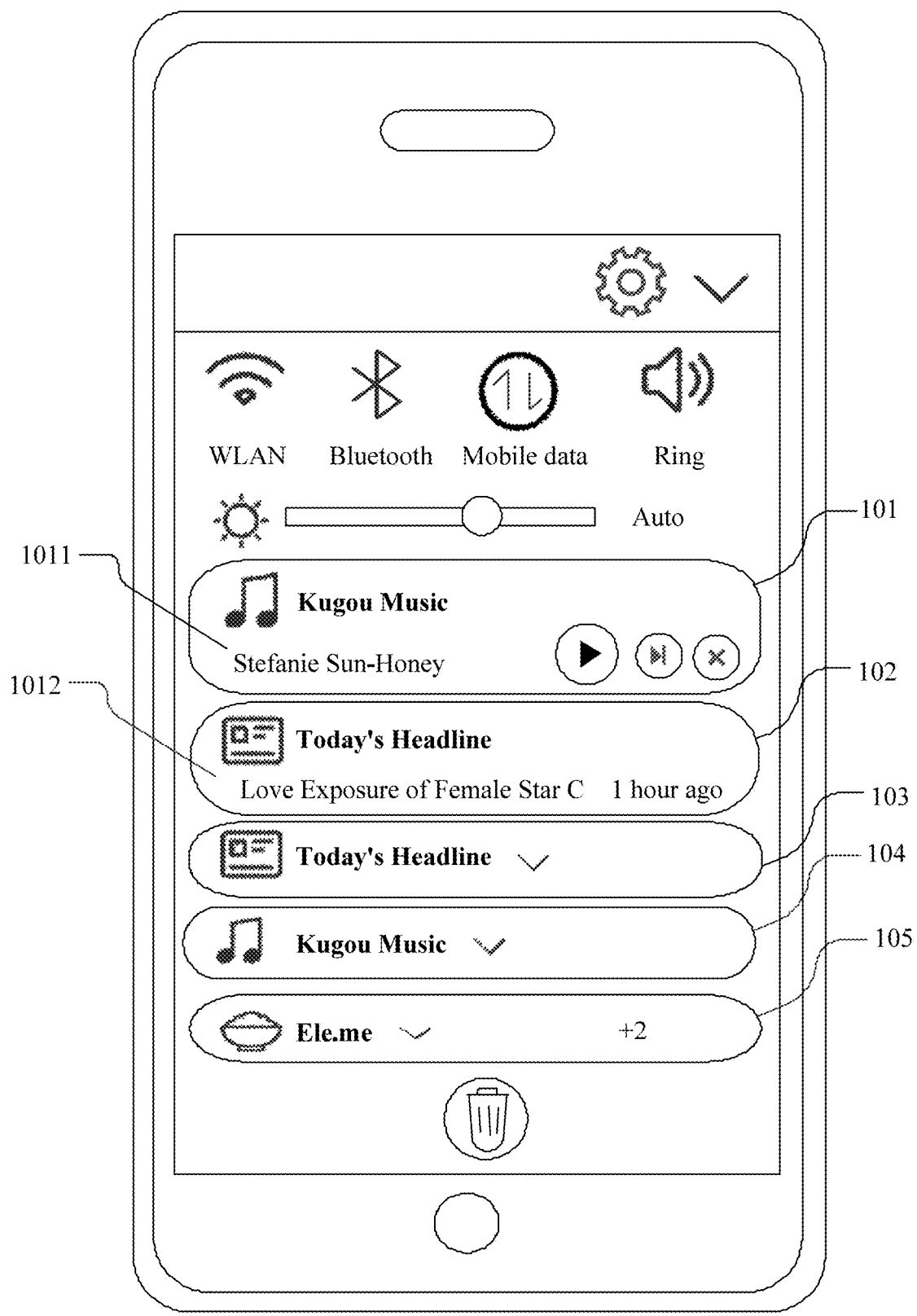
FIG. 10E is a schematic diagram of notifications displayed on a notification bar display interface according to an embodiment of this application.

The scenario D is used as an example. The user usually browses entertainment category news on the terminal, and the terminal adds, based on the behavior, "entertainment gossip" as a profile tag (user profile information) corresponding to the user. The notification 1021 matches the profile tag. A priority of the notification 1021 is high, and important levels of the remaining notifications are consistent with priorities of notification types to which the remaining notifications belong. The terminal displays the notification 1011 that is sent by the "Kugou Music" and that has a "high" priority in the pane 101 in expanded form, and displays the notification 1012 that is sent by the "Kugou Music" and that has a "low" priority in the pane 104 in collapsed form. The terminal displays the notification 1021 that is sent by the "Today's Headline" and that has a "high" priority in the pane 102 in expanded form, and displays the notification 1022 that has a "low" priority in the pane 103 in collapsed form. The terminal displays the notifications 1031 and 1032 that are sent by the "Ele.me" and that have "low" priorities in a centralized manner in the pane 105 in collapsed form. A final display result is shown in FIG. 10E.

Display mode V. Display all notifications that have priorities as the first priority and that have same application package name information in a pane in a centralized manner in expanded form, and display all notifications that have priorities as the second priority in a pane in a centralized manner in collapsed form.

In this embodiment, a priority means a priority of a notification, and the first priority is higher than the second priority.

In some embodiments, a priority of a notification may be specifically determined based on first priority information of a notification type.

Figure 10F:
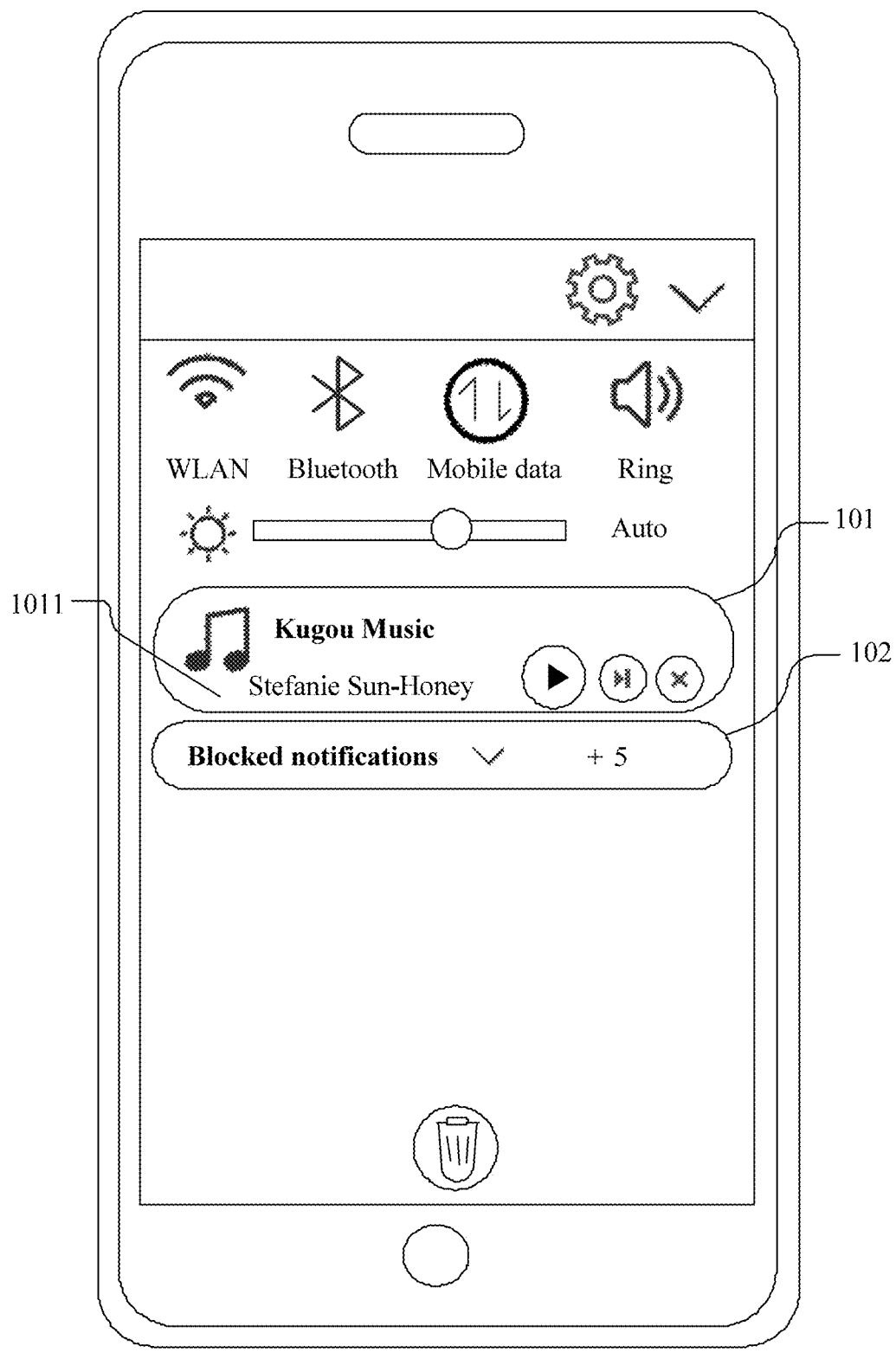
FIG. 10F is a schematic diagram of notifications displayed on a notification bar display interface according to an embodiment of this application.

The scenario D is used as an example. In the scenario D, only a priority of a notification type to which the notification 1011 sent by "Kugou Music" belongs is "high". The terminal displays the notification 1021 in the pane 101 in expanded form, and displays the remaining five notifications in the pane 102 in collapsed form, as shown in FIG. 10F.

In some embodiments, a priority of a notification may further be specifically determined based on user habit information.

Figure 10G:
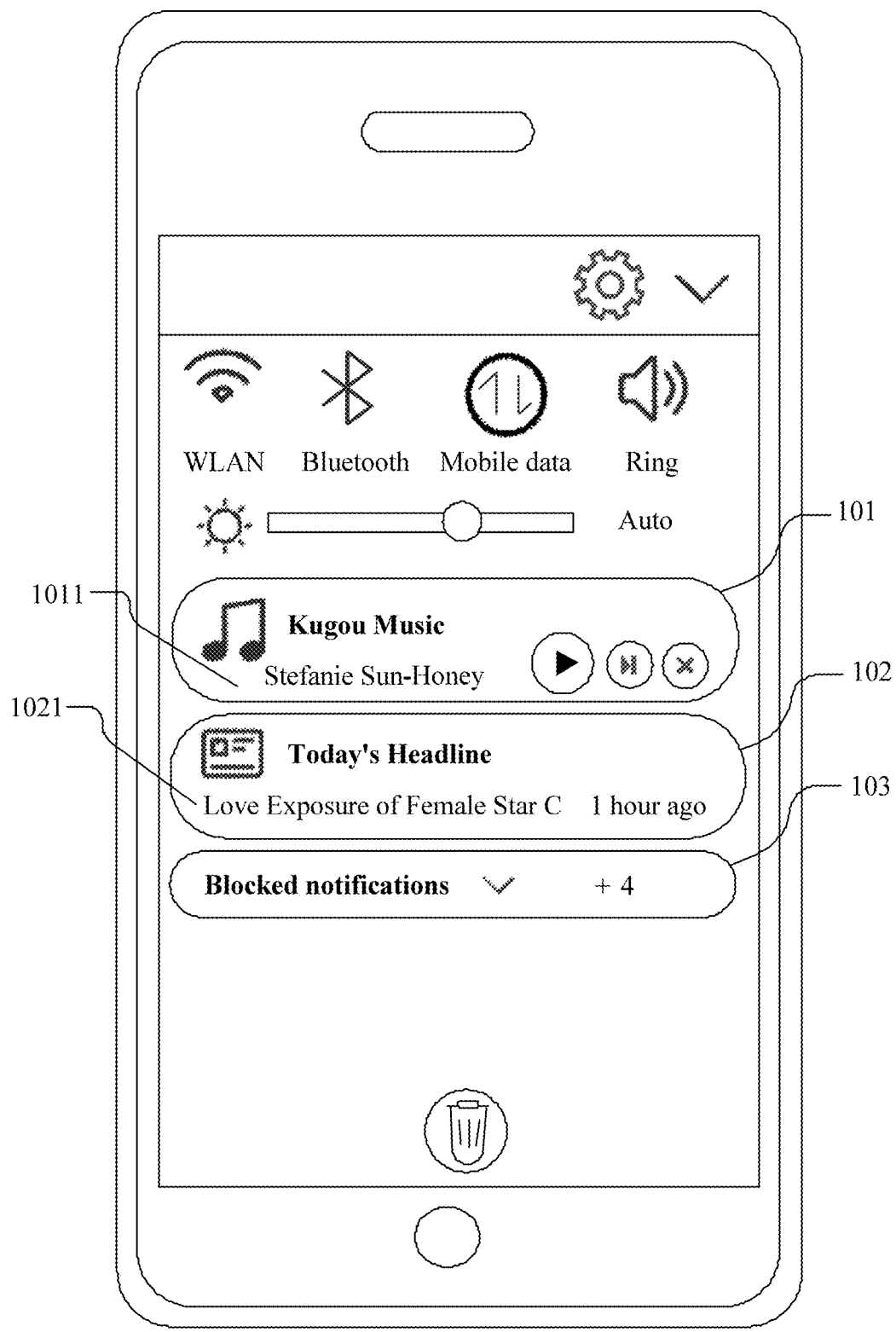
FIG. 10G is a schematic diagram of notifications displayed on a notification bar display interface according to an embodiment of this application.

The scenario D is used as an example. The user usually browses entertainment category news on the terminal, and the terminal adds, based on the behavior, "entertainment gossip" as a profile tag (user profile information) corresponding to the user. The notification 1021 matches the profile tag. The terminal determines that a priority of the notification 1021 is high, and priorities of the remaining notifications are consistent with priorities of notification types to which the remaining notifications belong. The terminal displays the notification 1011 that is sent by the "Kugou Music" and that has a "high" priority in the pane 101 in expanded form. The terminal displays the notification 1021 that is sent by the "Today's Headline" and that has a "high" priority in the pane 102 in expanded form, and displays the remaining four notifications that have "low" priorities in a centralized manner in the pane 103 in collapsed form. A final display result is shown in FIG. 10G.

Optionally, in some embodiments, a whitelist may be stored in the terminal in advance. When there is a to-be-notified event, if the whitelist includes application package name information of the to-be-notified event, the terminal may directly display the notification instead of matching a notification type to which a notification corresponding to the to-be-notified event belongs. If the whitelist does not include application packet name information of the to-be-notified event, the terminal determines, based on the manners described in the foregoing operations 402 and 403, a notification type to which a notification corresponding to the to-be-notified event belongs.

Optionally, in some embodiments, when there is a to-be-notified event, if an application corresponding to application package name information of the to-be-notified event is a system application, the terminal may directly display the notification instead of matching a notification type of a notification corresponding to the to-be-notified event. If an application corresponding to application package name information of the to-be-notified event is not a system application, the terminal may determine, based on the manners described in the foregoing operations 402 and 403, a notification type to which the notification belongs.

Optionally, in some embodiments, after determining a notification type to which a notification corresponding to the to-be-notified event belongs, if a priority of the notification type is a lowest level, the terminal may not send a notification to the user for the notification. The notification specifically may include at least one of the following: ring, vibration, and flash. In addition, the terminal may further use the following one or more operations for the notification.

1. When being in a lock status, the terminal does not display the notification on a lock screen interface.

2. When being in an unlock status, the terminal does not display the notification on a current interface.

3. After obtaining an instruction to invoke a notification bar, the terminal does not display the notification in the notification bar.

Optionally, in some embodiments, the user may set whether to enable a "smart categorization" on the terminal. If the user enables the "smart categorization", the terminal determines a notification type to which a notification belongs in a manner corresponding to the foregoing FIG. 4. If the user does not enable the "smart categorization", the terminal determines a notification type to which a notification belongs in a default manner, for example, performs categorization based on application package name information of the notification, and each application corresponds to a notification type. Specifically, on the terminal, the user may enable the "smart categorization" by tapping a shortcut key in a Status Bar, or may enable the "smart categorization" by tapping a control that is in a notification setting interface and that corresponds to the "smart categorization".

As shown in FIG. 11A-1, FIG. 11A-2, FIG. 11A-3, and FIG. 11A-4, the user taps "notification" in a system setting interface of the terminal. The terminal responds to the instruction, and displays a notification setting interface. The interface includes a button that enables/disables the "smart categorization". The user taps the button. The terminal responds to the instruction, enables the "smart categorization", and determines, for an obtained notification, a notification type to which the notification belongs in the manner corresponding to the foregoing FIG. 4. For various applications, the user may further set in the notification setting interface whether to receive a notification sent by an application. For an application whose notification is set as "not to receive", the terminal does not obtain a notification sent by the application.

Optionally, in some embodiments, for various notification types, the user may set on the terminal a display mode corresponding to a notification type. After determining a notification type to which a notification belongs, the terminal may display an obtained notification based on the display mode set by a user.

Figures 1, 11A:
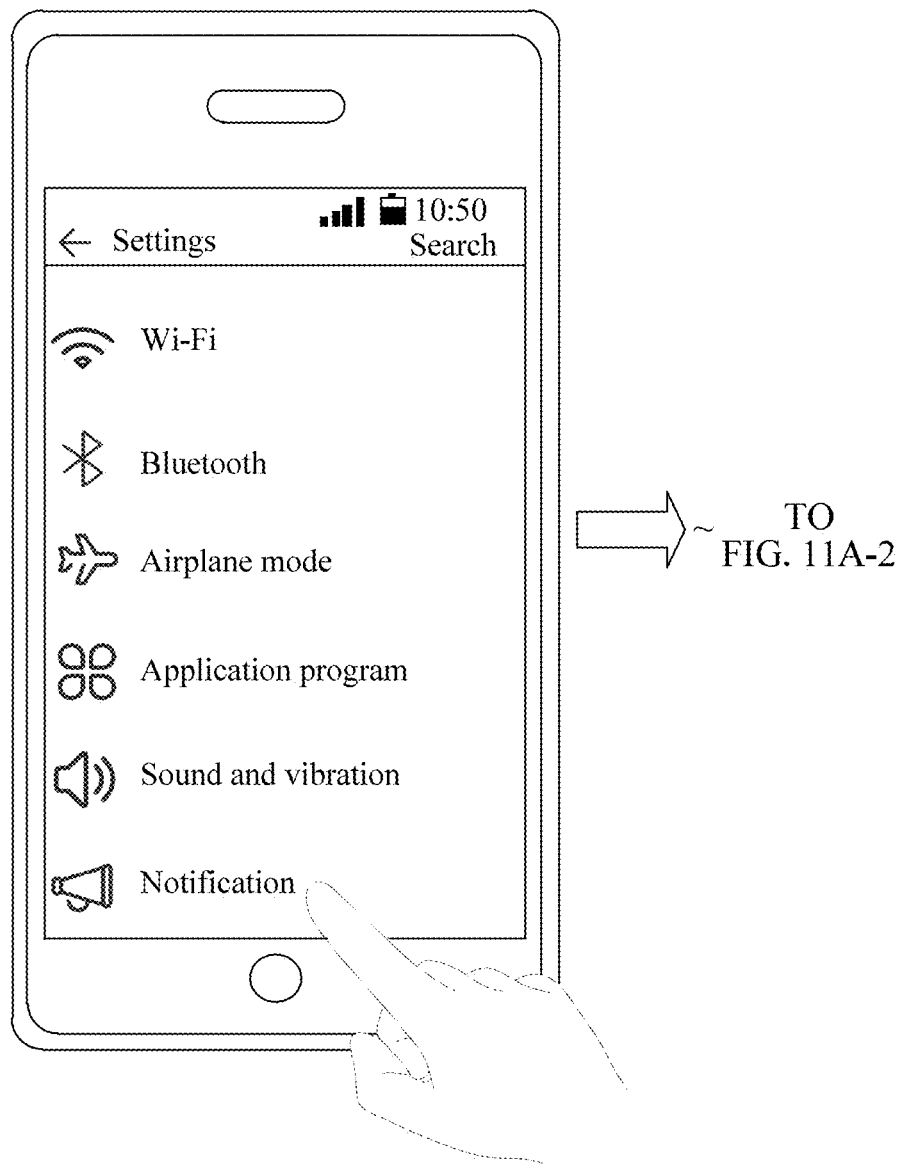
Figures 2, 11A:
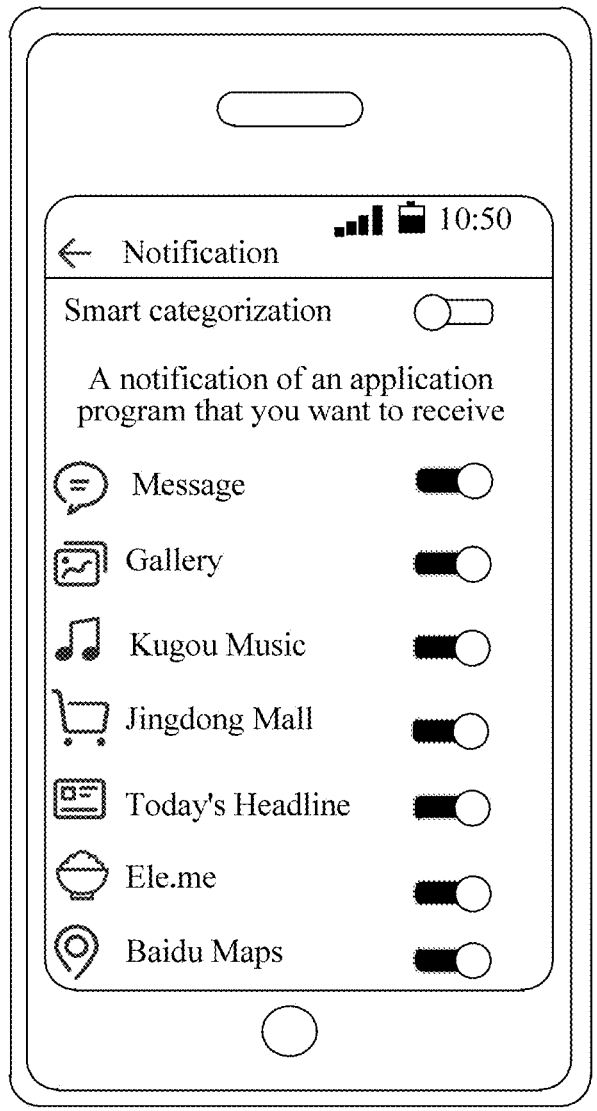
Figures 3, 11A:
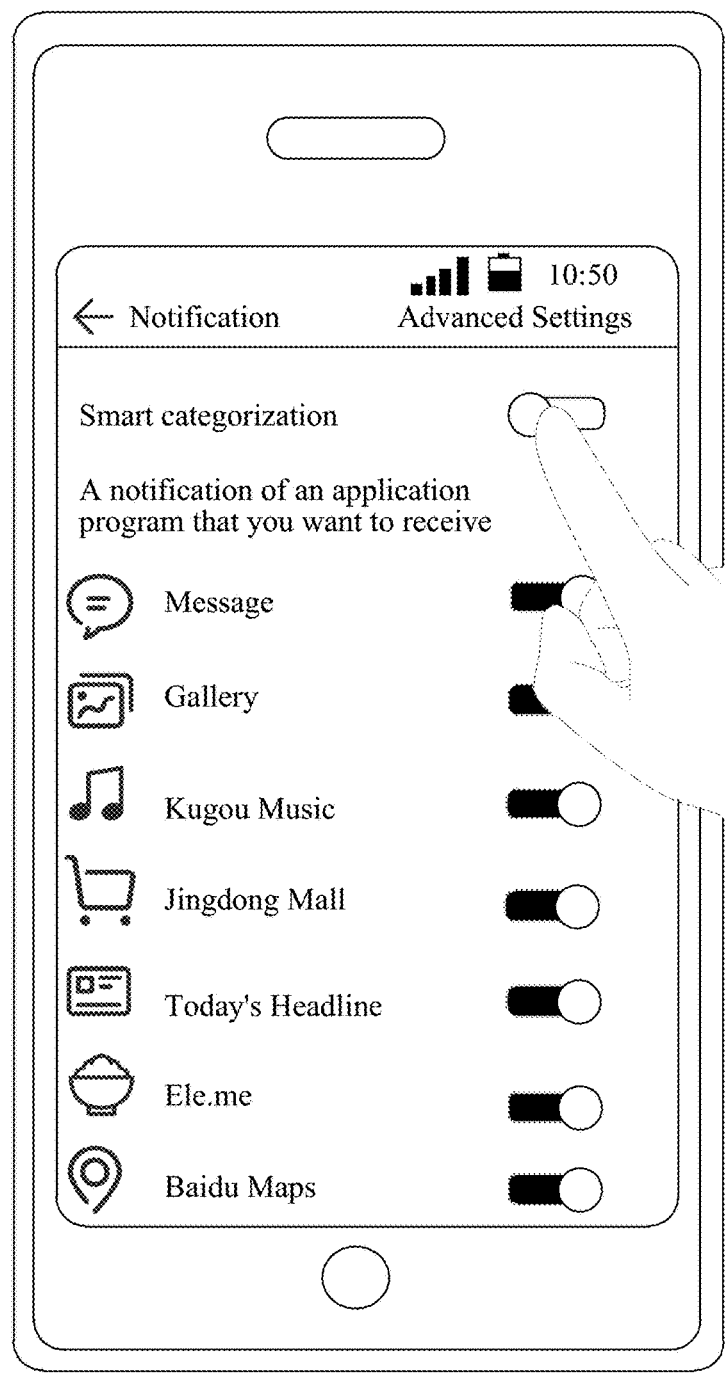
Figures 4, 11A:
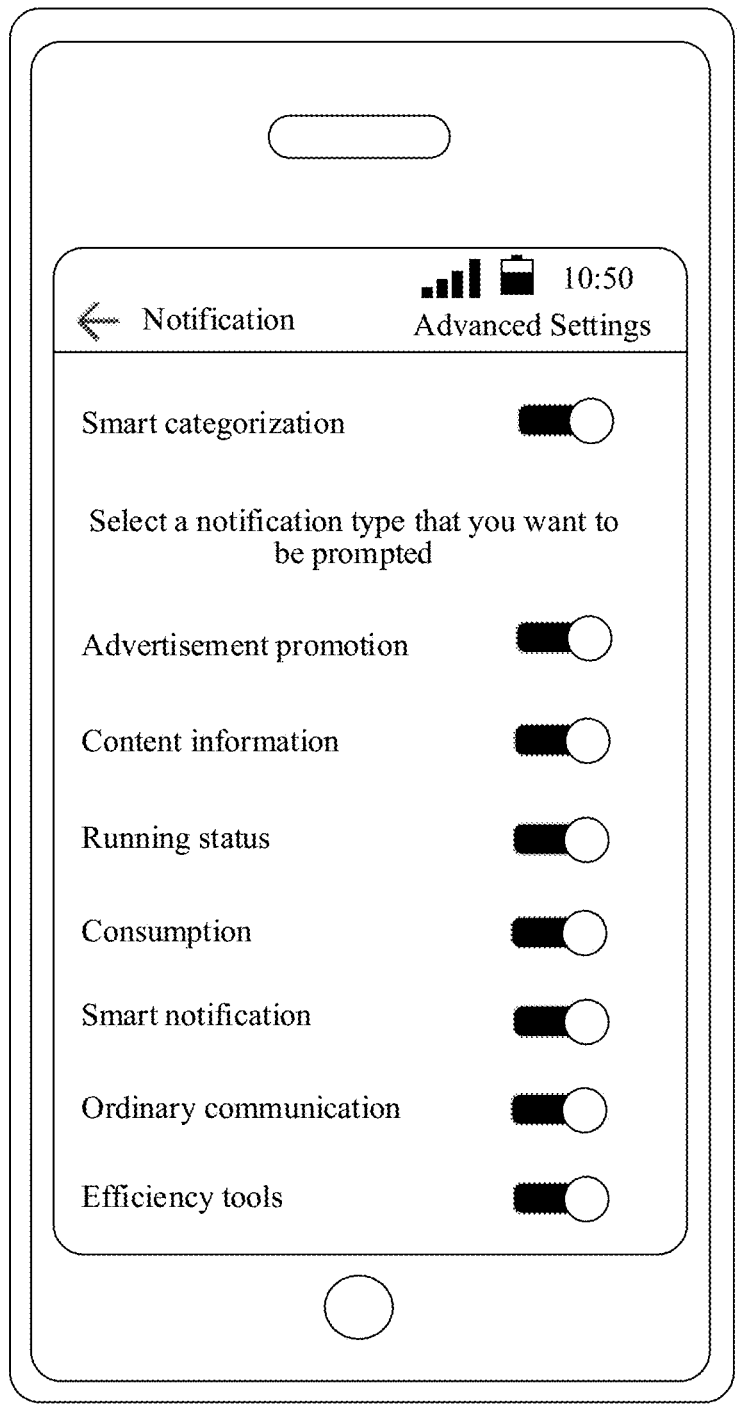
Figures 1, 11B:
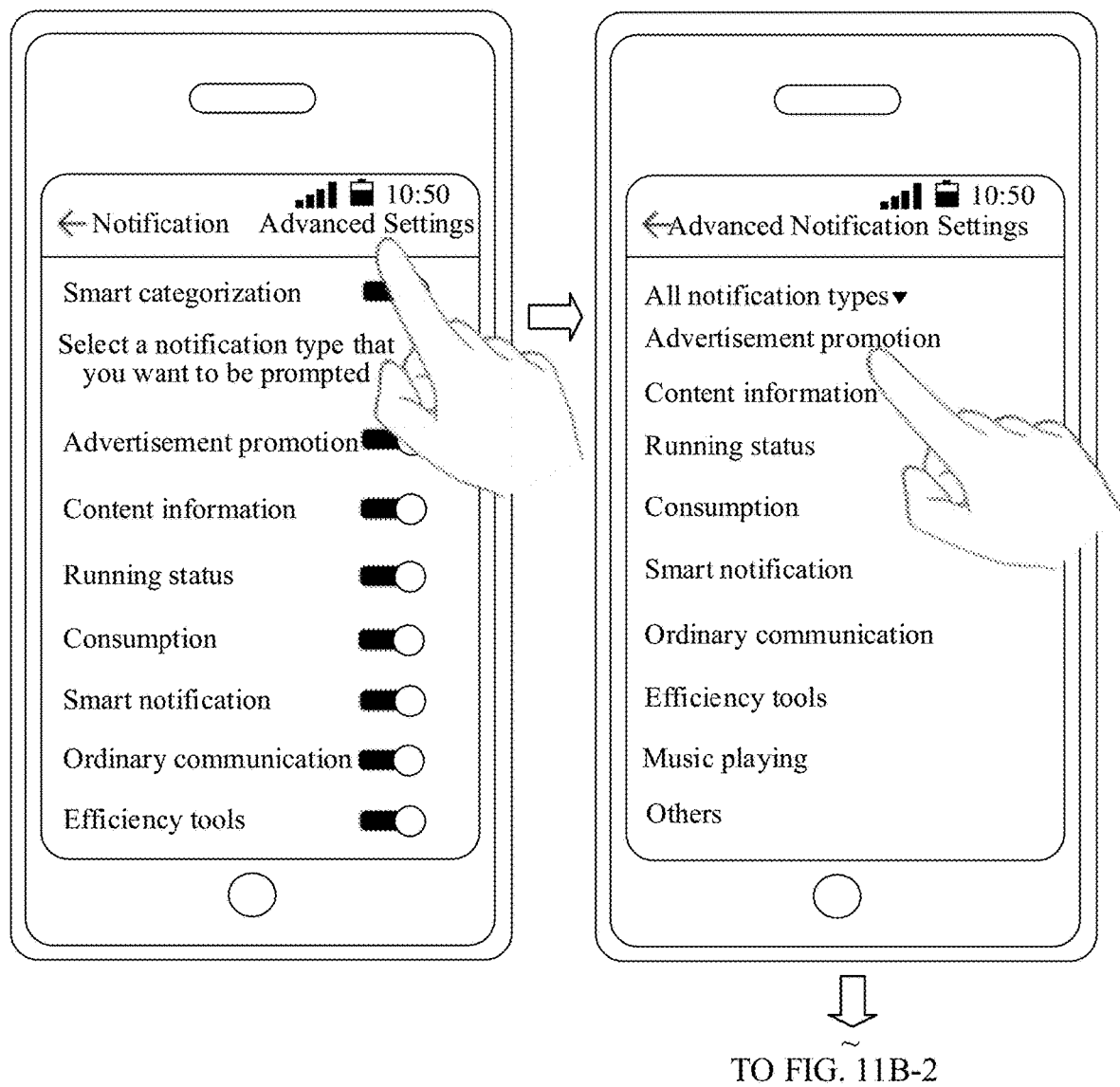
Figures 2, 11B:
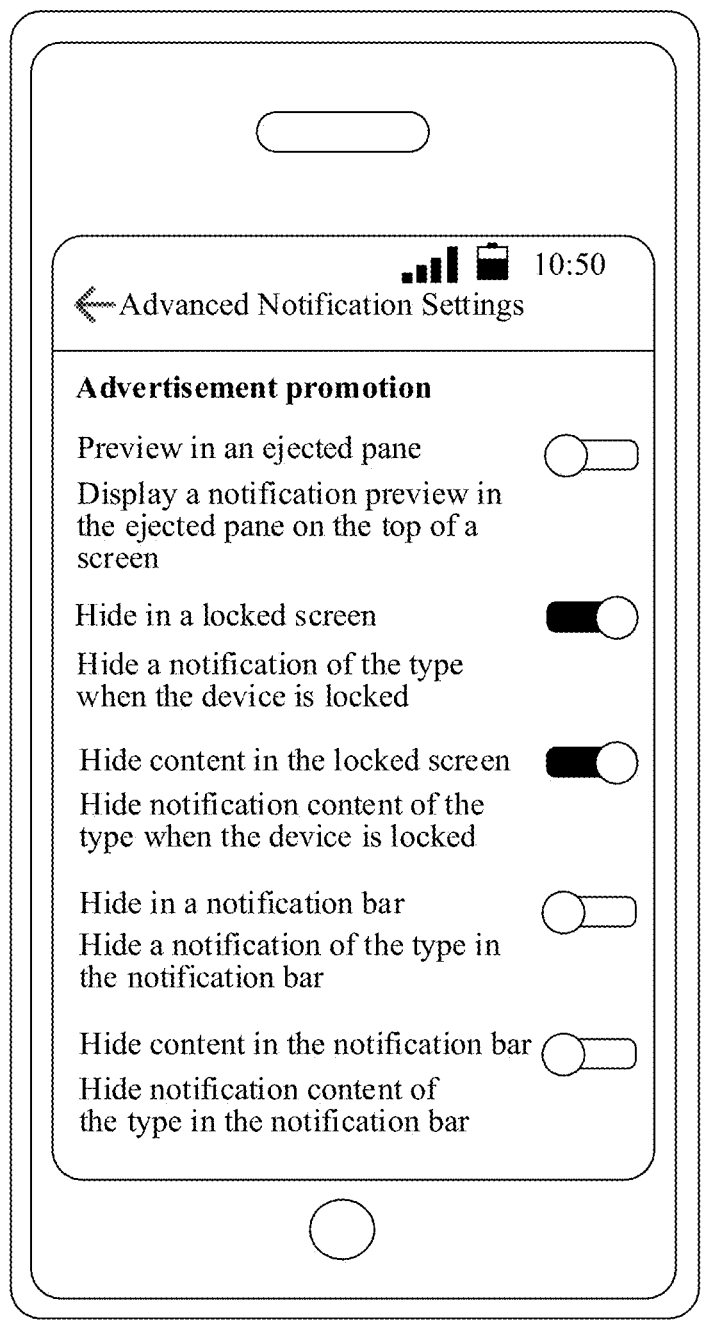

As shown in FIG. 11B-1 and FIG. 11B-2, a user taps an "advanced setting" in a notification setting interface of a terminal. The terminal displays an advanced setting interface. The user taps an "advertisement promotion" in the advanced setting interface. The terminal displays a display interface corresponding to the "advertisement promotion". The user sets a display mode corresponding to a notification that belongs to the "advertisement promotion" in the setting interface. According to a corresponding setting in FIG. 11B-1 and FIG. 11B-2, after obtaining a notification that belongs to the "advertisement promotion", the terminal does not display the notification in an ejection pane on the top of a screen, nor display the notification on a locked screen. When obtaining an instruction to invoke a notification bar, the terminal displays text information of the notification in the notification bar in expanded form.

It should be noted that, a rule repository may be stored in a rule platform of a terminal. In an optional manner, the rule platform of the terminal may match matching information against rules in the rule repository. That is, the rule platform may perform operation 402. In an optional manner, the terminal may invoke an algorithm platform to load a classification model, and may analyze feature information by using the classification model. That is, the algorithm platform may perform operation 403.

In one embodiment of this application, when there is a to-be-notified event, a terminal extracts matching information or feature information of the to-be-notified event, obtains a notification type by matching the matching information with the rules in the rule repository, or obtain a notification type by analyzing the feature information by using a classification model. The rules in the rule repository and the classification model are determined based on a large amount of sample data that is manually labeled with the notification types, so that accurate classification of notifications may be achieved to meet requirements of users, to help the users to screen out notifications of interest, thereby improving user experience.

Then, the rule and the classification model in the embodiments of this application may be updated based on a market requirement or user feedback in a timely manner, to improve the flexibility of the solution.

Then, in the embodiments of this application, a plurality of manners in which features are displayed by classification are provided, to improve the flexibility of the solution.

The notification display method in this application is described in the following with a specific scenario embodiment.

(1) The Technical Problems to be Solved in this Embodiment are as Follows:

Coverage of notification classification reaches 100% in a manner of combining a rule and a model, thereby improving accuracy of notification classification; and importance of notifications is intelligently sorted with reference to a user profile.

Figure 12A:
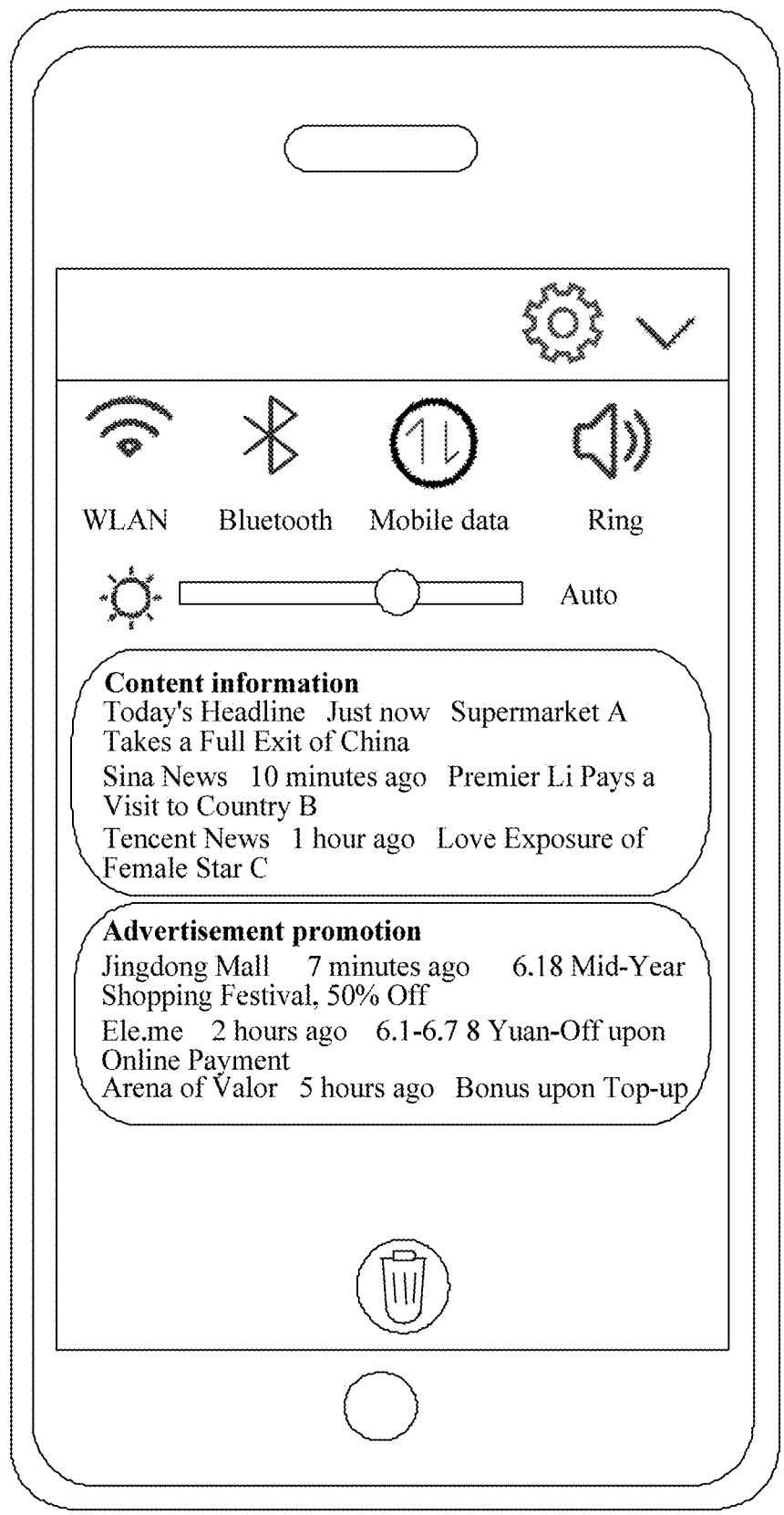
FIG. 12A is a schematic diagram of notifications displayed on a notification bar display interface according to an embodiment of this application.

(2) Service Scenarios Applicable to this Embodiment are as Follows:

Automatic classification of notification: for example, automatic collapse of an unimportant notification group such as advertising promotion and content information is supported, as shown in FIG. 12A.

Figure 12B:
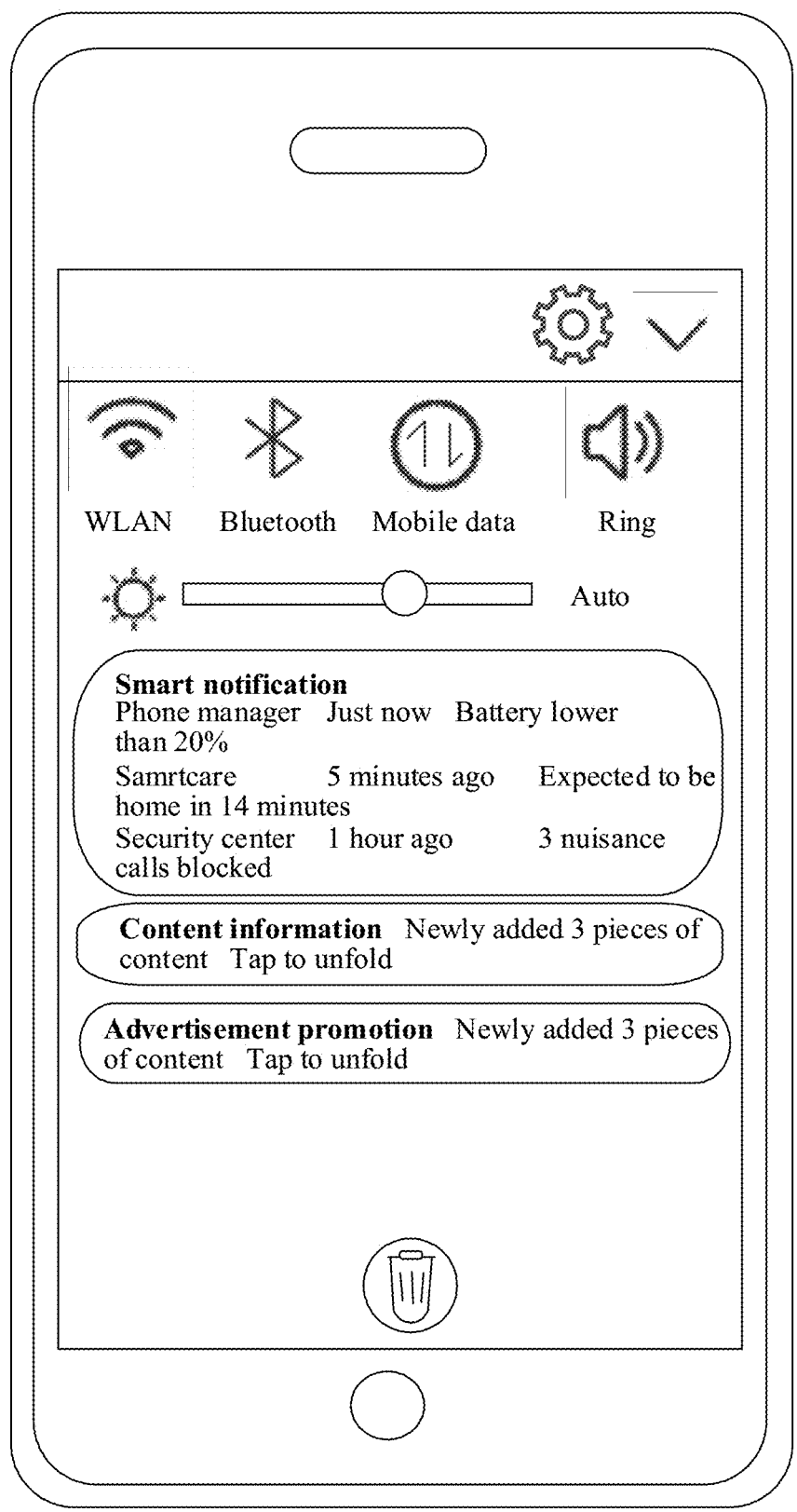
FIG. 12B is a schematic diagram of notifications displayed on a notification bar display interface according to an embodiment of this application.

Classification of notification importance: based on automatic classification, the notification classification is mapped to important or unimportant, and unimportant notification may be collapsed automatically, as shown in FIG. 12B.

Figures 1, 12C:
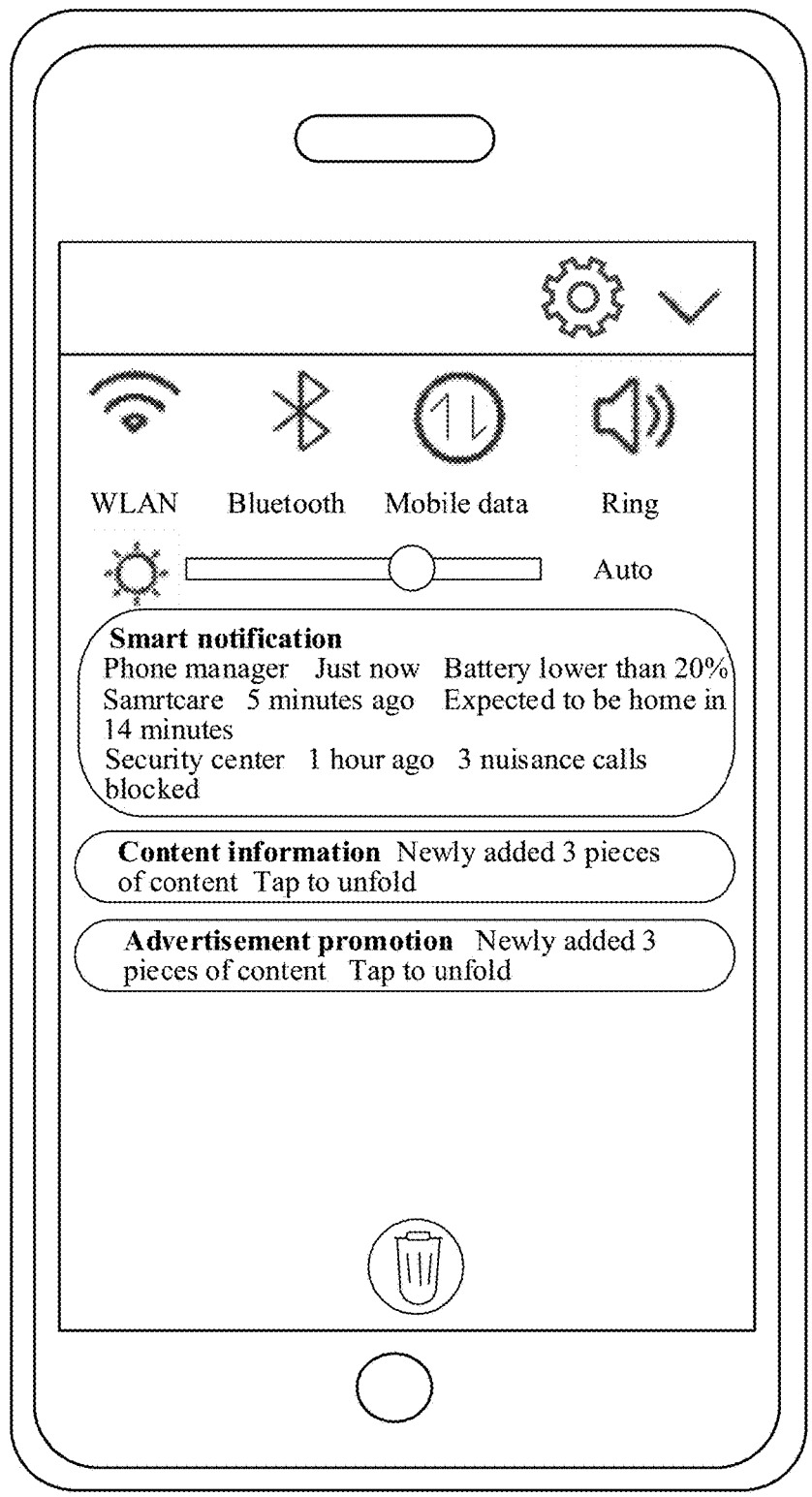
Figures 2, 12C:
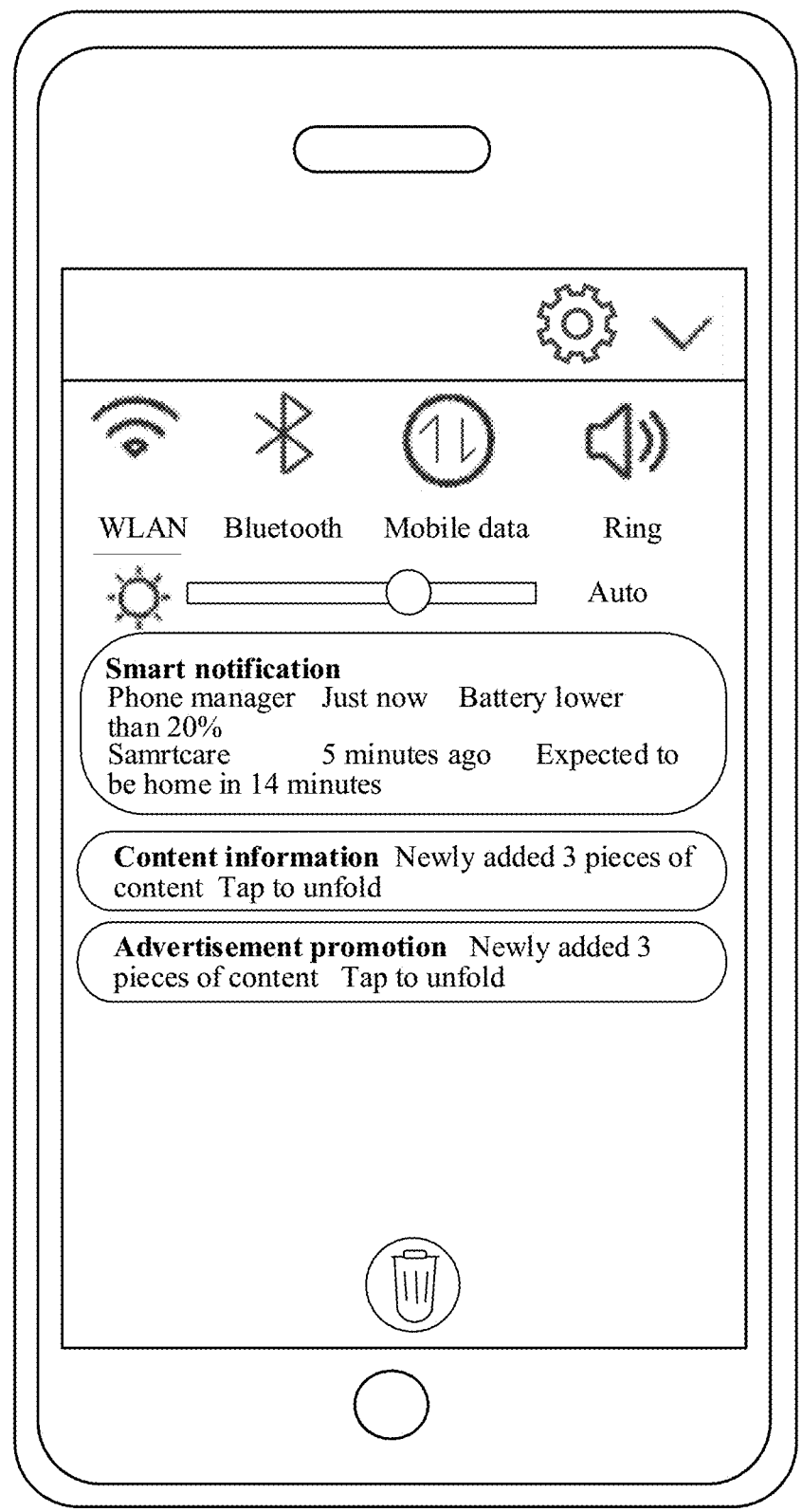

Personalized classification of notification priority: the importance of a notification is automatically modified based on an operation of tapping a notification. For example, when a user taps and deletes notifications of one application for M times, notifications of the application are degraded to unimportant (automatically collapsed); when a user taps notifications of one application for multiple times, notifications of the application are upgraded to important (do not collapse). For example, in FIG. 12C-1 and FIG. 12C-2: delete notifications of intercepting spam calls, and such types of notifications are collapsed.

Figures 1, 12D:
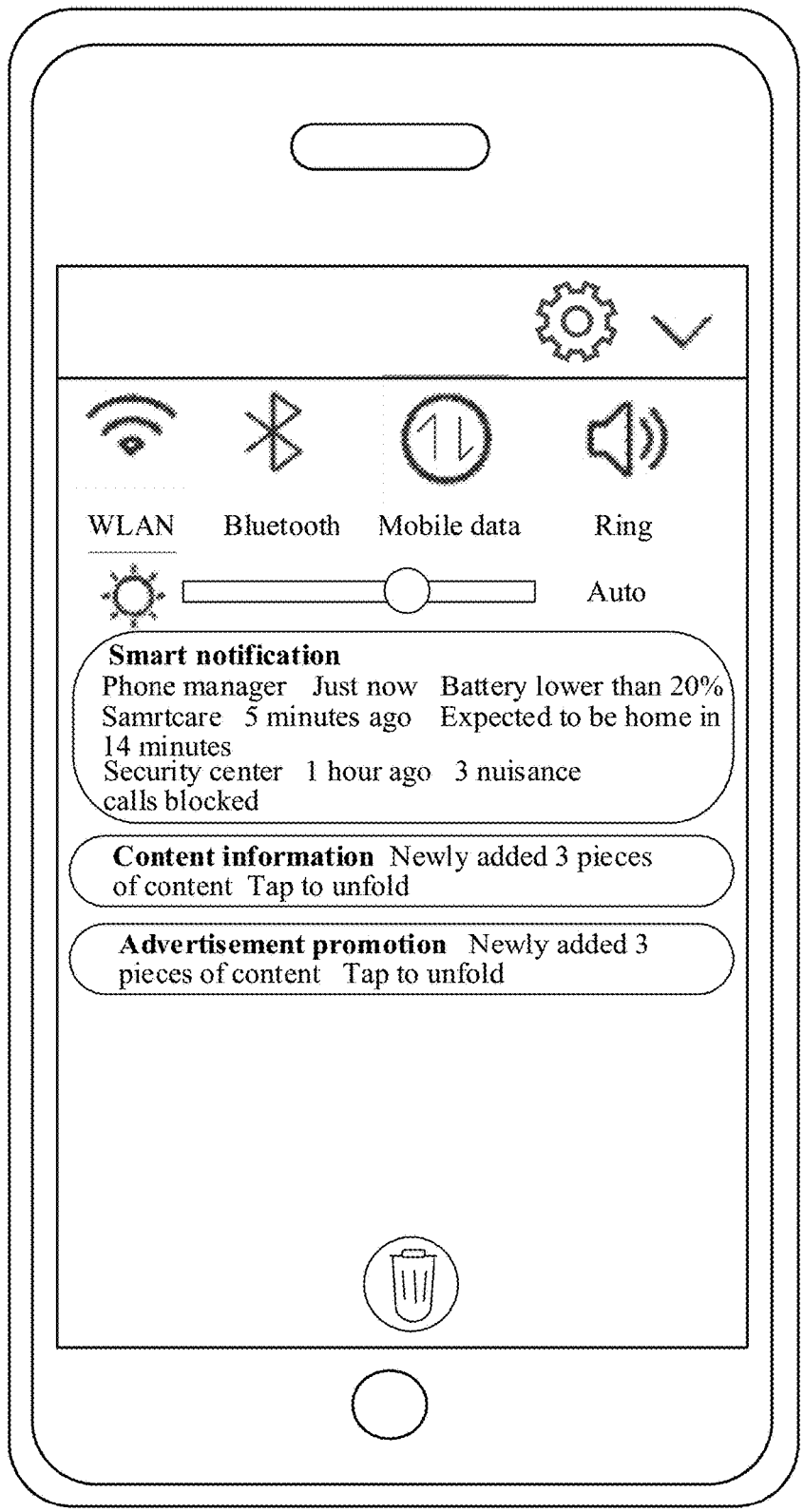
Figures 2, 12D:
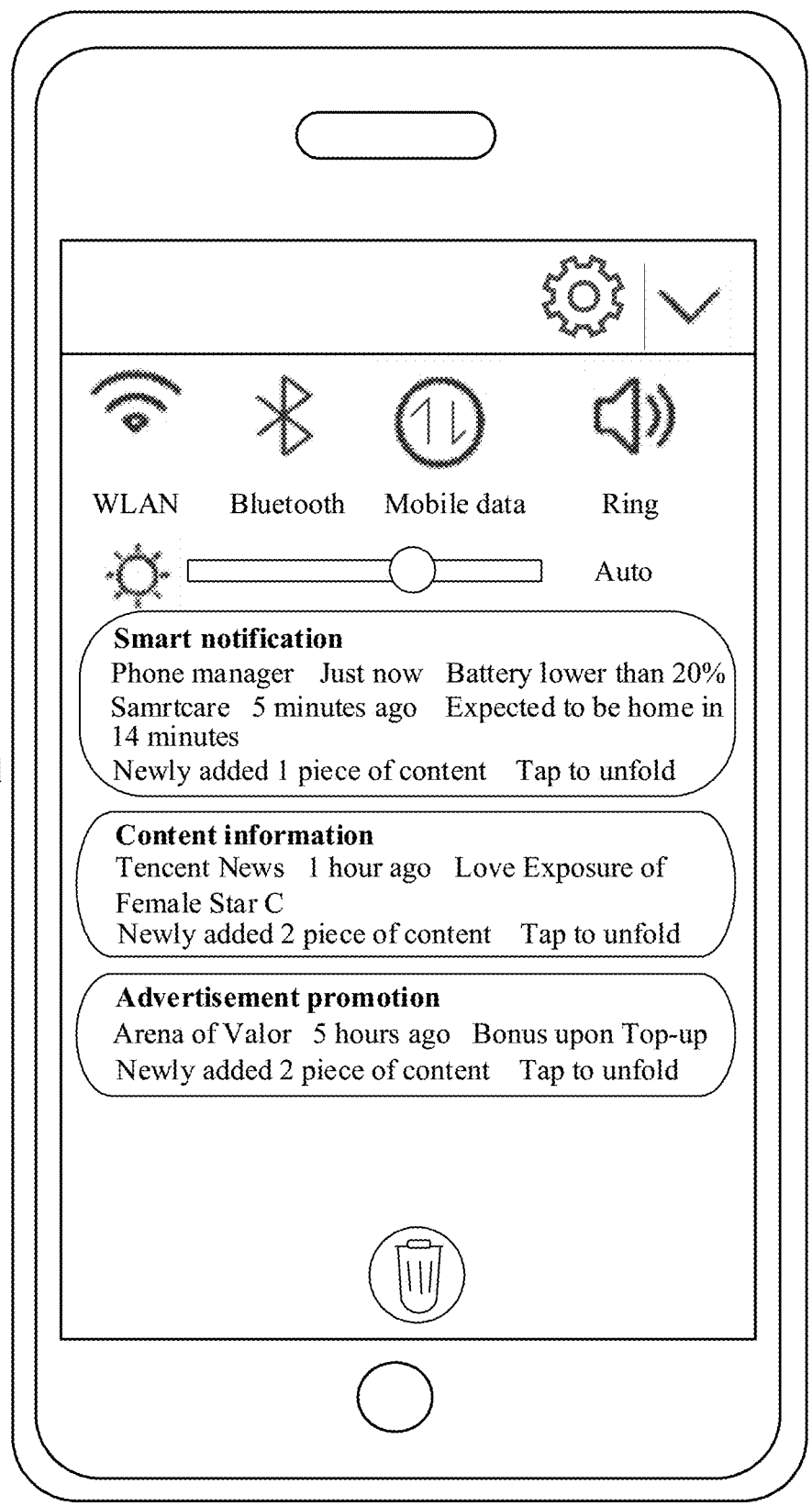

Notification types are automatically classified and sorted based on a user profile. For example, if a user usually browses entertainment news, when news notifications are received, only entertainment news notifications are expanded, and other types of notifications are collapsed; and if a user likes to play Arena of Valor, received notifications of Arena of Valor are presented, as shown in FIG. 12D-1 and FIG. 12D-2. The user profile is generated based on historical behavior of recorded usages of a mobile phone.

(3) Implementations of this Embodiment are as Follows:

Notification classifications are classified into an online classification module and an offline training module. The online classification module is configured to intelligently sort, in a mobile terminal, received notifications. The offline training module is configured to maintain and update notification classification rules and models on a cloud side.

Figure 12E:
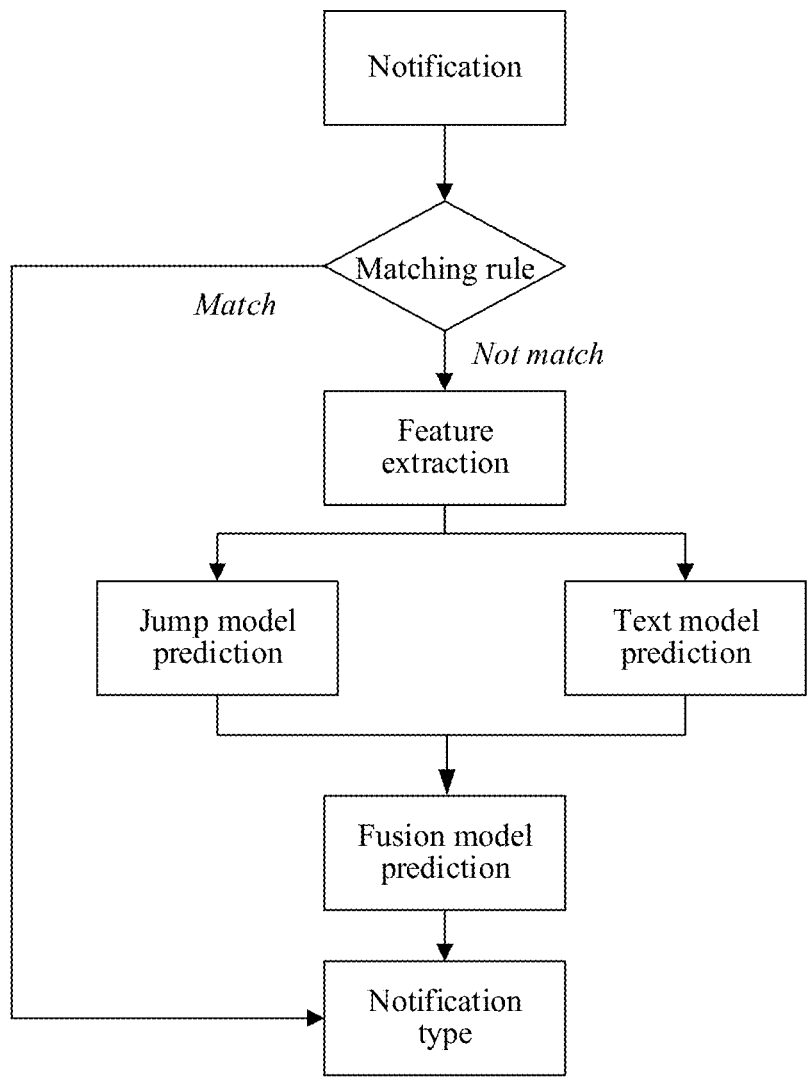
FIG. 12E is a flowchart of notification classification on a mobile terminal side according to an embodiment of this application.

FIG. 12E is a flowchart of notification classification on a mobile terminal side, implementation operations of intelligent classification of notifications are as follows:

Operation 1: When receiving a notification, the mobile terminal first uses a rule to match against a notification type. If an existing classification rule can match the notification, the type of the notification is returned directly. If no rule can match the notification, the notification is classified by using a model.

Rule definition: summarized classification rules such as object information, for example, keyword isOngoing in a notification object, and Action keyword, Component keyword, Class keyword and uriString keyword in an Intent object are used. For example, Action=xxx.yyy.zzz.BackgroundConsumeActivity, the notification can be literally understood as a notification of background power consumption. Those key fields determine which interface is jumped to after tapping a notification.

Rule generation: when a plurality of notifications with different texts that are sent by an application are labeled as a same type, and notifications of the same type have a same Action field value, Class field value or uriString field value, this type of notification may be summarized according to a rule of jump information.

Examples of jump information are shown in FIG. 12F.

A sample of a jump information rule: rules from a same application but with different jump information may be summarized as classification rules of different types, as shown in FIG. 12G.

Operation 2: A first operation of using model classification is to fetch features of the notification. In this embodiment, a jump information feature and a text content feature that are of the notification are respectively fetched. By extracting each field content of jump information of the notification, the jump information feature vectorizes and combines the related field content and generates a jump information eigenvector (for example, a package name xxx.yyy.zzz is decomposed to an xxx,yyy field and a zzz field, and then is vectorized by using a coding technology (for example, onehot coding)). The text information feature generates an eigenvector of the text information by extracting a word vector or a character vector.

Operation 3: Use an offline pre-trained jump information model to predict, based on the jump information feature generated in operation 2, the notification according to a classification intermediate result of the jump feature. Moreover, an offline pre-trained text information model is used to predict, based on the text classification model generated in operation 2, the notification according to a classification intermediate result of the text information.

Operation 4: Use an offline pre-trained fusion model to predict a final classification result based on the classification intermediate values of the jump information and the text information that are generated in operation 3.

Figure 12H:
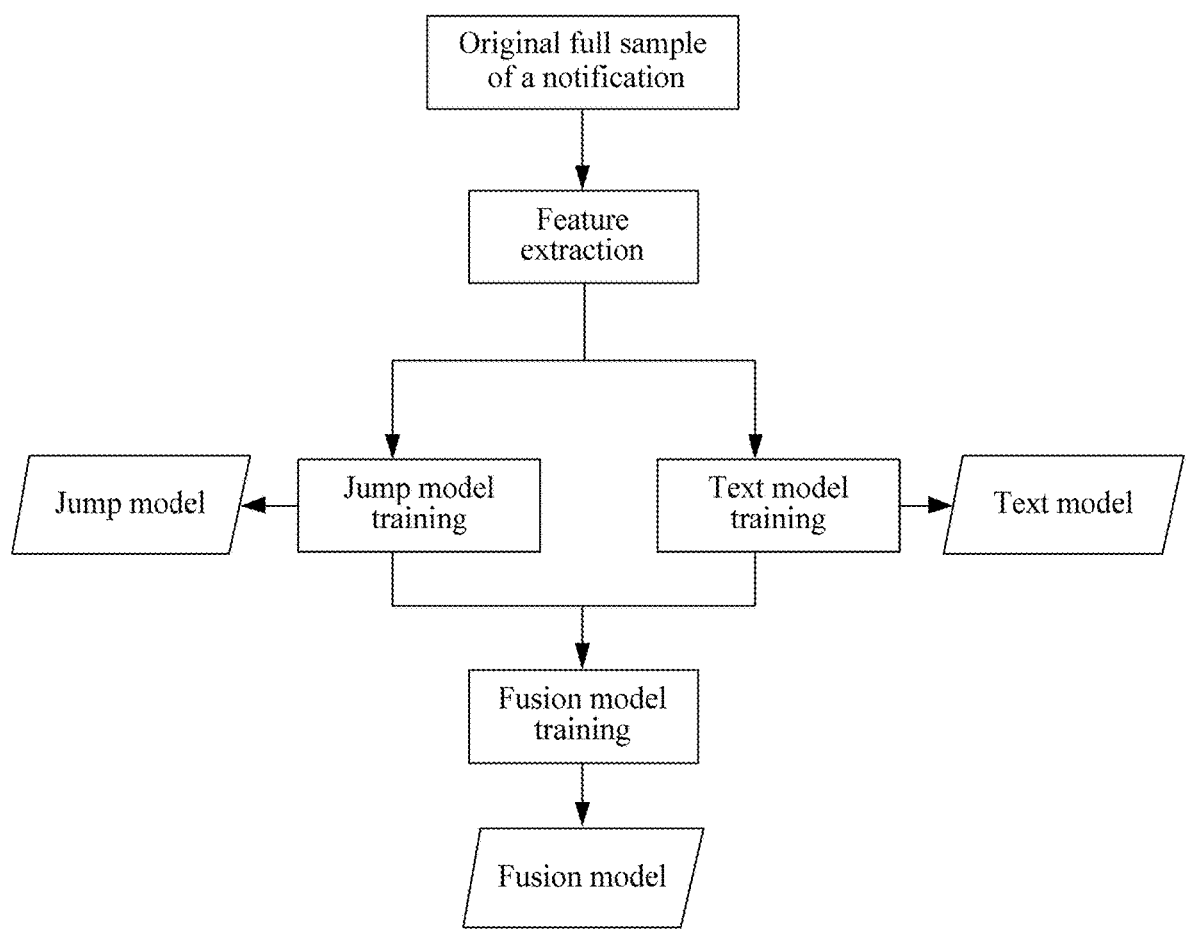
FIG. 12H is a flowchart of offline notification classification model training according to an embodiment of this application.

FIG. 12H is a flowchart of offline notification classification model training. The operations are as follows:

Operation 1: Collect notification sample data, and manually label, according to service requirements, a notification sample as training data.

Operation 2: Extract a notification sample feature, which is the same as the classification procedure in operation 2.

Operation 3: Use a classification algorithm (for example, a logistic regression, or a linear vector machine, and a GBDT) to generate a classification model according to jump information and a classification model according to text information based on the label of notification sample data.

Figure 12I:
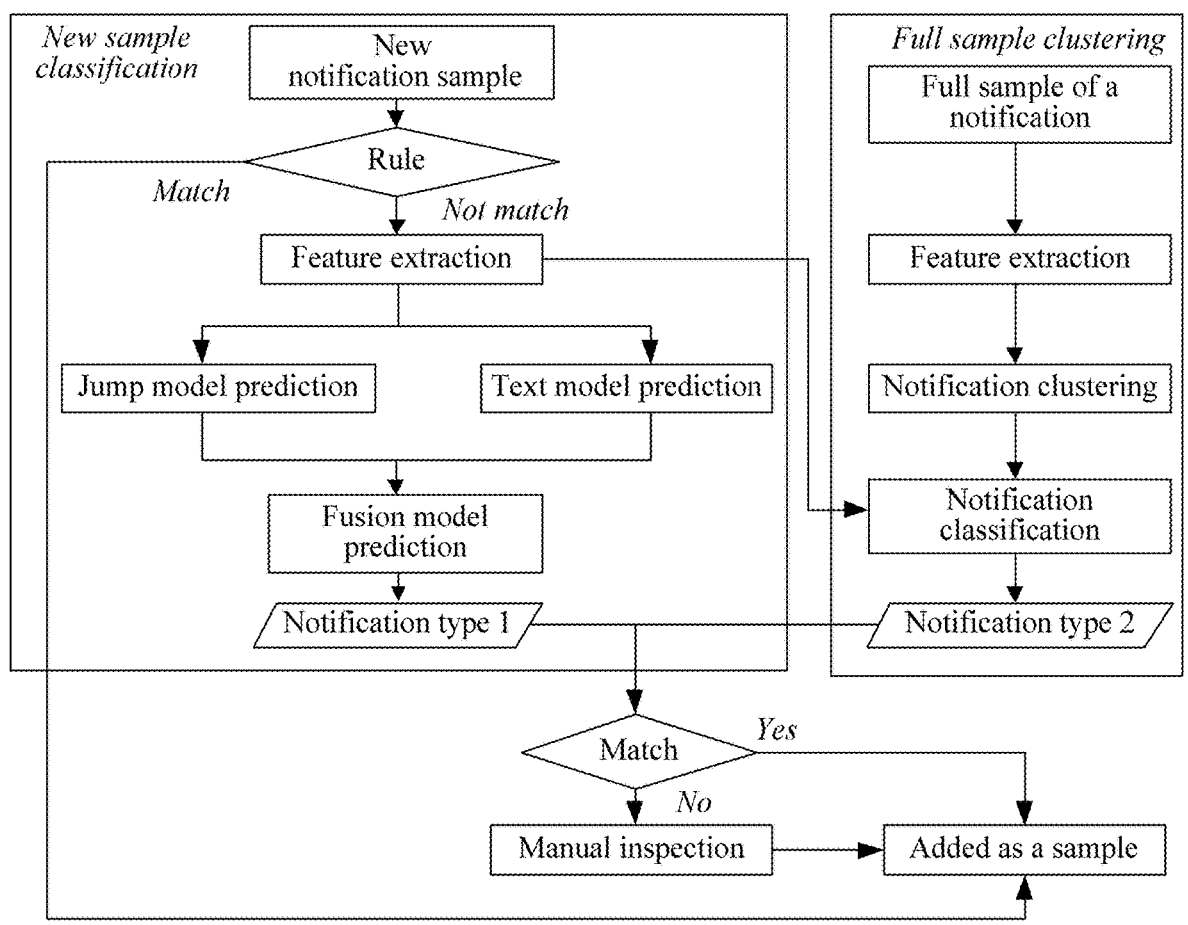
FIG. 12I shows a new training sample added process according to an embodiment of this application.

Operation 4: Use intermediate results generated by a jump model and a text model to train a fusion model. Because a quantity of applications increase constantly, a new notification sample needs to be added in time to update and iterate an existing classification rule and model. Higher operation and maintenance costs are required by only using a manual method, so FIG. 12I shows a semi-automatic offline new sample added process to reduce manual costs of operation and maintenance. Operations are as follows:

Operation 1: When a received new notification sample performs a procedure which is the same as that of notification classification on a mobile terminal side to obtain a notification classification 1, and if the new notification sample has already matched a rule, the new notification sample is directly added as a new sample in a notification sample library.

A full sample of a notification is used to extract a notification eigenvector (the operation is the same as operation 2 of the mobile terminal classification)). The full sample of the notification is performed high-dimensional clustering based on the notification eigenvector (a quantity of clustering types can be defined based on a notification type defined by a service). After clustering, a clustering type is labeled based on a sample label.

Operation 2: Calculate a similarity between the eigenvector of the new notification sample and each classification after clustering to obtain a new sample notification type 2.

Operation 3: Compare the new sample notification classification 1 and the new sample notification type 2. If the new sample notification type 1 is equal to the new sample notification type 2, the new notification sample is automatically labeled as a corresponding notification classification and is added as a new sample in the notification sample library. If the new sample notification type 1 is not equal to the new sample notification type 2, the new sample type is manually inspected and added to the new sample in the notification sample library.

Figure 12J:
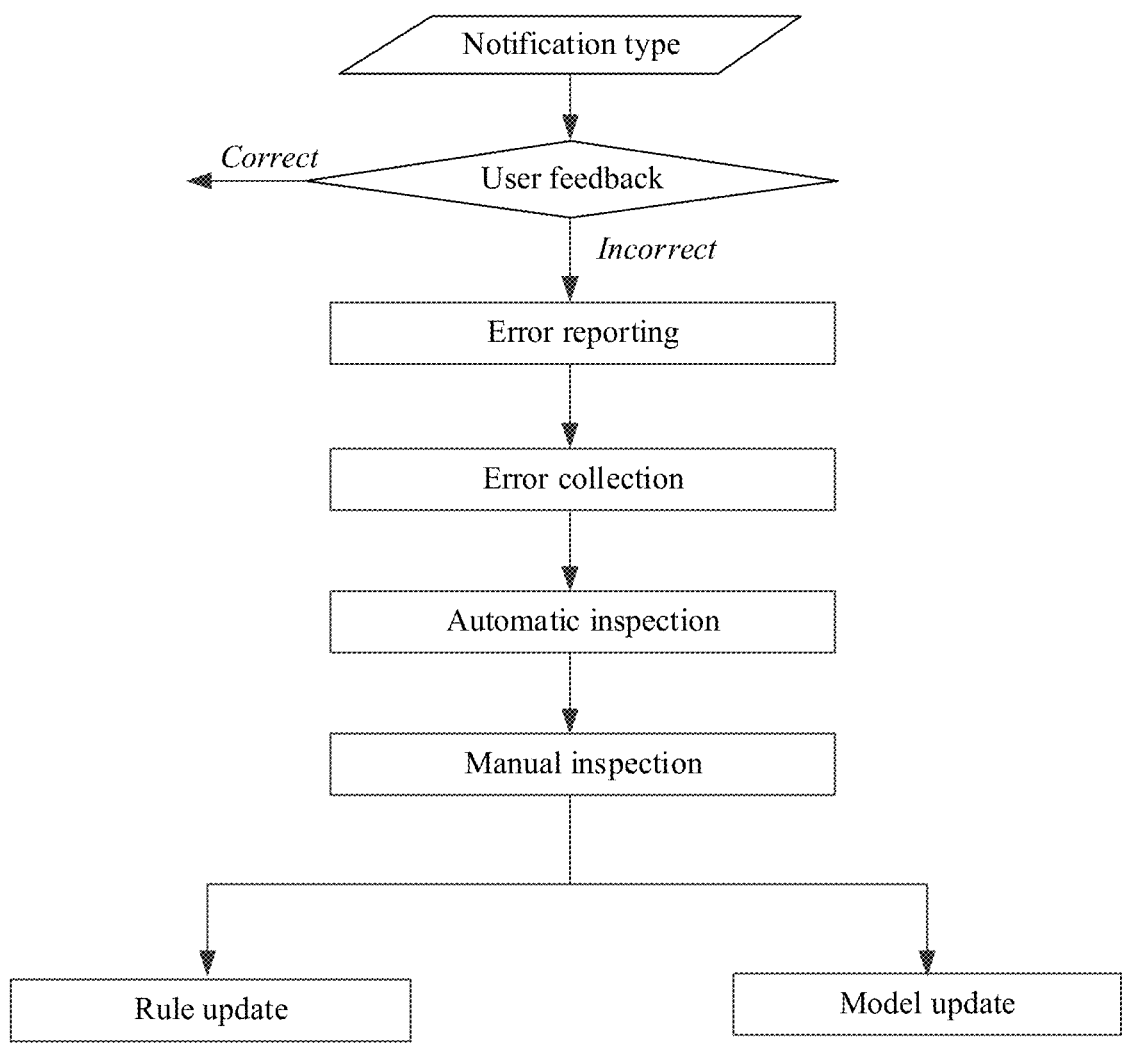
FIG. 12J is a flowchart of a classification feedback mechanism according to an embodiment of this application.

The notification classification rule and model require not only new samples to iterate, but also user feedback for modification of the classification rule and the model. FIG. 12J is a flowchart of classification feedback mechanism. Operations are as follows:

Operation 1: For a notification that intelligent classification is completed on a mobile terminal side, if a user feedback result is that the classification is not correct, the notification data and the user feedback result requires to be reported.

Operation 2: A server end collects whether feedback statistics of related notification classification errors reach a threshold required to be re-inspected.

Operation 3: If the statistical data in operation 2 reaches the threshold, the new sample is first used to add operation 1 described in the procedure to perform automatic classification of the notification.

Operation 4: If the automatic inspection fails to find an error, confirmation is further made through manual inspection.

Operation 5: If manual inspection confirms that there is a classification error, a related notification rule is updated or a notification classification model is updated.

Figure 12K:
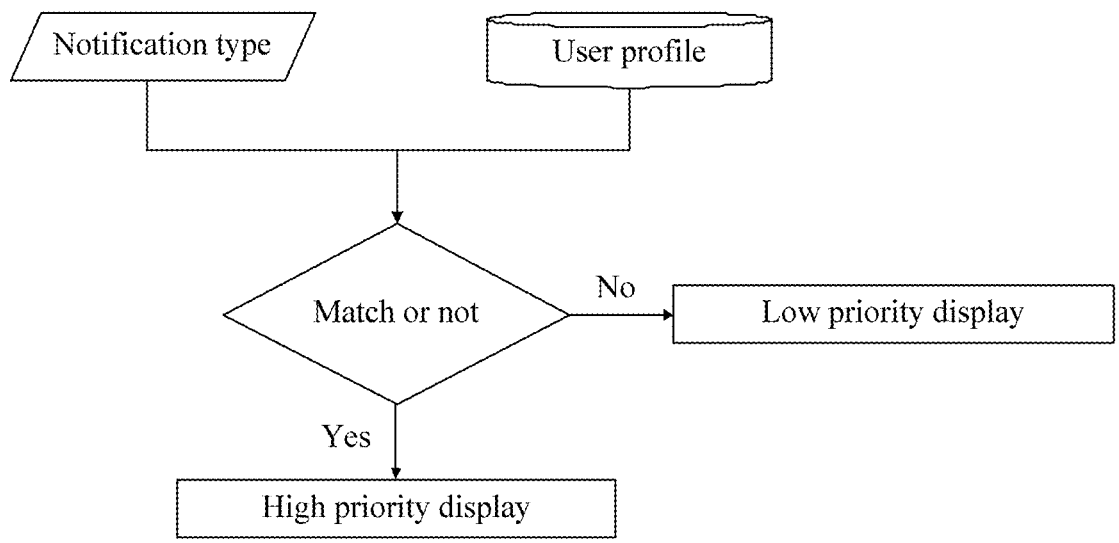
FIG. 12K shows a personalized sorting process of a notification type according to an embodiment of this application.

After the notification is automatically classified on the mobile terminal side, display priority sorting is performed on the notification according to a persona of a local user. FIG. 12K shows a personalized sorting procedure of notification types. Operations are as follows:

Operation 1: Obtain the notification type and a local user profile (a user profile tag and user usage historical data).

Operation 2: If the notification type is in consistent with the user profile label, for example, if the user profile tag labels the user as a military fan, and the notification type is the military notification, the notification type matches the user profile tag, and the notification is set as a high priority display. For another example, if the user usually taps a type of notification of an application, the notification matches with the user profile, and the notification is set as a high priority display. If the notification type does not match the user profile, the display priority of the notification may be suitably degraded.

(4) The Technical Solutions of the Embodiments of this Application Achieve the Following Beneficial Effects:

An application abuse notification function is limited on the mobile terminal side, so that the possibility of harassing the user is relatively low.

The notification type may be self-defined based on service requirements, which is convenient for subsequent services to perform different processing according to different notification types, and helps to use a one-size-fits-all manner when clearing notifications.

There is no need to depend on a whitelist or a blacklist to filter the notification;

The notification type can be automatically identified, and the notification display priority can be dynamically adjusted based on the user profile and the usage historical record of the user.

The notification rule definition and the model are semi-automatically maintained can reduce manual operation and maintenance costs.

Figure 13:
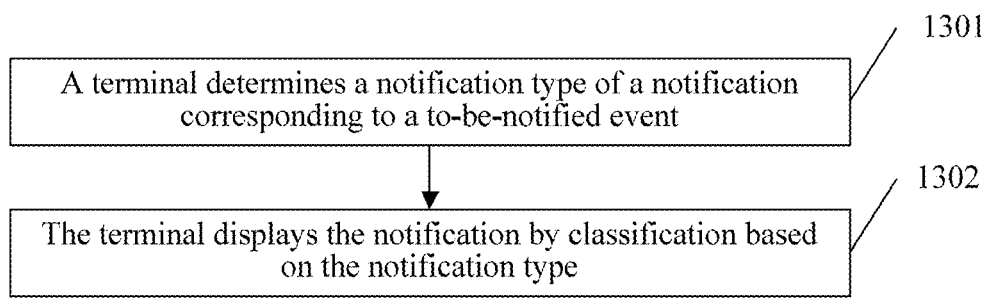
FIG. 13 is a flowchart of another embodiment of a notification display method according to an embodiment of this application.

An embodiment of this application further provides a notification display method, configured to help a user to quickly find out an important notification, improving user experience. Referring to FIG. 13, another embodiment of the notification display method in the embodiment of this application includes:

1301. A terminal determines a notification type of a notification corresponding to a to-be-notified event; when there is a to-be-notified event, the terminal determines the notification type corresponding to the to-be-notified event.

It should be understood that, the to-be-notified event may include a local notification event and a push notification event. The local notification event is a notification event triggered by a local application, and is a notification form that is based on time behavior, for example, clock timing, and a to-do reminder. The push notification event is a notification event sent by an application service provider to an application client, that is, the notification event obtained by a terminal application, for example, an application update notification.

In one embodiment, the terminal may obtain matching information of the to-be-notified event, match the matching information against rules in a rule repository, and determine the notification type corresponding to the matching rule as the notification type of the notification. Specific matching process is similar to operation 402 in an embodiment corresponding to FIG. 4. Details are not described herein again.

In one embodiment, the terminal may obtain feature information of the to-be-notified event, analyze the feature information by using a classification model, and use a notification type corresponding to the analysis result as the notification type of the notification. Specific process of obtaining the feature information and process of analyzing the feature information is similar to operation 403 in an embodiment corresponding to FIG. 4. Details are not described herein again.

In one embodiment, the terminal may obtain application package name information of the to-be-notified event, and determine the notification type to which the notification belongs based on the application package name information. Specifically, notifications of the application package name information are determined as notifications of the same type, that is, each application corresponds to a notification type, or determine the application type of the application based on the application package name information and use the notification type to which the notification belongs as the application type.

In one embodiment, the terminal may obtain text information of the to-be-notified event, and determine the notification type to which the notification belongs based on a keyword and/or a key phrase in the text information. Specifically, notifications that have the same keyword and/or key phrase are determined as notifications of the same notification type.

In one embodiment, the terminal may obtain jump information of the to-be-notified event, and determine the notification type to which the notification belongs based on the jump information. Specifically, notifications that have the same jump information are determined as notifications of the same notification type.

The terminal may further perform notification classification by using another manner. This is not specifically limited in this embodiment.

1302. The terminal displays the notification by classification based on the notification type.

After determining the notification type to which the notification belongs, the terminal displays the notification by classification based on the notification type. Specifically, the terminal may centralize notifications of the same notification type to one pane to display.

The following describes how notifications are displayed in the corresponding pane.

Mode 1. Each notification is displayed in expanded form in the corresponding display pane.

For each notification type, the terminal displays notifications of the same notification type in expanded form which are centralized in the pane.

Mode 2. The notification is displayed in the corresponding display pane based on a display mode corresponding to a priority of the notification.

The terminal obtains the priority of the notification corresponding to the to-be-notified event, determines a display mode of the notification in the corresponding display pane based on the priority, and displays the notification based on the display mode. The display mode includes: displaying in expanded form or displaying in collapsed form in the corresponding display pane; or displaying in a first mode or displaying in a second mode in the corresponding display pane, and content displayed in the first mode is more than content displayed in the second mode.

In one embodiment, the priority of the notification corresponding to the to-be-notified event may be determined based on priority information, where the priority information includes at least one of the following: first priority information corresponding to the notification type, first priority information of the application corresponding to the notification, and user usage habit information corresponding to the notification.

The terminal determines the priority of the notification based on the priority information, the process of displaying based on the priority is similar to content about the display mode 2 described in operation 404 in an embodiment corresponding to FIG. 4. Details are not described herein again.

In one embodiment, the priority of the notification corresponding to the to-be-notified event may be determined based on third priority information set by an application service provider.

An actual application scenario is used for illustration in the following:

Scenario E: a user is using "Baidu Maps" in the terminal for navigation. "Baidu Maps" sends a corresponding notification 1401. During navigation, the terminal obtains notifications 1402 and 1403 sent from "Baidu Maps" and a notification 1404 sent from "Today's Headline".

The Android system defines notifications into five priorities: max, high, default, min, and none, and sets that the notification with the priority "max" is displayed in expanded form, and notifications of the remaining four priorities are displayed in collapsed form. "Baidu Maps" defines the priority of the notification 1401 as "max", and priorities corresponding to 1402 and 1403 are "default"; and "Shenzhen weather" defines the priority corresponding to 1404 as "high".

Figure 14:
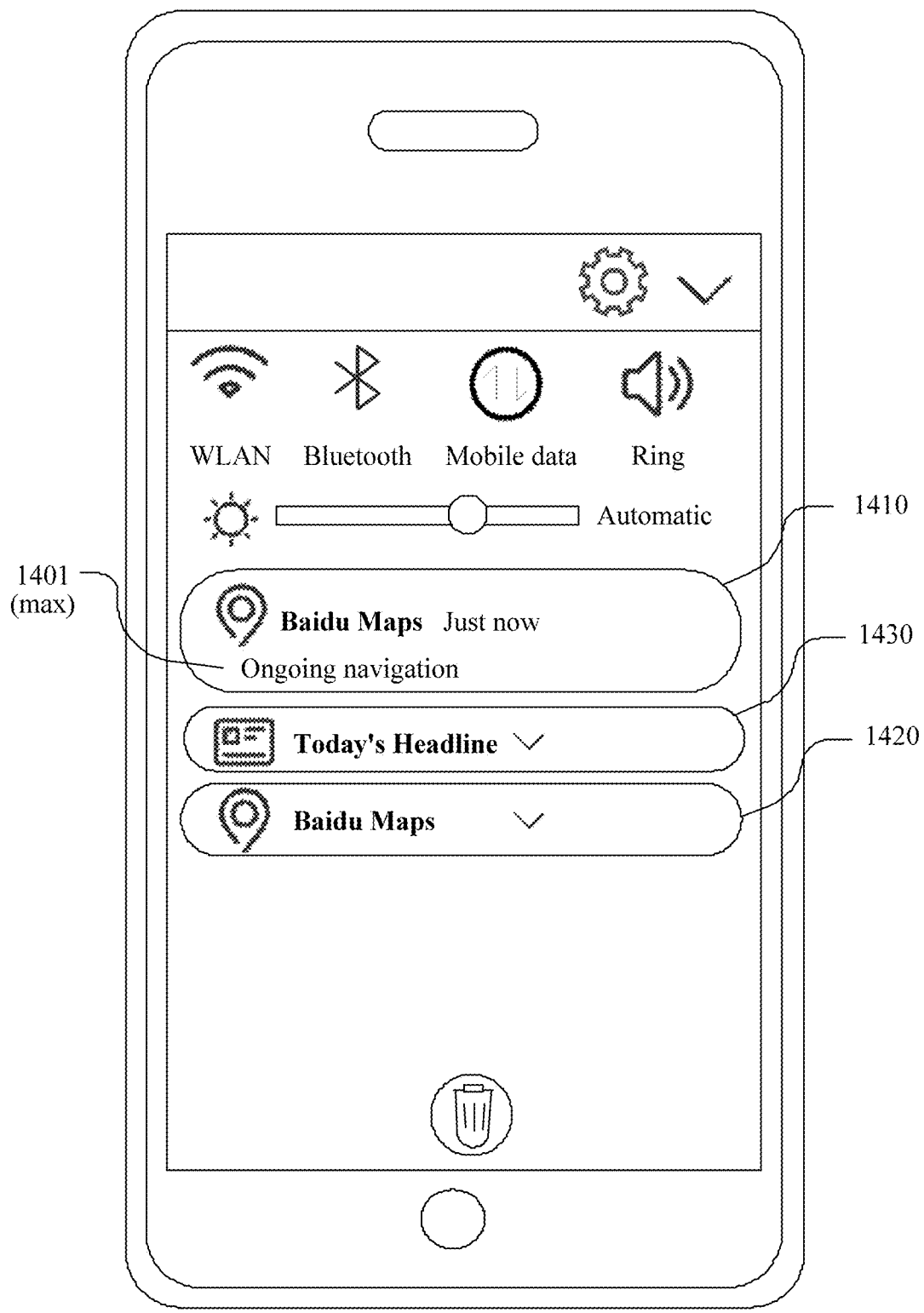
FIG. 14 is a schematic diagram of notifications displayed on a notification bar display interface according to an embodiment of this application.

The terminal classifies according to application package name information of the notification, that is, classifies application package name with the same information as one type. The terminal classifies 1401, 1402 and 1403 as one type, and classifies 1404 as one type. The terminal displays notification 1401 in expanded form in the pane 1410, centralizes and displays 1402 and 1403 in collapsed form in the pane 1420 and displays the notification 1404 in collapsed form in the pane 1430, as shown in FIG. 14.

In a possible embodiment, the terminal may further centralize all notifications of the same notification type and that have a first priority to one pane, and centralize all notifications that have a second priority to another pane. The priority means a priority of a notification, and the first priority is higher than the second priority. The terminal may specifically determine the priority of the notification through priority information, and the specific determining process is similar to the process described in operation 404 in the corresponding embodiment in FIG. 4. Details are not described herein again.

In one embodiment of this application, the terminal may set the priority of the notification based on information such as user interests of notifications and may display the notification in different modes based on the priority of the notification. Less content may be displayed for the notification that has a relatively low priority, and more content may be displayed for the notification that has a high priority. In this case, the user may quickly find out notifications of interest on the notification display interface, thereby improving search efficiency and improving user experience. In addition, a plurality of modes of displaying the classification are provided in the embodiment of this application, to improve flexibility of the solution.

Figure 15:
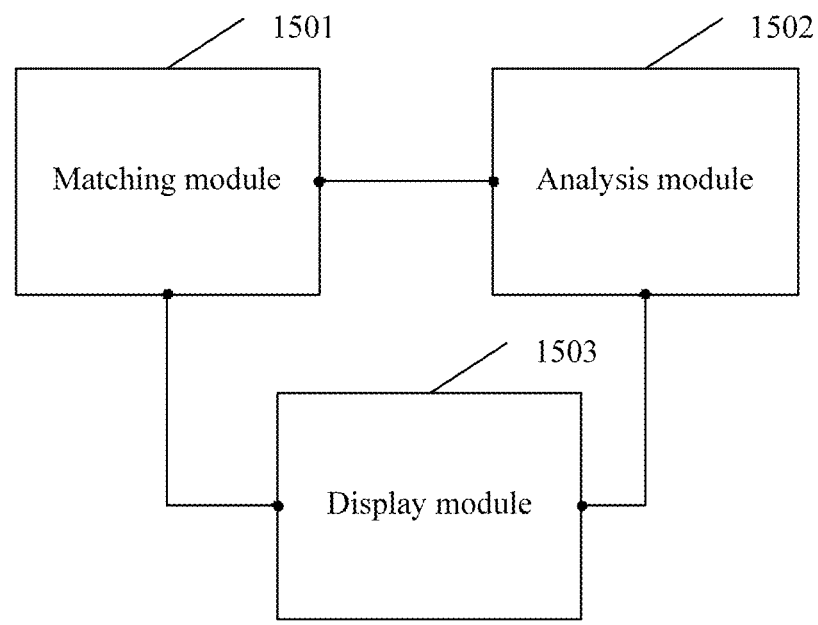
FIG. 15 is a schematic diagram of an embodiment of a terminal according to an embodiment of this application.

The notification display method in this application is described above, and a terminal in this application is described below. Referring to FIG. 15, an embodiment of a terminal is provided according to an embodiment of this application, including: a matching module 1501, a display module 1502, and an analysis module 1503.

When there is a to-be-notified event, the matching module 1501 is configured to: obtain matching information from object information of the to-be-notified event, and match the matching information against a rule in a rule repository. The display module 1502 is configured to display, if the matching performed by the matching module 1501 succeeds, a notification corresponding to the to-be-notified event by classification based on a notification type corresponding to the matching rule. The analysis module 1503 is configured to: extract, if the matching performed by the matching module 1501 fails, at least one piece of feature information from the object information of the to-be-notified event, and analyze the feature information by using a classification model. The display module 1502 is alternatively configured to display a notification corresponding to the to-be-notified event by classification based on a notification type obtained by an analysis by the analysis module.

Each rule in the rule repository includes at least one condition, and each rule corresponds to one notification type. The object information of the to-be-notified event includes at least text information, jump information, and application package name information corresponding to the to-be-notified event.

In some embodiments, the rule in the rule repository includes at least one first text matching condition, at least one second text matching condition, an application package name matching condition corresponding to each second text matching condition, at least one jump matching condition, and an application package name matching condition corresponding to each jump matching condition.

The matching module 1501 is specifically configured to: obtain the text information from the object information of the to-be-notified event, and match the text information against a first text matching condition in the rule.

The matching module 1501 is specifically configured to: obtain the text information and the application package name information from the object information of the to-be-notified event, match the text information against a second text matching condition in the rule, and match the application package name information against an application package name matching condition corresponding to the second text matching condition in the rule.

The matching module 1501 is specifically configured to: obtain the jump information and the application package name information from the object information of the to-be-notified event, match the jump information against a jump matching condition in the rule, and match the application package name information against an application package name matching condition corresponding to the jump matching condition.

In this embodiment, the jump information may include: standard jump information and self-defined jump information.

In some embodiments, the classification model may include: a text classification model, a jump classification model, and a fusion classification model.

The analysis module 1503 is specifically configured to: extract a jump information eigenvector and a text information eigenvector from the object information of the to-be-notified event, analyze the text information eigenvector by using the text classification model, to obtain a first category, analyze the jump information eigenvector by using the jump classification model, to obtain a second category, and analyze the first category and the second category by using the fusion classification model, to obtain an analysis result. The analysis result corresponds to one notification type.

More specifically, in a process of extracting the jump information eigenvector and the text information eigenvector, the classification model 153 may be configured to: obtain the jump information from the object information, divide a value of each field in the jump information into a plurality of characters, and combine the plurality of characters through vectorization, to obtain the jump information eigenvector.

In some embodiments, the display module 1502 is specifically configured to display a notification corresponding to a to-be-notified event of a same notification type in a same display pane in a centralized manner, that is, display a notification in a display pane corresponding to a notification type to which the notification belongs.

In one embodiment, when being configured to display a notification corresponding to a to-be-notified event of a same notification type in a same display pane in a centralized manner, the display module 1502 is specifically configured to display the notification of the notification type in expanded form in the display pane in a centralized manner.

In one embodiment, when being configured to display a notification corresponding to a to-be-notified event of a same notification type in a same display pane in a centralized manner, the display module 1502 is specifically configured to: centralize the notification of the notification type in one display pane, determine a display mode of the notification in the display pane based on a priority of the obtained notification, and display the notification in the display pane in corresponding display mode. The display mode includes: displaying in expanded form or displaying in collapsed form. Alternatively, the display mode includes: displaying in a first mode or displaying in a second mode, and content displayed in the first mode is more than content displayed in the second mode.

When the display module 1502 is configured to display the notification in the second mode, the display module 1502 may be further configured to display the notification in the first mode in response to a detected input operation performed on the displayed notification.

In one embodiment, the terminal further includes a determining module. The determining module is configured to obtain priority information corresponding to the notification, and determine the priority corresponding to the notification based on the priority information. The priority information includes at least one of the following: first priority information corresponding to the notification type to which the notification belongs, second priority information of an application corresponding to the notification, and user usage habit information corresponding to the notification.

The user usage habit information includes at least one of the following: user historical notification tapping frequency information, user historical notification deletion frequency information, and user profile information.

In the embodiments of this application, when there is a to-be-notified event, the matching module 1501 may match the matching information against the rule in the rule repository, to obtain the notification type; the analysis module 1503 may analyze the feature information by using the classification model, to obtain the notification type; and the display module 1502 may display the notification by classification based on the notification type. The rules in the rule repository and the classification model are determined based on a large amount of sample data that is manually labeled with the notification types, so that accurate classification of notifications may be achieved to meet requirements of users, to help the users to screen out notifications of interest, thereby improving user experience.

It should be understood that, the process performed by each module in the terminal corresponding to FIG. 15 is similar to the method process described in the embodiment shown in FIG. 4. Details are not described herein again.

Figure 16:
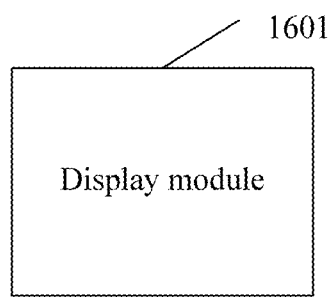
FIG. 16 is a schematic diagram of an embodiment of a terminal according to an embodiment of this application.

This application further provides another terminal. Referring to FIG. 16, an embodiment of a terminal according to an embodiment of this application includes: a display module 1601, configured to: display, when there is a to-be-notified event, a notification by classification based on a notification type of the notification, and display in different display modes based on a priority of the notification. Specifically, the different display modes may include the following two display modes: displaying in expanded form and displaying in collapsed form. Alternatively, the different display modes include the following two display modes: displaying in a first mode and displaying in a second mode, and content displayed in the first mode is more than content displayed in the second mode.

In some embodiments, when displaying the notification by classification, the display module 1601 is specifically configured to display a notification corresponding to a to-be-notified event of a same notification type in a same display pane in a centralized manner, that is, display the notification that belongs to a same notification type in one display pane in a centralized manner.

In one embodiment, when displaying the notification in a same display pane in a centralized manner, the display module 1601 may be configured to display the notification in expanded form in a corresponding display pane.

In one embodiment, when displaying the notification in a same display pane in a centralized manner, the display module 1601 may be configured to: determine a display mode of the notification in a corresponding display pane based on the priority of the notification corresponding to the to-be-notified event, and display the notification based on the determined display mode. The display mode may include: displaying in expanded form or displaying in collapsed form, or may include: displaying in a first mode or displaying in a second mode, and content displayed in the first mode is more than content displayed in the second mode.

When the display module 1601 is configured to display the notification in the second mode, the display module 1601 is further configured to display the notification in the first mode in response to a detected input operation performed on the notification.

In one embodiment, the terminal further includes an obtaining module, configured to determine the priority corresponding to the notification based on the obtained priority information. The priority information includes at least one of the following: first priority information corresponding to the notification type to which the notification belongs, second priority information of an application corresponding to the notification, and user usage habit information corresponding to the notification.

The user usage habit information may include at least one of the following: user historical notification tapping frequency information, user historical notification deletion frequency information, and user profile information.

It should be understood that, the process performed by each module in the terminal corresponding to FIG. 16 is similar to the method process described in the embodiment shown in FIG. 13. Details are not described herein again.

In this embodiment, the display module 1601 may display the notification in different modes based on the priority of the notification. Less content may be displayed for the notification that has a relatively low priority, and more content may be displayed for the notification that has a high priority. In this case, the user may be allowed to quickly find out notifications of interest on the notification display interface, thereby improving search efficiency and improving user experience.

In addition, a plurality of modes of displaying the notification by the display module 1601 are provided in this embodiment of this application, to improve flexibility of the solution.

Figure 17:
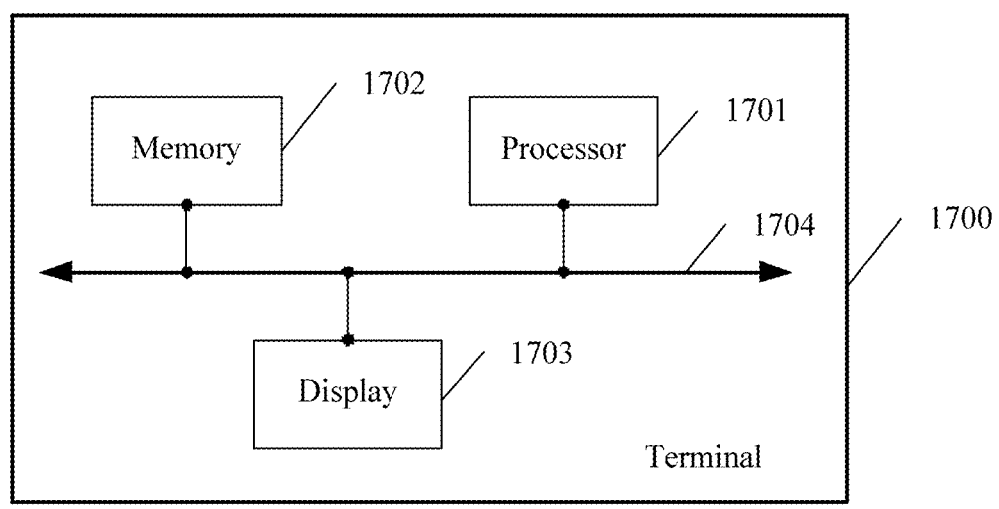
FIG. 17 is a schematic diagram of an embodiment of a terminal according to an embodiment of this application.

The terminal in this application is described above from a perspective of a functional module, and a terminal in this application is described below from a perspective of an entity hardware. For specific details, refer to FIG. 17. An embodiment of a terminal 1700 is provided according to an embodiment of this application, including:

one or more processors 1701, a memory 1702, and a display 1703.

The terminal 1700 further includes a bus 1704.

The processor 1701, the memory 1702, and the display 1703 are connected by using the bus 1704.

The bus 1704 may be a peripheral component interconnect (peripheral component interconnect, PCI for short) bus, an extended industry standard architecture (extended industry standard architecture, EISA for short) bus, and or the like. The bus may be classified into an address bus, a data bus, a control bus, and the like. For ease of representation, only one thick line is used to represent the bus in FIG. 17, but this does not mean that there is only one bus or only one type of bus.

The processor 1701 may be a central processing unit (central processing unit, CPU for short), a network processor (network processor, NP for short), or a combination of a CPU and an NP.

The processor 1701 may further include a hardware chip. The hardware chip may be an application-specific integrated circuit (application-specific integrated circuit, ASIC for short), a programmable logic device (programmable logic device, PLD for short), or a combination thereof. The foregoing PLD may be a complex programmable logic device (complex programmable logic device, CPLD for short), a field-programmable logic gate array (field-programmable logic gate array, FPGA for short), a generic array logic (generic array logic, GAL for short), or any combination thereof.

The memory 1702 may include a volatile memory (volatile memory), for example, a random access memory (random access memory, RAM for short); or the memory may also include a nonvolatile memory (nonvolatile memory), for example, a flash memory (flash memory), a hard disk drive (hard disk drive, HDD for short), or a solid-state drive (solid-state drive, SSD for short); or the memory 1702 may further include a combination of the foregoing memories.

In one embodiment, the memory 1702 is configured to store a program instruction, and the processor 1701 invokes the program instruction stored in the memory 1702, so that the terminal performs one or more operations or the optional implementations in the embodiment shown in FIG. 4 or FIG. 13.

An embodiment of this application further provides a computer storage medium. The computer storage medium is configured to store a computer software instruction used by the foregoing terminal, and the computer software instruction includes a program designed for the terminal and configured for implementation.

An embodiment of this application further provides a computer program product. The computer program product includes a computer software instruction, and the computer software instruction may be loaded by using a processor to implement a process of the notification display method shown in FIG. 4 or FIG. 13.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, a procedure or functions according to the embodiments of the present invention are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a read-only memory (ROM for short), a random access memory (RAM for short), a magnetic disk, or an optical disc.

The foregoing embodiments are merely intended to describe the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A notification display method, comprising:
obtaining a to-be-notified event;
obtaining matching information from object information of the to-be-notified event;
matching the matching information against a rule in a rule repository;
if the matching succeeds, displaying, by a terminal, a notification by classification based on a notification type of the notification corresponding to the to-be-notified event and in different display modes based on a priority of the notification, wherein the different display modes comprise an expanded form in a first mode and a collapsed form in a second mode, in a corresponding display pane, wherein the notification having a first priority is displayed in the expanded form, and the notification having a second priority is displayed in the collapsed form, wherein the second priority is lower than the first priority, and wherein the notification displayed in the expanded form has more content than the notification displayed in the collapsed form; and
if the matching fails, extracting at least one piece of feature information from the object information of the to-be-notified event, analyzing the feature information by using a trainable classification model, and displaying a notification corresponding to the to-be-notified event based on a notification type obtained by the analysis.

2. The method according to claim 1, wherein the displaying, by a terminal, a notification by classification based on a notification type of the notification corresponding to the to-be-notified event comprises:
displaying, by the terminal, a notification corresponding to the to-be-notified event of the same notification type in a same display pane in a centralized manner.

3. The method according to claim 2, wherein the displaying, by a terminal, a notification by classification comprises:
displaying, by the terminal, the notification in the expanded form in the corresponding display pane.

4. The method according to claim 2, wherein the displaying, by a terminal, a notification by classification comprises:

determining, by the terminal, a display mode of the notification in the corresponding display pane based on the priority of the notification corresponding to the to-be-notified event; and
displaying the notification based on the determined display mode.

5. The method according to claim 4, wherein the displaying, by the terminal, a notification by classification further comprises:
when the terminal displays the notification in the second mode, displaying, by the terminal, the notification in the first mode in response to detecting an input operation performed on the displayed notification.

6. The method according to claim 4, wherein the priority of the notification is determined based on a priority information, wherein
the priority information comprises at least one of the following:
first priority information corresponding to the notification type corresponding to the notification;
second priority information of an application corresponding to the notification; or
user usage habit information corresponding to the notification.

7. The method according to claim 6, wherein the user usage habit information comprises at least one of the following:
user historical notification tapping frequency information;
user historical notification deletion frequency information; or
user profile information.

8. The method according to claim 2, wherein the displaying, by the terminal, a notification by classification comprises:
obtaining, by the terminal, the priority of the notification; and
determining, by the terminal, a display mode of the notification in the corresponding display pane based on the priority, wherein the display mode comprises: displaying in a first mode or displaying in a second mode in the corresponding display pane, and a size of content displayed in the first mode is larger than a size of content displayed in the second mode.

9. The method according to claim 1, wherein extracting, by the terminal, at least one piece of feature information comprises:
extracting a jump information eigenvector and a text information eigenvector from the object information of the to-be-notified event;
analyzing the text information eigenvector by using a text classification model, to obtain a first category;
analyzing the jump information eigenvector by using a jump classification model, to obtain a second category; and
analyzing the first category and the second category by using a fusion classification model, to obtain an analysis result, analysis result corresponds to a notification type of the notification corresponding to the to-be-notified event.

10. A terminal, comprising:
a touchscreen comprising a touch-sensitive surface and a display coupled to the touch-sensitive surface;
one or more processors coupled to the touch screen;
a memory coupled to the one or more processors, wherein the one or more processors are configured to:

when there is a to-be-notified event, obtain matching information from object information of the to-be-notified event;
match the matching information against a rule in a rule repository;
if the matching succeeds, display a notification by classification based on a notification type of the notification corresponding to the to-be-notified event and in different display modes based on a priority of the notification, wherein the different display modes comprise an expanded form in a first mode and a collapsed form in a second mode, in a corresponding display pane, wherein the notification having a first priority is displayed in the expanded form and the notification having a second priority is displayed in the collapsed form, wherein the second priority is lower than the first priority, and wherein the notification displayed in the expanded form has more content than the notification displayed in the collapsed form; and
if the matching fails, extract at least one piece of feature information from the object information of the to-be-notified event, analyze the feature information by using a trainable classification model, and display a notification corresponding to the to-be-notified event based on a notification type obtained by the analysis.

11. The terminal according to claim 10, wherein displaying, by a terminal, a notification by classification based on a notification type of the notification corresponding to the to-be-notified event comprises:
displaying a notification corresponding to the to-be-notified event of the same notification type in a same display pane in a centralized manner.

12. The terminal according to claim 11, wherein displaying, by a terminal, a notification by classification comprises:
displaying the notification in the expanded form in the corresponding display pane.

13. The terminal according to claim 11, wherein displaying, by a terminal, a notification by classification comprises:
determining a display mode of the notification in the corresponding display pane based on the priority of the notification corresponding to the to-be-notified event; and
displaying the notification based on the determined display mode.

14. The terminal according to claim 13, wherein the operations further comprise:
displaying in the first mode or displaying in the second mode in the corresponding display pane, and the content displayed in the first mode is more than the content displayed in the second mode; and
the displaying a notification by classification further comprises:
when the notification is displayed in the second mode, displaying the notification in the first mode in response to detecting an input operation performed on the displayed notification.

15. The terminal according to claim 13, wherein the priority of the notification is determined based on a priority information, wherein
the priority information comprises at least one of the following:
first priority information corresponding to the notification type corresponding to the notification;
second priority information of an application corresponding to the notification; or
user usage habit information corresponding to the notification.

16. The terminal according to claim 15, wherein the user usage habit information comprises at least one of the following:
user historical notification tapping frequency information;
user historical notification deletion frequency information; or
user profile information.

17. The terminal according to claim 11, wherein displaying a notification by classification comprises:
obtaining, by the terminal, a priority of the notification; and
determining, by the terminal, a display mode of the notification in the corresponding display pane based on the priority, wherein the display mode comprises: displaying in a first mode or displaying in a second mode in the corresponding display pane, and a size of content displayed in the first mode is larger than a size of content displayed in the second mode.

18. A non-transitory computer-readable storage medium, comprising an instruction, which when executed by a processor of a terminal, cause the processor to perform operations, comprising:
when there is a to-be-notified event, obtaining matching information from object information of the to-be-notified event;
matching the matching information against a rule in a rule repository;
if the matching succeeds, displaying a notification by classification based on a notification type of the notification corresponding to the to-be-notified event and in different display modes based on a priority of the notification, wherein
the different display modes comprise: an expanded form in a first mode and a collapsed form in a second mode, in a corresponding display pane, wherein the notification having a first priority is displayed in the expanded form and the notification having a second priority is displayed in the collapsed form, wherein the second priority is lower than the first priority, and wherein the notification displayed in the expanded form has more content than the notification displayed in the collapsed form; and
if the matching fails, extracting at least one piece of feature information from the object information of the to-be-notified event, analyzing the feature information by using a trainable classification model, and displaying a notification corresponding to the to-be-notified event based on a notification type obtained by the analysis.

19. The computer-readable storage medium according to claim 18, wherein displaying a notification by classification based on a notification type of the notification corresponding to the to-be-notified event comprises:
displaying a notification corresponding to the to-be-notified event of the same notification type in a same display pane in a centralized manner.

20. The computer-readable storage medium according to claim 19, wherein displaying a notification by classification comprises:
displaying the notification in the expanded form in the corresponding display pane.

21. The computer-readable storage medium according to claim 19, wherein displaying a notification by classification comprises:

determining a display mode of the notification in the corresponding display pane based on the priority of the notification corresponding to the to-be-notified event; and displaying the notification based on the determined display mode.

* * * * *